US010123027B2

United States Patent
Hannuksela et al.

(10) Patent No.: US 10,123,027 B2
(45) Date of Patent: Nov. 6, 2018

(54) METHOD AND APPARATUS FOR VIDEO CODING AND DECODING

(71) Applicant: Nokia Technologies Oy, Espoo (FI)

(72) Inventors: Miska Matias Hannuksela, Tampere (FI); Kemal Ugur, Tampere (FI)

(73) Assignee: Nokia Technologies Oy, Espoo (FI)

( * ) Notice: Subject to any disclaimer, the term of this patent is extended or adjusted under 35 U.S.C. 154(b) by 396 days.

(21) Appl. No.: 14/583,371

(22) Filed: Dec. 26, 2014

(65) Prior Publication Data

US 2015/0304665 A1    Oct. 22, 2015

Related U.S. Application Data

(60) Provisional application No. 61/924,516, filed on Jan. 7, 2014.

(51) Int. Cl.
*H04N 13/00* (2018.01)
*H04N 19/157* (2014.01)
(Continued)

(52) U.S. Cl.
CPC ......... *H04N 19/187* (2014.11); *H04N 13/161* (2018.05); *H04N 19/30* (2014.11); *H04N 19/463* (2014.11); *H04N 19/70* (2014.11)

(58) Field of Classification Search
CPC ...... H04N 19/597; H04N 19/70; H04N 19/30; H04N 19/61; H04N 19/31; H04N 19/46
See application file for complete search history.

(56) References Cited

U.S. PATENT DOCUMENTS

| 7,436,886 B2 | 10/2008 | Hannuksela |
| 7,894,521 B2 | 2/2011 | Hannuksela |

(Continued)

FOREIGN PATENT DOCUMENTS

CN    101507281 A    8/2009

OTHER PUBLICATIONS

Stefanoski, Proposal for Supporting Optional Overlays with MV-HEVC, Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, JCTVC-O0358_presentation_r1, entire document.*

(Continued)

*Primary Examiner* — Dave Czekaj
*Assistant Examiner* — Alison Slater
(74) *Attorney, Agent, or Firm* — Alston & Bird LLP

(57) ABSTRACT

Various methods, apparatuses and computer program products for video encoding and decoding are provided. In some embodiments, to indicate a composition of pictures of different time instants, some usability information may be embedded to the video bitstream indicating the intended display behavior when more than one layer is used and associated display behavior using this information. More specifically, the embedded information may indicate how the layers need to be composed in the video bitstream. The information may indicate if the intended display behavior is to combine (overlay) base layer and enhancement layer decoded pictures. The information may indicate that the base and enhancement layer decoded pictures are allowed to be overlaid. In addition or alternatively, the information may indicate that the enhancement layer picture should not be combined with base layer picture during display.

14 Claims, 14 Drawing Sheets

(51) Int. Cl.
H04N 19/134 (2014.01)
H04N 19/187 (2014.01)
H04N 19/463 (2014.01)
H04N 13/161 (2018.01)
H04N 19/70 (2014.01)
H04N 19/30 (2014.01)

(56) References Cited

U.S. PATENT DOCUMENTS

| | | |
|---|---|---|
| 2006/0153295 A1 | 7/2006 | Wang et al. |
| 2008/0013621 A1 | 1/2008 | Wang et al. |
| 2008/0095228 A1 | 4/2008 | Hannuksela et al. |
| 2010/0008416 A1 | 1/2010 | Ben-Zedeff et al. |
| 2012/0016917 A1 | 1/2012 | Priddle et al. |
| 2014/0133556 A1* | 5/2014 | Chen ............... H04N 19/00066 375/240.12 |
| 2014/0192897 A1* | 7/2014 | Wang .................... H04N 19/70 375/240.25 |
| 2014/0348232 A1* | 11/2014 | Leontaris ............ H04N 19/597 375/240.12 |
| 2015/0103926 A1 | 4/2015 | Hannuksela |

OTHER PUBLICATIONS

International Search Report and Written Opinion received for corresponding Patent Cooperation Treaty Application No. PCT/FI2014/051053, dated Feb. 27, 2015, 16 pages.

Hannuksela, "MV-HEVC/SHVC HLS: On Output Layer Sets", Joint Collaborative Team on Video Coding (JCT-VC) of ITU-T SG 16 WP 3 and ISO/IEC JTC 1/SC 29/WG 11, 15th Meeting, Oct. 23-Nov. 1, 2013, pp. 1-4.

Stefanoski et al., "Proposal for Supporting Optional Overlays With MV-HEVC", Joint Collaborative Team on 3D Video Coding Extensions of ITU-T SG 16 WP 3 and ISO/IEC JTC 1/SC 29/WG 11, 6th Meeting, JCT3V-F0057, Oct. 25- Nov. 1, 2013, pp. 1-6.

Tech et al., "MV-HEVC Draft Text 5", Joint Collaborative Team on 3D Video Coding Extension Development of ITU-T SG 16 WP 3 and ISO/IEC JTC 1/SC 29/WG 11, 5th Meeting, Jul. 27-Aug. 2, 2013, pp. 1-65.

Chen et al., "High Efficiency Video Coding (HEVC) Scalable Extension Draft 3", Joint Collaborative Team on Video Coding (JCT-VC) of ITU-T SG 16 WP 3 and ISO/IEC JTC 1/SC 29/WG 11, 14th Meeting, JCTVC-N1008_v3, Jul. 25-Aug. 2, 2013, 68 Pages.

Hattori et al., "HLS: SEI Message for Transfer Function Information", Joint Collaborative Team on Video Coding (JCT-VC) of ITU-T SG 16 WP 3 and ISO/IEC JTC 1/SC 29/WG 11, 15th Meeting, JCTVC-O0064, Oct. 23-Nov. 1, 2013, pp. 1-4.

PCT Application No. PCT/IB2014/065309, "Video Encoding and Decoding", filed on Oct. 14, 2014, 108 pages.

"Parameter Values for the HDTV Standards for Production and International Programme Exchange", Recommendation ITU-R BT.709-5, Apr.2002, 32 pages.

"Parameter Values for Ultra-High Definition Television Systems for Production and International Programme Exchange", Recommendation ITU-R BT.2020, Aug. 2012, 7 pages.

"Advanced Video Coding for Generic Audiovisual Services", Series H: Audiovisual and Multimedia Systems, Infrastructure of audiovisual services—Coding of moving video, Recommendation ITU-T H.264, Mar. 2010, 676 pages.

"High Efficiency Video Coding", Series H: Audiovisual and Multimedia Systems, Infrastructure of audiovisual services—Coding of moving video, Recommendation ITU-T H.265, Apr. 2013, 317 pages.

"Information Technology—MPEG Video Technologies", Part 3:Representation of auxiliary video andsupplemental information, ISO/IEC 23002-3, Oct. 15, 2007, 26 Pages.

Suzuki et al., "MVC Extension for Inclusion of Depth Maps Draft Text 4", Joint Collaborative Team on 3D Video Coding Extension Development of ITU-T SG 16 WP 3 and ISO/IEC JTC 1/SC 29/WG 11, 1st Meeting, JCT2-A1001, Jul. 16-20, 2012, 70 Pages.

"Information Technology—Coding of Audio-Visual Objects—Part 12: ISO Base Media File Format", ISO/IEC 14496-12, Third edition, Oct. 15, 2008, 120 pages.

"Information Technology—Coding of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 12)", 3GPP TS 26.244, V12.3.0, Mar. 2014, pp. 1-63.

D. Tian et al. "Coding of Faded Scene Transitions", Joint Video Team (JVT) of ISO/IEC MPEG & ITU-T VCEG, ISO/IEC JTC1/SC29/EG11 and ITU-T SG16 Q.6, 3rd Meeting, Fairfax, Virginia, USA May 6-10, 2002, 18 pages.

Information Technology—Coding of Audio-Visual Objects—Part 14: MP4 File Format", ISO/IEC 14496-14, First edition, Nov. 15, 2003, 18 pages."

Amon P et al.; "File Format for Scalable Video Coding"; IEEE Transactions on Circuits and Systems for Video Technology; IEEE Service Center; Piscataway, NJ; vol. 17, No. 9; Sep. 1, 2007; pp. 1174-1185; XP011193013.

Anonymous: "1-Pager on Dynamic Adaptive Streaming over HTTP"; IEEE, LIS, Sophia Antipolis Cedex, France, No. N11964; Apr. 1, 2011; pp. 1; XP030018457.

Extended European Search Report from European Patent Application No. 14878298.0 dated Jul. 20, 2017, 10 pages.

Ugur K et al.; "AHG9: Display Hint SEI Message for ROI Layers"; 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/javc-site/; No. JCTVC-P0120; Jan. 8, 2014; XP030115620.

Office Action for Chinese Application No. 2014800768476 dated Aug. 2, 2018, 17 pages.

* cited by examiner

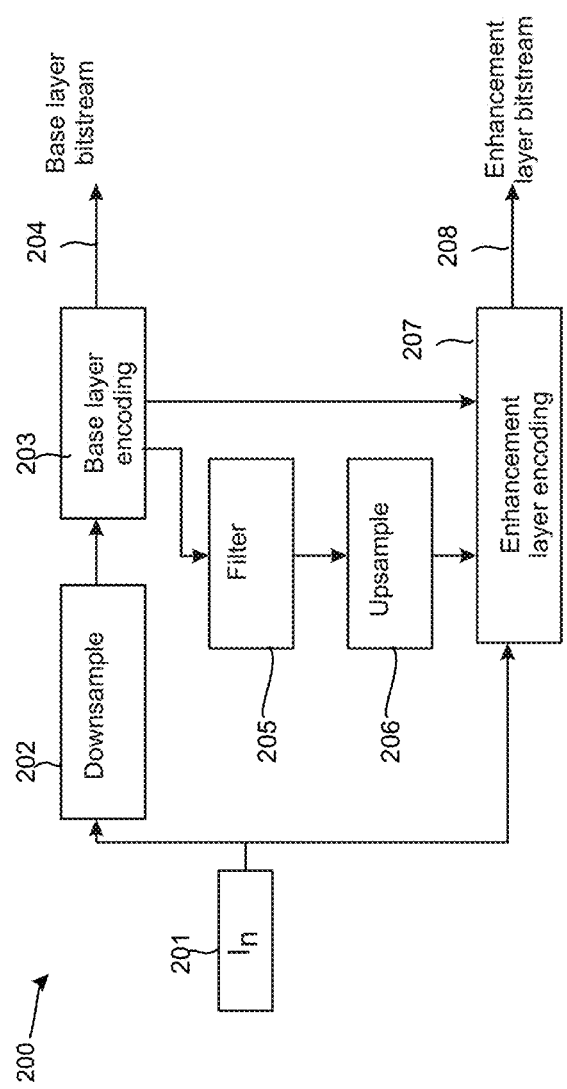

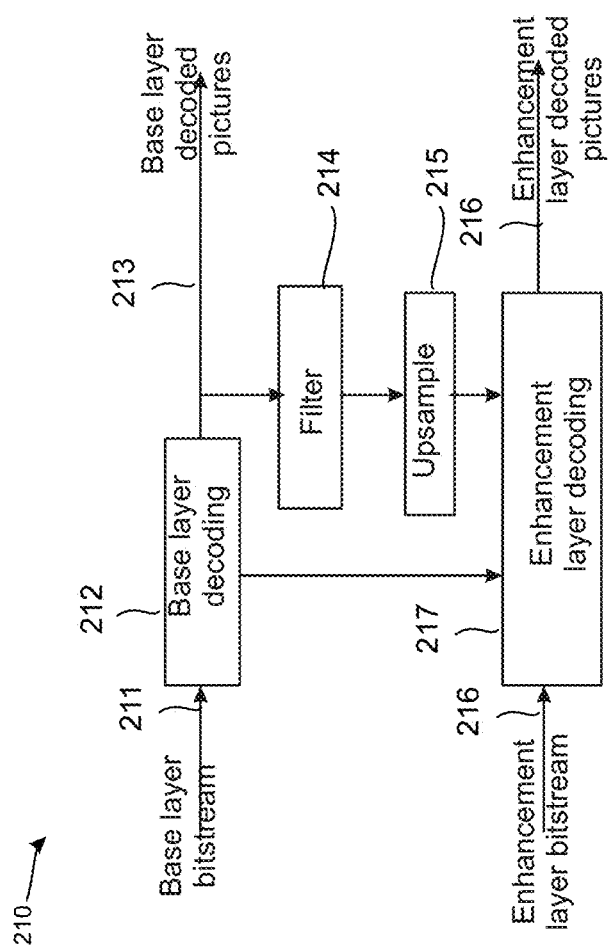

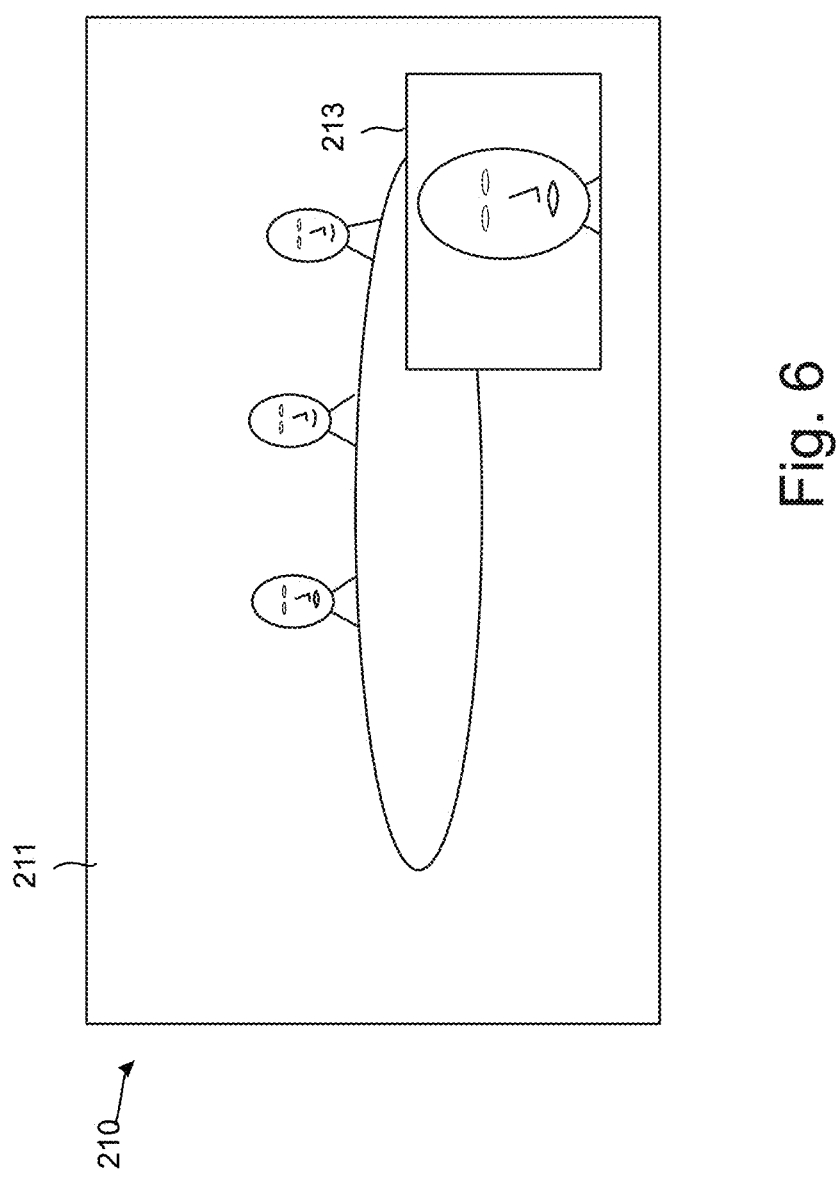

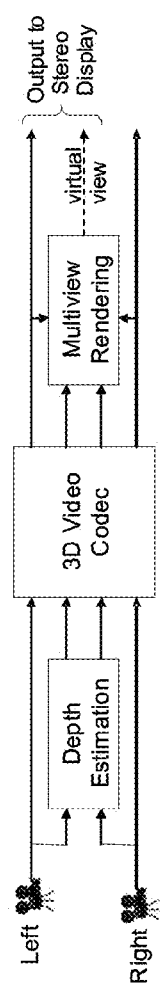
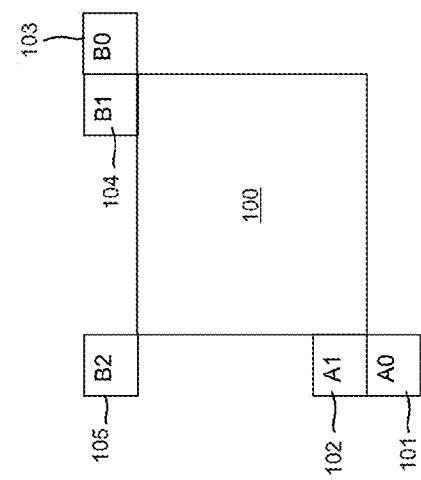
Fig. 10
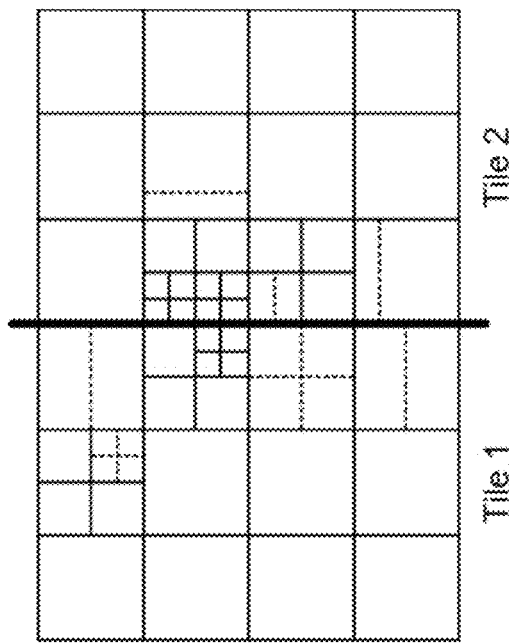
Fig. 7
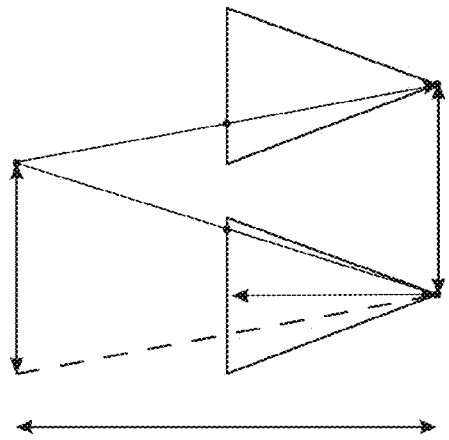
Fig. 9

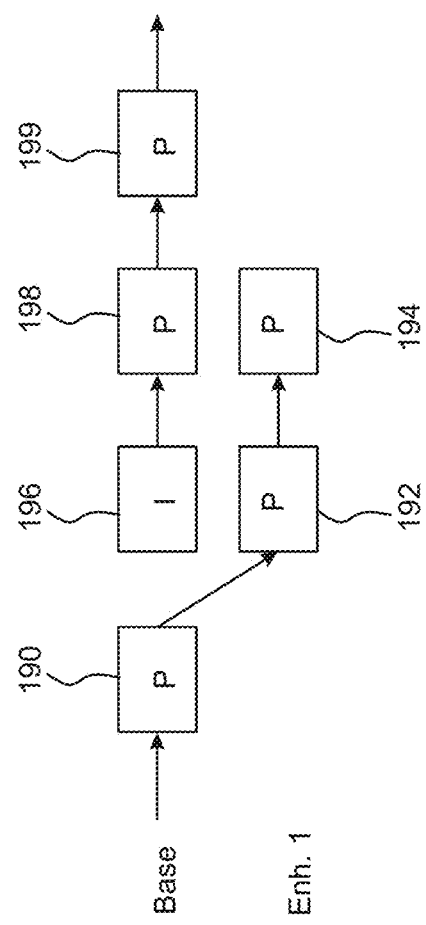
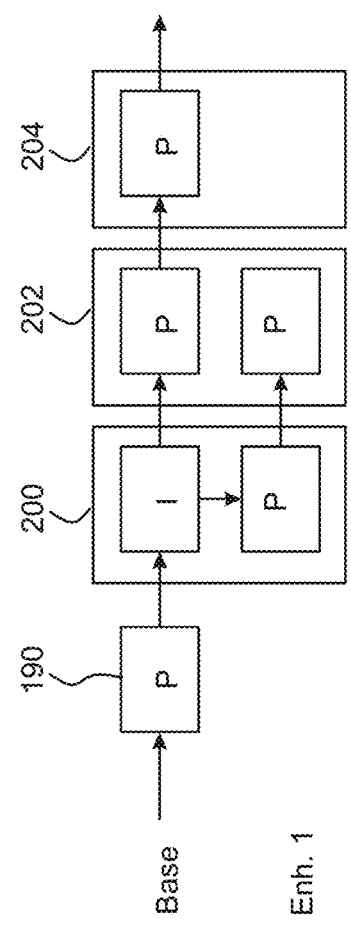

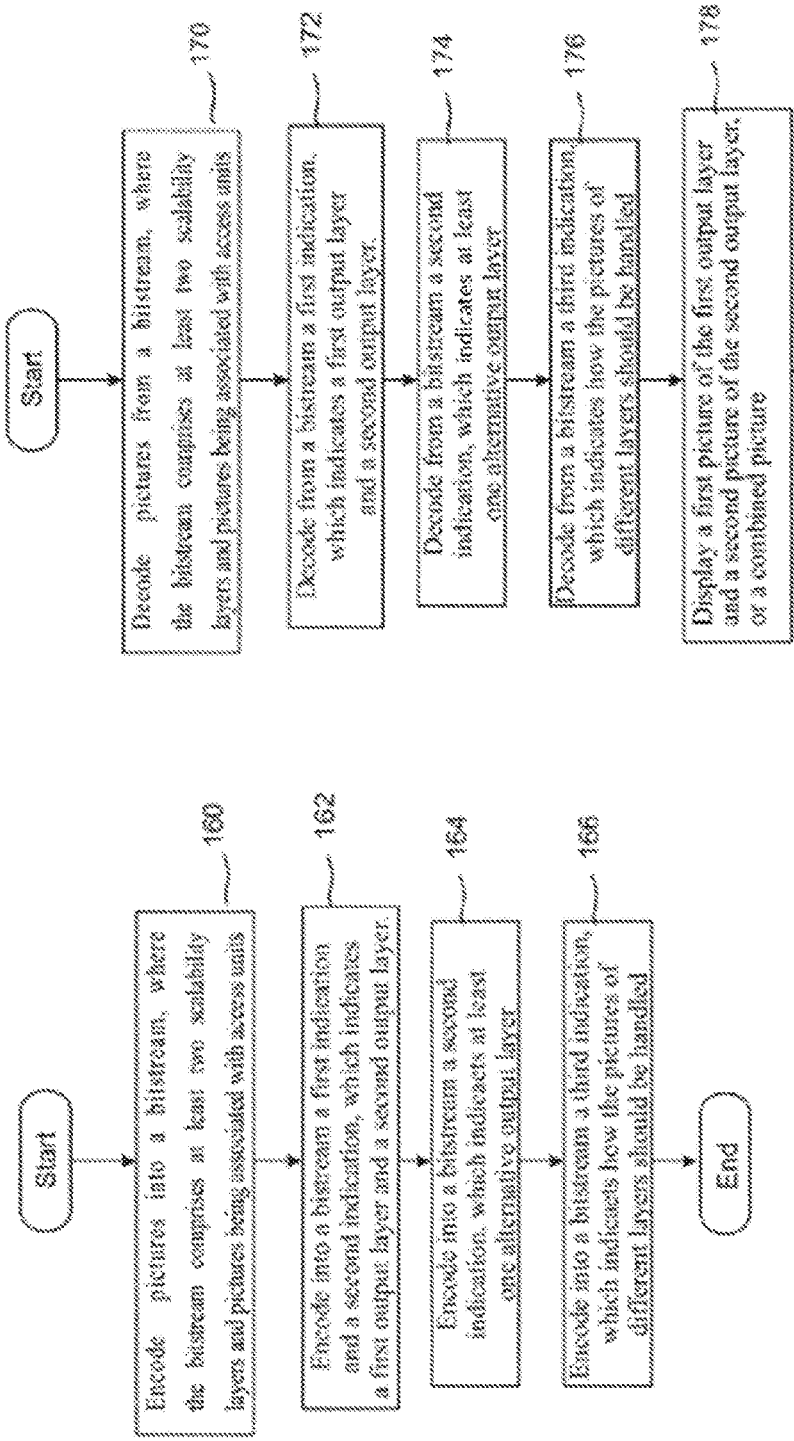

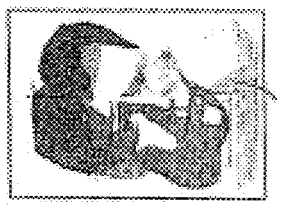
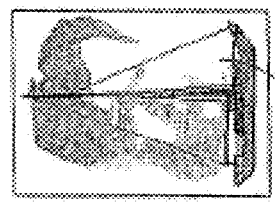
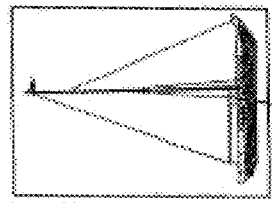
Fig. 18

METHOD AND APPARATUS FOR VIDEO CODING AND DECODING

TECHNICAL FIELD

The present application relates generally to an apparatus, a method and a computer program for video coding and decoding.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard H.264/AVC or the Multiview Video Coding MVC extension of H.264/AVC can be used.

SUMMARY

Some embodiments provide a method for encoding and decoding video information. In many embodiments, to indicate a composition of pictures of different time instants, some usability information may be embedded to the video bitstream indicating the intended display behavior when more than one layer is used and associated display behavior using this information. More specifically, the embedded information may indicate how the layers need to be composed in the video bitstream. In some embodiments the information to be embedded includes one or more of the following: The information may indicate if the intended display behaviour is to combine base layer and enhancement layer decoded pictures. The information may indicate that the base and enhancement layer decoded pictures are allowed to be overlaid. In addition or alternatively, the information may indicate that the enhancement layer picture should not be combined with base layer picture during display. One further option is that the information indicates that the intended display behaviour is to modify the decoded primary picture according to the decoded auxiliary pictures associated with the primary picture as determined by the type and indicated characteristics of the auxiliary pictures, or whether such modification is allowed but not always required. In some embodiments, the auxiliary picture layers and/or auxiliary picture types to which the information applies may be indicated.

Various aspects of examples of the invention are provided in the detailed description According to a first aspect, there is provided a method comprising:

encoding pictures into a bitstream, the bitstream comprising at least two scalability layers and pictures being associated with access units;

encoding, into the bitstream, an indication, which indicates an intended displaying behaviour, when the at least two scalability layers are output layers.

According to a second aspect of the present invention, there is provided a method comprising:

decoding pictures from a bitstream, the bitstream comprising at least two scalability layers and pictures being associated with access units;

decoding from the bitstream an indication, which indicates an intended displaying behaviour, when the at least two scalability layers are output layers; and displaying the at least two scalability layers according to the indication.

According to a third aspect of the present invention, there is provided an apparatus comprising at least one processor and at least one memory, said at least one memory stored with code thereon, which when executed by said at least one processor, causes an apparatus to perform at least the following:

encode pictures into a bitstream, the bitstream comprising at least two scalability layers and pictures being associated with access units;

encode, into the bitstream, an indication, which indicates an intended displaying behaviour, when the at least two scalability layers are output layers.

According to a fourth aspect of the present invention, there is provided an apparatus comprising at least one processor and at least one memory, said at least one memory stored with code thereon, which when executed by said at least one processor, causes an apparatus to perform at least the following:

decode pictures from a bitstream, the bitstream comprising at least two scalability layers and pictures being associated with access units;

decode from the bitstream an indication, which indicates an intended displaying behaviour, when the at least two scalability layers are output layers; and display the at least two scalability layers according to the indication.

According to a fifth aspect of the present invention, there is provided a computer program product embodied on a non-transitory computer readable medium, comprising computer program code configured to, when executed on at least one processor, cause an apparatus or a system to:

encode pictures into a bitstream, the bitstream comprising at least two scalability layers and pictures being associated with access units;

encode, into the bitstream, an indication, which indicates an intended displaying behaviour, when the at least two scalability layers are output layers.

According to a sixth aspect of the present invention, there is provided an computer program product comprising at least one processor and at least one memory, said at least one memory stored with code thereon, which when executed by said at least one processor, causes an apparatus or the system to perform at least the following:

decode pictures from a bitstream, the bitstream comprising at least two scalability layers and pictures being associated with access units;

decode from the bitstream an indication, which indicates an intended displaying behaviour, when the at least two scalability layers are output layers; and display the at least two scalability layers according to the indication.

In various embodiments, some usability information may be embedded to a video bitstream indicating the intended display behavior when more than one layer is used and associated display behavior using this information. Hence, a decoder may utilize the information when decoding and outputting pictures of a video bitstream.

BRIEF DESCRIPTION OF THE DRAWINGS

For a more complete understanding of example embodiments of the present invention, reference is now made to the following descriptions taken in connection with the accompanying drawings in which:

FIG. 4b shows schematically an embodiment of a spatial scalability encoding apparatus according to some embodiments;

FIG. 5b shows schematically an embodiment of a spatial scalability decoding apparatus according to some embodiments;

FIG. 6 illustrates an example of displaying two pictures on a display;

FIG. 7 shows an example of a picture consisting of two tiles;

FIG. 8 shows a simplified model of a DIBR-based 3DV system;

FIG. 9 shows a simplified 2D model of a stereoscopic camera setup;

FIG. 10 depicts an example of a current block and five spatial neighbors usable as motion prediction candidates;

FIG. 15a illustrates an example of how image frames of two different scenes may be placed on scalability layers during a scene transition;

FIG. 15b illustrates an example of a part of a picture stream provided in access units having two layers;

FIG. 16 illustrates an example method at an encoder;

FIG. 17 illustrates an example method at a decoder; and

FIG. 18 shows a scene transition that can be composed by means of the placement of image frames of different layers.

DETAILED DESCRIPTION OF SOME EXAMPLE EMBODIMENTS

Figure 2:
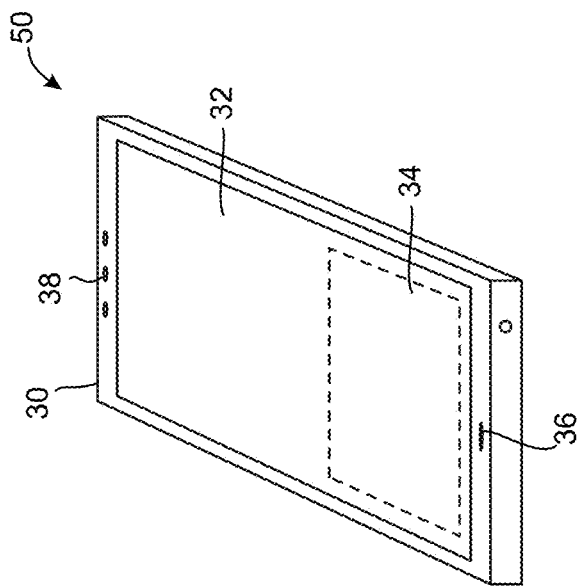
FIG. 2 shows schematically a user equipment suitable for employing some embodiments of the invention.

In the following, several embodiments of the invention will be described in the context of one video coding arrangement. It is to be noted, however, that the invention is not limited to this particular arrangement. In fact, the different embodiments have applications widely in any environment where improvement of reference picture handling is required. For example, the invention may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

In the following, several embodiments are described using the convention of referring to (de)coding, which indicates that the embodiments may apply to decoding and/or encoding.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding (which may be abbreviated HEVC or H.265/HEVC) standard was developed by the Joint Collaborative Team-Video Coding (JCT-VC) of VCEG and MPEG. Currently, the prepared version of the H.265/HEVC standard is being approved in ISO/IEC and ITU-T. The final standard will be published by both parent standardization organizations, and it is referred to as ITU-T Recommendation H.265 and ISO/IEC International Standard 23008-2, also known as MPEG-H Part 2 High Efficiency Video Coding (HEVC). There are currently ongoing standardization projects to develop extensions to H.265/HEVC, including scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

When describing H.264/AVC and HEVC as well as in example embodiments, common notation for arithmetic operators, logical operators, relational operators, bit-wise operators, assignment operators, and range notation e.g. as specified in H.264/AVC or HEVC may be used. Furthermore, common mathematical functions e.g. as specified in H.264/AVC or HEVC may be used and a common order of precedence and execution order (from left to right or from right to left) of operators e.g. as specified in H.264/AVC or HEVC may be used.

Some definitions used in codecs according to the invention may be made as follows:

syntax element: An element of data represented in the bitstream.

syntax structure: Zero or more syntax elements present together in the bitstream in a specified order.

parameter: A syntax element of a parameter set.

parameter set: A syntax structure which contains parameters and which can be referred to from another syntax structure for example using an identifier.

picture parameter set: A syntax structure containing syntax elements that apply to zero or more entire coded pictures as determined by a syntax element found in each slice header.

sequence parameter set: A syntax structure containing syntax elements that apply to zero or more entire coded video sequences as determined by a syntax element found in the picture parameter set referred to by another syntax element found in each slice header.

slice: a coding unit containing an integer number of elementary coding units within a coded picture.

elementary coding unit: a unit according to which a picture can be partitioned in slices; for example in some schemes, macroblocks or macroblock pairs within a coded picture; for example in some schemes, coding tree units.

slice header: A part of a coded slice containing the data elements pertaining to the first or all elementary coding units represented in the slice.

coded picture: A coded representation of a picture. A coded picture may be either a coded field or a coded frame.

coded representation: A data element as represented in its coded form.

When describing H.264/AVC and HEVC as well as in example embodiments, the following descriptors may be used to specify the parsing process of each syntax element.

b(8): byte having any pattern of bit string (8 bits).

se(v): signed integer Exp-Golomb-coded syntax element with the left bit first.

u(n): unsigned integer using n bits. When n is "v" in the syntax table, the number of bits varies in a manner dependent on the value of other syntax elements. The parsing process for this descriptor is specified by n next bits from the bitstream interpreted as a binary representation of an unsigned integer with the most significant bit written first.

ue(v): unsigned integer Exp-Golomb-coded syntax element with the left bit first.

An Exp-Golomb bit string may be converted to a code number (codeNum) for example using the following table:

| Bit string | codeNum |
| --- | --- |
| 1 | 0 |
| 010 | 1 |
| 011 | 2 |
| 00100 | 3 |
| 00101 | 4 |
| 00110 | 5 |
| 00111 | 6 |
| 0001000 | 7 |
| 0001001 | 8 |
| 0001010 | 9 |
| ... | ... |

A code number corresponding to an Exp-Golomb bit string may be converted to se(v) for example using the following table:

| codeNum | syntax element value |
| --- | --- |
| 0 | 0 |
| 1 | 1 |
| 2 | −1 |
| 3 | 2 |
| 4 | −2 |
| 5 | 3 |
| 6 | −3 |
| ... | ... |

When describing H.264/AVC and HEVC as well as in example embodiments, syntax structures, semantics of syntax elements, and decoding process may be specified as follows. Syntax elements in the bitstream may be represented in bold type. Each syntax element is described by its name (all lower case letters with underscore characters), optionally its one or two syntax categories, and one or two descriptors for its method of coded representation. The decoding process behaves according to the value of the syntax element and to the values of previously decoded syntax elements. When a value of a syntax element is used in the syntax tables or the text, it appears in regular (i.e., not bold) type. In some cases the syntax tables may use the values of other variables derived from syntax elements values. Such variables appear in the syntax tables, or text, named by a mixture of lower case and upper case letter and without any underscore characters. Variables starting with an upper case letter may be derived for the decoding of the current syntax structure and all depending syntax structures. Variables starting with an upper case letter may be used in the decoding process for later syntax structures without mentioning the originating syntax structure of the variable. Variables starting with a lower case letter may only be used within the context in which they are derived. In some cases, "mnemonic" names for syntax element values or variable values are used interchangeably with their numerical values. Sometimes "mnemonic" names are used without any associated numerical values. The association of values and names may be specified in the text. The names may be constructed from one or more groups of letters separated by an underscore character. Each group may start with an upper case letter and may contain more upper case letters.

When describing H.264/AVC and HEVC as well as in example embodiments, a syntax structure may be specified using the following. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in a draft HEVC standard—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. In H.264/AVC and HEVC, a picture may either be a frame or a field. A frame comprises a matrix of luma samples and corresponding chroma samples. A field is a set of alternate sample rows of a frame and may be used as encoder input, when the source signal is interlaced. Chroma pictures may be subsampled when compared to luma pictures. For example, in the 4:2:0 sampling pattern the spatial resolution of chroma pictures is half of that of the luma picture along both coordinate axes.

A partitioning may be defined as a division of a set into subsets such that each element of the set is in exactly one of the subsets. A picture partitioning may be defined as a division of a picture into smaller non-overlapping units. A block partitioning may be defined as a division of a block into smaller non-overlapping units, such as sub-blocks. In some cases term block partitioning may be considered to cover multiple levels of partitioning, for example partitioning of a picture into slices, and partitioning of each slice into smaller units, such as macroblocks of H.264/AVC. It is noted that the same unit, such as a picture, may have more than one partitioning. For example, a coding unit of a draft HEVC standard may be partitioned into prediction units and separately by another quadtree into transform units.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

During the course of HEVC standardization the terminology for example on picture partitioning units has evolved. In the next paragraphs, some non-limiting examples of HEVC terminology are provided.

In one draft version of the HEVC standard, pictures are divided into coding units (CU) covering the area of the picture. A CU consists of one or more prediction units (PU) defining the prediction process for the samples within the CU and one or more transform units (TU) defining the prediction error coding process for the samples in the CU. Typically, a CU consists of a square block of samples with a size selectable from a predefined set of possible CU sizes. A CU with the maximum allowed size is typically named as LCU (largest coding unit) and the video picture is divided into non-overlapping LCUs. An LCU can further be split into a combination of smaller CUs, e.g. by recursively splitting the LCU and resultant CUs. Each resulting CU may have at least one PU and at least one TU associated with it. Each PU and TU can further be split into smaller PUs and TUs in order to increase granularity of the prediction and prediction error coding processes, respectively. Each PU may have prediction information associated with it defining what kind of a prediction is to be applied for the pixels within that PU (e.g. motion vector information for inter predicted PUs and intra prediction directionality information for intra predicted PUs). Similarly, each TU may be associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU. In some embodiments the PU splitting can be realized by splitting the CU into four equal size square PUs or splitting the CU into two rectangle PUs vertically or horizontally in a symmetric or asymmetric way. The division of the image into CUs, and division of CUs into PUs and TUs may be signalled in the bitstream allowing the decoder to reproduce the intended structure of these units.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as a prediction reference for the forthcoming frames in the video sequence. The output process may be considered to be a process in which the decoder provides decoded and cropped pictures as the output of the decoding process. The output process is typically a part of video coding standards, typically as a part of the hypothetical reference decoder specification. The display process may be considered to be a process having, as its input, the cropped decoded pictures that are the output of the decoding process, and renders these pictures on a screen. The display process is typically not specified in video coding standards.

In a draft HEVC standard, a picture can be partitioned in tiles, which are rectangular and contain an integer number of LCUs. In a draft HEVC standard, the partitioning to tiles forms a regular grid, where heights and widths of tiles differ from each other by one LCU at the maximum. In a draft HEVC, a slice is defined to be an integer number of coding tree units contained in one independent slice segment and all subsequent dependent slice segments (if any) that precede the next independent slice segment (if any) within the same access unit. In a draft HEVC standard, a slice segment is defined to be an integer number of coding tree units ordered consecutively in the tile scan and contained in a single NAL unit. The division of each picture into slice segments is a partitioning. In a draft HEVC standard, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In a draft HEVC standard, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. In a draft HEVC, a slice consists of an integer number of CUs. The CUs are scanned in the raster scan order of LCUs within tiles or within a picture, if tiles are not in use. Within an LCU, the CUs have a specific scan order.

A basic coding unit in a HEVC working draft 5 (WD5) is a treeblock. A treeblock is an N×N block of luma samples and two corresponding blocks of chroma samples of a picture that has three sample arrays, or an N×N block of samples of a monochrome picture or a picture that is coded using three separate colour planes. A treeblock may be partitioned for different coding and decoding processes. A treeblock partition is a block of luma samples and two corresponding blocks of chroma samples resulting from a partitioning of a treeblock for a picture that has three sample arrays or a block of luma samples resulting from a partitioning of a treeblock for a monochrome picture or a picture that is coded using three separate colour planes. Each treeblock is assigned a partition signalling to identify the block sizes for intra or inter prediction and for transform coding. The partitioning is a recursive quadtree partitioning. The root of the quadtree is associated with the treeblock. The quadtree is split until a leaf is reached, which is referred to as the coding node. The coding node is the root node of two trees, the prediction tree and the transform tree. The prediction tree specifies the position and size of prediction blocks. The prediction tree and associated prediction data are referred to as a prediction unit. The transform tree specifies the position and size of transform blocks. The transform tree and associated transform data are referred to as a transform unit. The splitting information for luma and chroma is identical for the prediction tree and may or may not be identical for the transform tree. The coding node and the associated prediction and transform units form together a coding unit.

In a HEVC WD5, pictures are divided into slices and tiles. A slice may be a sequence of treeblocks but (when referring to a so-called fine granular slice) may also have its boundary within a treeblock at a location where a transform unit and prediction unit coincide. Treeblocks within a slice are coded and decoded in a raster scan order. For the primary coded picture, the division of each picture into slices is a partitioning.

In a HEVC WD5, a tile is defined as an integer number of treeblocks co-occurring in one column and one row, ordered consecutively in the raster scan within the tile. For the primary coded picture, the division of each picture into tiles is a partitioning. Tiles are ordered consecutively in the raster scan within the picture. Although a slice contains treeblocks that are consecutive in the raster scan within a tile, these treeblocks are not necessarily consecutive in the raster scan within the picture. Slices and tiles need not contain the same sequence of treeblocks. A tile may comprise treeblocks contained in more than one slice. Similarly, a slice may comprise treeblocks contained in several tiles.

A distinction between coding units and coding treeblocks may be defined for example as follows. A slice may be defined as a sequence of one or more coding tree units (CTU) in raster-scan order within a tile or within a picture if tiles are not in use. Each CTU may comprise one luma coding treeblock (CTB) and possibly (depending on the chroma format being used) two chroma CTBs. A CTU may be defined as a coding tree block of luma samples, two corresponding coding tree blocks of chroma samples of a picture that has three sample arrays, or a coding tree block of samples of a monochrome picture or a picture that is coded using three separate colour planes and syntax structures used to code the samples. The division of a slice into coding tree units may be regarded as a partitioning. A CTB may be defined as an N×N block of samples for some value of N. The division of one of the arrays that compose a picture that has three sample arrays or of the array that compose a picture in monochrome format or a picture that is coded using three separate colour planes into coding tree blocks may be regarded as a partitioning. A coding block may be defined as an N×N block of samples for some value of N. The division of a coding tree block into coding blocks may be regarded as a partitioning.

In HEVC, a slice may be defined as an integer number of coding tree units contained in one independent slice segment and all subsequent dependent slice segments (if any) that precede the next independent slice segment (if any) within the same access unit. An independent slice segment may be defined as a slice segment for which the values of the syntax elements of the slice segment header are not inferred from the values for a preceding slice segment. A dependent slice segment may be defined as a slice segment for which the values of some syntax elements of the slice segment header are inferred from the values for the preceding independent slice segment in decoding order. In other words, only the independent slice segment may have a "full" slice header. An independent slice segment may be conveyed in one NAL unit (without other slice segments in the same NAL unit) and likewise a dependent slice segment may be conveyed in one NAL unit (without other slice segments in the same NAL unit).

In HEVC, a coded slice segment may be considered to comprise a slice segment header and slice segment data. A slice segment header may be defined as part of a coded slice segment containing the data elements pertaining to the first or all coding tree units represented in the slice segment. A slice header may be defined as the slice segment header of the independent slice segment that is a current slice segment or the most recent independent slice segment that precedes a current dependent slice segment in decoding order. Slice segment data may comprise an integer number of coding tree unit syntax structures.

FIG. 7 shows an example of a picture consisting of two tiles partitioned into square coding units (solid lines) which have further been partitioned into rectangular prediction units (dashed lines).

In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring macroblock or CU may be regarded as unavailable for intra prediction, if the neighboring macroblock or CU resides in a different slice.

A syntax element may be defined as an element of data represented in the bitstream. A syntax structure may be defined as zero or more syntax elements present together in the bitstream in a specified order.

The elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to, for example, enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit and whether a coded slice contained in the NAL unit is a part of a reference picture or a non-reference picture.

H.264/AVC NAL unit header includes a 2-bit nal_ref_idc syntax element, which when equal to 0 indicates that a coded slice contained in the NAL unit is a part of a non-reference picture and when greater than 0 indicates that a coded slice contained in the NAL unit is a part of a reference picture. The header for SVC and MVC NAL units may additionally contain various indications related to the scalability and multiview hierarchy.

In HEVC, a two-byte NAL unit header is used for all specified NAL unit types. The NAL unit header contains one reserved bit, a six-bit NAL unit type indication (called nal_unit_type), a six-bit reserved field (called nuh_layer_id) and a three-bit temporal_id_plus1 indication for temporal level. The temporal_id_plus1 syntax element may be regarded as a temporal identifier for the NAL unit, and a zero-based TemporalId variable may be derived as follows: TemporalId=temporal_id_plus1−1. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to TID does not use any picture having a TemporalId greater than TID as inter prediction reference. A sub-layer or a temporal sub-layer may be defined to be a temporal scalable layer of a temporal scalable bitstream, consisting of VCL NAL units with a particular value of the TemporalId variable and the associated non-VCL NAL units. Without loss of generality, in some example embodiments a variable LayerId is derived from the value of nuh_layer_id for example as follows: LayerId=nuh_layer_id. In the following, layer identifier, LayerId, nuh_layer_id and layer_id are used interchangeably unless otherwise indicated.

It is expected that in HEVC extensions nuh_layer_id and/or similar syntax elements in NAL unit header would carry information on the scalability hierarchy. For example, the LayerId value nuh_layer_id and/or similar syntax elements may be mapped to values of variables or syntax elements describing different scalability dimensions, such as quality_id or similar, dependency_id or similar, any other type of layer identifier, view order index or similar, view identifier, an indication whether the NAL unit concerns depth or texture i.e. depth_flag or similar, or an identifier similar to priority_id of SVC indicating a valid sub-bitstream extraction if all NAL units greater than a specific identifier value are removed from the bitstream. nuh_layer_id and/or similar syntax elements may be partitioned into one or more syntax elements indicating scalability properties. For example, a certain number of bits among nuh_layer_id and/or similar syntax elements may be used for dependency_id or similar, while another certain number of bits among nuh_layer_id and/or similar syntax elements may be used for quality_id or similar. Alternatively, a mapping of LayerId values or similar to values of variables or syntax elements describing different scalability dimensions may be provided for example in a Video Parameter Set, a Sequence Parameter Set or another syntax structure.

NAL units can be categorized into Video Coding Layer (VCL) NAL units and non-VCL NAL units. VCL NAL units are typically coded slice NAL units. In H.264/AVC, coded slice NAL units contain syntax elements representing one or more coded macroblocks, each of which corresponds to a block of samples in the uncompressed picture. In a draft HEVC standard, coded slice NAL units contain syntax elements representing one or more CU.

In H.264/AVC a coded slice NAL unit can be indicated to be a coded slice in an Instantaneous Decoding Refresh (IDR) picture or coded slice in a non-IDR picture.

In a draft HEVC standard, a coded slice NAL unit can be indicated to be one of the following types.

| Name of nal_unit_type | nal_unit_type | Content of NAL unit and RBSP syntax structure |
|---|---|---|
| 0, 1 | TRAIL_N, TRAIL_R | Coded slice segment of a non-TSA, non-STSA trailing picture slice_segment_layer_rbsp( ) |

-continued

| Name of nal_unit_type | nal_unit_type | Content of NAL unit and RBSP syntax structure |
|---|---|---|
| 2, | TSA_N, | Coded slice segment of a TSA picture |
| 3 | TSA_R | slice_segment_layer_rbsp( ) |
| 4, | STSA_N, | Coded slice segment of an STSA picture |
| 5 | STSA_R | slice_layer_rbsp( ) |
| 6, | RADL_N, | Coded slice segment of a RADL picture |
| 7 | RADL_R | slice_layer_rbsp( ) |
| 8, | RASL_N, | Coded slice segment of a RASL picture |
| 9 | RASL_R, | slice_layer_rbsp( ) |
| 10, | RSV_VCL_N10 | Reserved // reserved non-RAP non-reference VCL NAL unit types |
| 12, | RSV_VCL_N12 | |
| 14 | RSV_VCL_N14 | |
| 11, | RSV_VCL_R11 | Reserved // reserved non-RAP reference VCL NAL unit types |
| 13, | RSV_VCL_R13 | |
| 15 | RSV_VCL_R15 | |
| 16, | BLA_W_LP | Coded slice segment of a BLA picture |
| 17, | BLA_W_DLP | slice_segment_layer_rbsp( ) [Ed. (YK): BLA_W_DLP -> BLA_W_RADL?] |
| 18 | BLA_N_LP | |
| 19, | IDR_W_DLP | Coded slice segment of an IDR picture |
| 20 | IDR_N_LP | slice_segment_layer_rbsp( ) |
| 21 | CRA_NUT | Coded slice segment of a CRA picture slice_segment_layer_rbsp( ) |
| 22, | RSV_RAP_VCL22 . . . | Reserved // reserved RAP VCL NAL unit types |
| 23 | RSV_RAP_VCL23 | |
| 24 . . . 31 | RSV_VCL24 . . . RSV_VCL31 | Reserved // reserved non-RAP VCL NAL unit types |

Abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also or alternatively be referred to as intra random access point (IRAP) picture, is a picture where each slice or slice segment has nal_unit_type in the range of 16 to 23, inclusive. A RAP picture contains only intra-coded slices (in an independently coded layer), and may be a BLA picture, a CRA picture or an IDR picture. The first picture in the bitstream is a RAP picture. Provided the necessary parameter sets are available when they need to be activated, the RAP picture and all subsequent non-RASL pictures in decoding order can be correctly decoded without performing the decoding process of any pictures that precede the RAP picture in decoding order. There may be pictures in a bitstream that contain only intra-coded slices that are not RAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some earlier drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture. In some earlier drafts of the HEVC standard, a RADL picture was referred to a Decodable Leading Picture (DLP).

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream. IDR_W_DLP may also be referred to as IDR_W_RADL.

In HEVC, there are two NAL unit types for many picture types (e.g. TRAIL_R, TRAIL_N), differentiated whether the picture may be used as reference for inter prediction in subsequent pictures in decoding order in the same sub-layer. Sub-layer non-reference picture (often denoted by _N in the picture type acronyms) may be defined as picture that contains samples that cannot be used for inter prediction in the decoding process of subsequent pictures of the same sub-layer in decoding order. Sub-layer non-reference pictures may be used as reference for pictures with a greater TemporalId value. Sub-layer reference picture (often denoted by _R in the picture type acronyms) may be defined as picture that may be used as reference for inter prediction in the decoding process of subsequent pictures of the same sub-layer in decoding order.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in a draft HEVC standard, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

Pictures of any coding type (I, P, B) can be reference pictures or non-reference pictures in H.264/AVC and HEVC. Slices within a picture may have different coding types.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

In scalable and/or multiview video coding, at least the following principles for encoding pictures and/or access units with random access property may be supported.

- A RAP picture within a layer may be an intra-coded picture without inter-layer/inter-view prediction. Such a picture enables random access capability to the layer/view it resides.
- A RAP picture within an enhancement layer may be a picture without inter prediction (i.e. temporal prediction) but with inter-layer/inter-view prediction allowed. Such a picture enables starting the decoding of the layer/view the picture resides provided that all the reference layers/views are available. In single-loop decoding, it may be sufficient if the coded reference layers/views are available (which can be the case e.g. for IDR pictures having dependency_id greater than 0 in SVC). In multi-loop decoding, it may be needed that the reference layers/views are decoded. Such a picture may, for example, be referred to as a stepwise layer access (STLA) picture or an enhancement layer RAP picture.
- An anchor access unit or a complete RAP access unit may be defined to include only intra-coded picture(s) and STLA pictures in all layers. In multi-loop decoding, such an access unit enables random access to all layers/views. An example of such an access unit is the MVC anchor access unit (among which type the IDR access unit is a special case).
- A stepwise RAP access unit may be defined to include a RAP picture in the base layer but need not contain a RAP picture in all enhancement layers. A stepwise RAP access unit enables starting of base-layer decoding, while enhancement layer decoding may be started when the enhancement layer contains a RAP picture, and (in the case of multi-loop decoding) all its reference layers/views are decoded at that point.

In a scalable extension of HEVC or any scalable extension for a single-layer coding scheme similar to HEVC, RAP pictures may be specified to have one or more of the following properties.

- NAL unit type values of the RAP pictures with nuh_layer_id greater than 0 may be used to indicate enhancement layer random access points.
- An enhancement layer RAP picture may be defined as a picture that enables starting the decoding of that enhancement layer when all its reference layers have been decoded prior to the EL RAP picture.
- Inter-layer prediction may be allowed for CRA NAL units with nuh_layer_id greater than 0, while inter prediction is disallowed.

CRA NAL units need not be aligned across layers. In other words, a CRA NAL unit type can be used for all VCL NAL units with a particular value of nuh_layer_id while another NAL unit type can be used for all VCL NAL units with another particular value of nuh_layer_id in the same access unit.

BLA pictures have nuh_layer_id equal to 0.

IDR pictures may have nuh_layer_id greater than 0 and they may be inter-layer predicted while inter prediction is disallowed.

IDR pictures are present in an access unit either in no layers or in all layers, i.e. an IDR nal_unit_type indicates a complete IDR access unit where decoding of all layers can be started.

An STLA picture (STLA_W_DLP and STLA_N_LP) may be indicated with NAL unit types BLA_W_DLP and BLA_N_LP, respectively, with nuh_layer_id greater than 0. An STLA picture may be otherwise identical to an IDR picture with nuh_layer_id greater than 0 but needs not be aligned across layers.

After a BLA picture at the base layer, the decoding of an enhancement layer is started when the enhancement layer contains a RAP picture and the decoding of all of its reference layers has been started.

When the decoding of an enhancement layer starts from a CRA picture, its RASL pictures are handled similarly to RASL pictures of a BLA picture.

Layer down-switching or unintentional loss of reference pictures is identified from missing reference pictures, in which case the decoding of the related enhancement layer continues only from the next RAP picture on that enhancement layer.

A non-VCL NAL unit may be for example one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. There are three NAL units specified in H.264/AVC to carry sequence parameter sets: the sequence parameter set NAL unit (having NAL unit type equal to 7) containing all the data for H.264/AVC VCL NAL units in the sequence, the sequence parameter set extension NAL unit containing the data for auxiliary coded pictures, and the subset sequence parameter set for MVC and SVC VCL NAL units. The syntax structure included in the sequence parameter set NAL unit of H.264/AVC (having NAL unit type equal to 7) may be referred to as sequence parameter set data, seq_parameter_set_data, or base SPS data. For example, profile, level, the picture size and the chroma sampling format may be included in the base SPS data. A picture parameter set contains such parameters that are likely to be unchanged in several coded pictures.

HEVC also includes another type of a parameter set, called a video parameter set (VPS). A video parameter set RBSP may include parameters that can be referred to by one or more sequence parameter set RBSPs.

The relationship and hierarchy between VPS, SPS, and PPS may be described as follows. VPS resides one level above SPS in the parameter set hierarchy and in the context of scalability and/or 3DV. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. In a scalable extension of HEVC, VPS may for example include a mapping of the LayerId value derived from the NAL unit header to one or more scalability dimension values, for example correspond to dependency_id, quality_id, view_id, and depth_flag for the layer defined similarly to SVC and MVC. VPS may include profile and level information for one or more layers as well as the profile and/or level for one or more temporal sub-layers (consisting of VCL NAL units at and below certain TemporalId values) of a layer representation.

An example syntax of a VPS extension intended to be a part of the VPS is provided in the following. The presented VPS extension provides the dependency relationships among other things.

|  | Descriptor |
|---|---|
| vps_extension( ) { | |
|   while( !byte_aligned( ) ) | |
|     vps_extension_byte_alignment_reserved_one_bit | u(1) |
|   for( i = 0, numScalabilityTypes = 0; i <16; i++) { | |
|     scalability_mask[ i ] | u(1) |
|     numScalabilityTypes += scalability_mask[ i ] | |
|   } | |
|   for( j = 0; j <numScalabilityTypes; j++) | |
|     dimension_id_len_minus1[ j ] | u(3) |
|   vps_nuh_layer_id_present_flag | u(1) |
|   for( i = 1; i <= vps_max_layers_minus1; i++) { | |
|     if( vps_nuh_layer_id_present_flag ) | |
|       layer_id_in_nuh[ i ] | u(6) |
|     for( j =0; j < numScalabilityTypes; j++) | |
|       dimension_id[ i ][ j ] | u(v) |
|   } | |
|   for( i = 1; i <= vps_max_layers_minus1; i++) { | |
|     num_direct_ref_layers+ i + | u(6) |
|     for( j =0; j <num_direct_ref_layersl[ i ]; j++ ) | |
|       ref_layer_id[ i ][ j ] | u(6) |
|   } | |
| } | |

The semantics of the presented VPS extension may be specified as described in the following paragraphs.

vps_extension_byte_alignment_reserved_one_bit is equal to 1 and is used to achieve byte alignment. scalability_mask[i] equal to 1 indicates that dimension_id syntax elements corresponding to the i-th scalability dimension in the table below are present. scalability_mask[i] equal to 0 indicates that dimension_id syntax elements corresponding to the i-th scalability dimension are not present.

| scalability_mask index | Scalability dimension | ScalabilityId mapping |
|---|---|---|
| 0 | reference index based spatial or quality scalability | DependencyId |
| 1 | depth | DepthFlag |
| 2 | multiview | ViewId |
| 3-15 | Reserved | | dimension_id_len_minus1[j] plus1 specifies the length, in bits, of the dimension_id[i][j] syntax element. vps_nuh_layer_id_present_flag specifies whether the layer_id_in_nuh[i] syntax is present. layer_id_in_nuh[i] specifies the value of the nuh_layer_id syntax element in VCL NAL units of the i-th layer. When not present, the value of layer_id_in_nuh[i] is inferred to be equal to i. The variable LayerIdInVps [layer_id_in_nuh[i]] is set equal to i dimension_id[i][j] specifies the identifier of the j-th scalability dimension type of the i-th layer. When not present, the value of dimension_id[i][j] is inferred to be equal to 0. The number of bits used for the representation of dimension_id[i][j] is dimension_id_len_minus1[j]+1 bits. The variables ScalabilityId[layerIdInVps][scalabilityMaskIndex], DependencyId[layerIdInNuh], DepthFlag[layerIdInNuh], and ViewOrderIdx[layerIdInNuh] are derived as follows:

```
for (i = 0; i <= vps_max_layers_minus1; i++) {
  for( smIdx= 0, j =0; smIdx< 16; smIdx ++ )
    if( ( i != 0) && scalability_mask[ smIdx ] )
      ScalabilityId[ i ][ smIdx ] = dimension_id[ i ][ j++ ]
    else
      ScalabilityId[ i ][ smIdx ] = 0
  DependencyId[ layer_id_in_nuh[ i ] ] = ScalabilityId[ i ][ 0 ]
  DepthFlag[ layer_id_in_nuh[ i ] ] = ScalabilityId[ i ][ 1 ]
  ViewId[ layer_id_in_nuh[ i ] ] = ScalabilityId[ i ][ 2 ]
}
``` num_direct_ref_layers[i] specifies the number of layers the i-th layer directly references.

H.264/AVC and HEVC syntax allows many instances of parameter sets, and each instance is identified with a unique identifier. In order to limit the memory usage needed for parameter sets, the value range for parameter set identifiers has been limited. In H.264/AVC and a draft HEVC standard, each slice header includes the identifier of the picture parameter set that is active for the decoding of the picture that contains the slice, and each picture parameter set contains the identifier of the active sequence parameter set. In a HEVC standard, a slice header additionally contains an APS identifier. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets "out-of-band" using a more reliable transmission mechanism compared to the protocols used for the slice data. For example, parameter sets can be included as a parameter in the session description for Real-time Transport Protocol (RTP) sessions. If parameter sets are transmitted in-band, they can be repeated to improve error robustness.

A parameter set may be activated by a reference from a slice or from another active parameter set or in some cases from another syntax structure such as a buffering period SEI message. In the following, non-limiting examples of activation of parameter sets in a draft HEVC standard are given.

Each adaptation parameter set RBSP is initially considered not active at the start of the operation of the decoding process. At most one adaptation parameter set RBSP is considered active at any given moment during the operation of the decoding process, and the activation of any particular adaptation parameter set RBSP results in the deactivation of the previously-active adaptation parameter set RBSP (if any).

When an adaptation parameter set RBSP (with a particular value of aps_id) is not active and it is referred to by a coded slice NAL unit (using that value of aps_id), it is activated. This adaptation parameter set RBSP is called the active adaptation parameter set RBSP until it is deactivated by the activation of another adaptation parameter set RBSP. An adaptation parameter set RBSP, with that particular value of aps_id, is available to the decoding process prior to its activation, included in at least one access unit with temporal_id equal to or less than the temporal_id of the adaptation parameter set NAL unit, unless the adaptation parameter set is provided through external means.

Each picture parameter set RBSP is initially considered not active at the start of the operation of the decoding process. At most one picture parameter set RBSP is considered active at any given moment during the operation of the decoding process, and the activation of any particular picture parameter set RBSP results in the deactivation of the previously-active picture parameter set RBSP (if any).

When a picture parameter set RBSP (with a particular value of pic_parameter_set_id) is not active and it is referred to by a coded slice NAL unit or coded slice data partition A NAL unit (using that value of pic_parameter_set_id), it is activated. This picture parameter set RBSP is called the active picture parameter set RBSP until it is deactivated by the activation of another picture parameter set RBSP. A picture parameter set RBSP, with that particular value of pic_parameter_set_id, is available to the decoding process prior to its activation, included in at least one access unit with temporal_id equal to or less than the temporal_id of the picture parameter set NAL unit, unless the picture parameter set is provided through external means.

Each sequence parameter set RBSP is initially considered not active at the start of the operation of the decoding process. At most one sequence parameter set RBSP is considered active at any given moment during the operation of the decoding process, and the activation of any particular sequence parameter set RBSP results in the deactivation of the previously-active sequence parameter set RBSP (if any).

When a sequence parameter set RBSP (with a particular value of seq_parameter_set_id) is not already active and it is referred to by activation of a picture parameter set RBSP (using that value of seq_parameter_set_id) or is referred to by an SEI NAL unit containing a buffering period SEI message (using that value of seq_parameter_set_id), it is activated. This sequence parameter set RBSP is called the active sequence parameter set RBSP until it is deactivated by the activation of another sequence parameter set RBSP. A sequence parameter set RBSP, with that particular value of seq_parameter_set_id is available to the decoding process prior to its activation, included in at least one access unit with temporal_id equal to 0, unless the sequence parameter set is provided through external means. An activated sequence parameter set RBSP remains active for the entire coded video sequence.

Each video parameter set RBSP is initially considered not active at the start of the operation of the decoding process. At most one video parameter set RBSP is considered active at any given moment during the operation of the decoding process, and the activation of any particular video parameter set RBSP results in the deactivation of the previously-active video parameter set RBSP (if any).

When a video parameter set RBSP (with a particular value of video_parameter_set_id) is not already active and it is referred to by activation of a sequence parameter set RBSP (using that value of video_parameter_set_id), it is activated. This video parameter set RBSP is called the active video parameter set RBSP until it is deactivated by the activation of another video parameter set RBSP. A video parameter set RBSP, with that particular value of video_parameter_set_id is available to the decoding process prior to its activation, included in at least one access unit with temporal_id equal to 0, unless the video parameter set is provided through external means. An activated video parameter set RBSP remains active for the entire coded video sequence.

During operation of the decoding process in a draft HEVC standard, the values of parameters of the active video parameter set, the active sequence parameter set, the active picture parameter set RBSP and the active adaptation parameter set RBSP are considered in effect. For interpretation of SEI messages, the values of the active video parameter set, the active sequence parameter set, the active picture parameter set RBSP and the active adaptation parameter set RBSP for the operation of the decoding process for the VCL NAL units of the coded picture in the same access unit are considered in effect unless otherwise specified in the SEI message semantics.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

Several nesting SEI messages have been specified in the AVC and HEVC standards or proposed otherwise. The idea of nesting SEI messages is to contain one or more SEI messages within a nesting SEI message and provide a mechanism for associating the contained SEI messages with a subsets of the bitstream and/or a subset of decoded data. It may be required that a nesting SEI message contains one or more SEI messages that are not nesting SEI messages themselves. An SEI message contained in a nesting SEI message may be referred to as a nested SEI message. An SEI message not contained in a nesting SEI message may be referred to as a non-nested SEI message. The scalable nesting SEI message of HEVC enables to identify either a bitstream subset (resulting from a sub-bitstream extraction process) or a set of layers to which the nested SEI messages apply. A bitstream subset may also be referred to as a sub-bitstream.

A coded picture is a coded representation of a picture. A coded picture in H.264/AVC comprises the VCL NAL units that are required for the decoding of the picture. In H.264/AVC, a coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded. In a draft HEVC, no redundant coded picture has been specified.

Term temporal instant or time instant or time instance or time entity may be defined to represent a same capturing time or output time or output order. For example, if a first view component of a first view is captured at the same time as a second view component in a second view, these two view components may be considered to be of the same time instant. An access unit may be defined to contain pictures (or view components) of the same time instant, and hence in this case pictures residing in an access unit may be considered to be of the same time instant. Pictures of the same time instant may be indicated (e.g. by the encoder) using multiple means and may be identified (e.g. by the decoding) using multiple means, such as a picture order count (POC) value or a timestamp (e.g. an output timestamp).

In H.264/AVC, an access unit comprises a primary coded picture and those NAL units that are associated with it. In H.264/AVC, the appearance order of NAL units within an access unit is constrained as follows. An optional access unit delimiter NAL unit may indicate the start of an access unit. It is followed by zero or more SEI NAL units. The coded slices of the primary coded picture appear next. In H.264/AVC, the coded slice of the primary coded picture may be followed by coded slices for zero or more redundant coded pictures. A redundant coded picture is a coded representation of a picture or a part of a picture. A redundant coded picture may be decoded if the primary coded picture is not received by the decoder for example due to a loss in transmission or a corruption in physical storage medium.

In H.264/AVC, an access unit may also include an auxiliary coded picture, which is a picture that supplements the primary coded picture and may be used for example in the display process. An auxiliary coded picture may for example be used as an alpha channel or alpha plane specifying the transparency level of the samples in the decoded pictures. An alpha channel or plane may be used in a layered composition or rendering system, where the output picture is formed by overlaying pictures being at least partly transparent on top of each other. An auxiliary coded picture has the same syntactic and semantic restrictions as a monochrome redundant coded picture. In H.264/AVC, an auxiliary coded picture contains the same number of macroblocks as the primary coded picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain one or more coded pictures with different values of nuh_layer_id. In addition to containing the VCL NAL units of the coded picture, an access unit may also contain non-VCL NAL units.

In the present draft of MV-HEVC, auxiliary pictures may be encoded in a bitstream using auxiliary picture layers. An auxiliary picture layer is associated with its own scalability dimension value, AuxId (similarly to e.g. view order index). Layers with AuxId greater than 0 contain auxiliary pictures. A layer carries only one type of auxiliary pictures, and the type of auxiliary pictures included in a layer is indicated by its AuxId value. In other words, AuxId values are mapped to types of auxiliary pictures. For example, AuxId equal to 1 may indicate alpha planes and AuxId equal to 2 may indicate depth pictures. An auxiliary picture may be defined as a picture that has no normative effect on the decoding process of primary pictures. In other words, primary pictures (with AuxId equal to 0) do not predict from auxiliary pictures. An auxiliary picture may predict from a primary picture, although there may be constraints disallowing such prediction, for example based on the AuxId value. SEI messages may be used to convey more detailed characteristics of auxiliary picture layers, such as the depth range represented by a depth auxiliary layer. The present draft of MV-HEVC includes support of depth auxiliary layers.

Different types of auxiliary pictures may be used including but not limited to the following: Depth pictures; Alpha pictures; Overlay pictures; and Label pictures. In Depth pictures a sample value represents disparity between the viewpoint (or camera position) of the depth picture or depth or distance. In Alpha pictures (a.k.a. alpha planes and alpha matte pictures) a sample value represents transparency or opacity. Alpha pictures may indicate for each pixel a degree of transparency or equivalently a degree of opacity. Alpha pictures may be monochrome pictures or the chroma components of alpha pictures may be set to indicate no chromaticity (e.g. 0 when chroma samples values are considered to be signed or 128 when chroma samples values are 8-bit and considered to be unsigned).

Overlay pictures may be overlaid on top of the primary pictures in displaying. Overlay pictures may contain several regions and background, where all or a subset of regions may be overlaid in displaying and the background is not overlaid.

Label pictures contain different labels for different overlay regions, which can be used to identify single overlay regions.

Figure 14A:
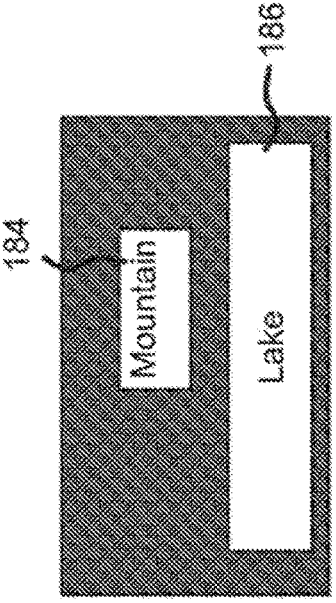
FIGS. 14a to 14d illustrate some auxiliary picture types.
Figure 14B:
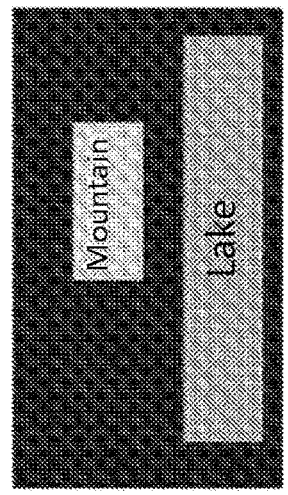
Figure 14C:
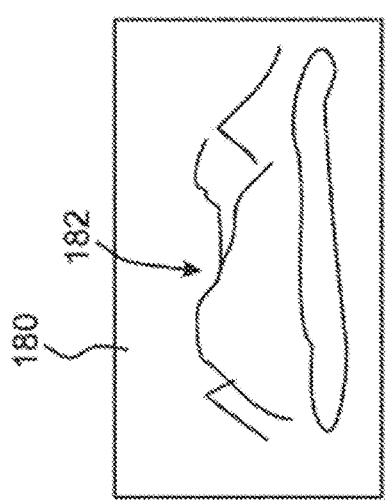
Figure 14D:
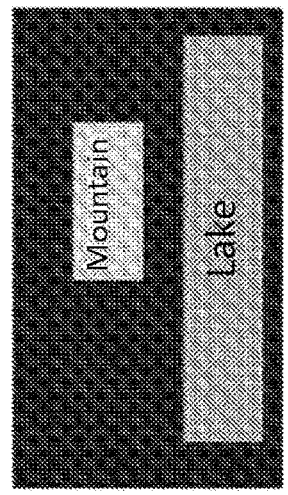

Some auxiliary picture types are illustrated in FIGS. 14*a* to 14*d*. FIG. 14*a* depicts an example of a 2D video picture 180 in which a scenery 182 comprising a lake and mountains is depicted. FIG. 14*b* illustrates an example of an overlay picture for the picture of FIG. 14*a*. Some regions of interest 184, 186 are shown having some text inside. FIG. 14*c* illustrates an example of a labels picture corresponding the regions of interest of FIG. 14*b*. FIG. 14*d* illustrates an example of an alpha matte picture for the picture of FIG. 14*a* and the regions of interest of FIG. 14*b*.

Many video coding standards specify buffering models and buffering parameters for bitstreams. Such buffering models may be called Hypothetical Reference Decoder (HRD) or Video Buffer Verifier (VBV). A standard compliant bitstream complies with the buffering model with a set of buffering parameters specified in the corresponding standard. Such buffering parameters for a bitstream may be explicitly or implicitly signaled. 'Implicitly signaled' means for example that the default buffering parameter values according to the profile and level apply. The HRD/VBV parameters are used, among other things, to impose constraints on the bit rate variations of compliant bitstreams.

Video coding standards use variable-bitrate coding, which is caused for example by the flexibility of the encoder to select adaptively between intra and inter coding techniques for compressing video frames. To handle fluctuation in the bitrate variation of the compressed video, buffering may be used at the encoder and decoder side. Hypothetical Reference Decoder (HRD) may be regarded as a hypothetical decoder model that specifies constraints on the variability within conforming bitstreams, conforming NAL unit streams or conforming byte streams that an encoding process may produce.

A bitstream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback.

An HRD may be a part of an encoder or operationally connected to the output of the encoder. The buffering occupancy and possibly other information of the HRD may be used to control the encoding process. For example, if a coded data buffer in the HRD is about to overflow, the encoding bitrate may be reduced for example by increasing a quantizer step size.

The operation of the HRD may be controlled by HRD parameters, such as buffer size(s) and initial delay(s). The HRD parameter values may be created as part of the HRD process included or operationally connected to encoding. Alternatively, HRD parameters may be generated separately from encoding, for example in an HRD verifier that processes the input bitstream with the specified HRD process and generates such HRD parameter values according to which the bitstream in conforming. Another use for an HRD verifier is to verify that a given bitstream and given HRD parameters actually result into a conforming HRD operation and output.

HRD conformance checking may concern for example the following two types of bitstreams: The first such type of bitstream, called Type I bitstream, is a NAL unit stream containing only the VCL NAL units and filler data NAL units for all access units in the bitstream. The second type of bitstream, called a Type II bitstream, may contain, in addition to the VCL NAL units and filler data NAL units for all access units in the bitstream, additional non-VCL NAL units other than filler data NAL units and/or syntax elements such as leading_zero_8 bits, zero_byte, start_code_prefix_one_3 bytes, and trailing_zero_8 bits that form a byte stream from the NAL unit stream.

Two types of HRD parameters (NAL HRD parameters and VCL HRD parameters) may be used. The HRD parameters may be indicated through video usability information included in the sequence parameter set syntax structure. The HRD parameters may, for example, include buffer size and input bitrate.

Buffering and picture timing parameters (e.g. included in sequence parameter sets and picture parameter sets referred to in the VCL NAL units and in buffering period and picture timing SEI messages) may be conveyed to the HRD, in a timely manner, either in the bitstream (by non-VCL NAL units), or by out-of-band means externally from the bitstream e.g. using a signalling mechanism, such as media parameters included in the media line of a session description formatted e.g. according to the Session Description Protocol (SDP). For the purpose of counting bits in the HRD, only the appropriate bits that are actually present in the bitstream may be counted. When the content of a non-VCL NAL unit is conveyed for the application by some means other than presence within the bitstream, the representation of the content of the non-VCL NAL unit may or may not use the same syntax as would be used if the non-VCL NAL unit were in the bitstream.

The HRD may contain a coded picture buffer (CPB), an instantaneous decoding process, a decoded picture buffer (DPB), and output cropping.

The CPB may operate on decoding unit basis. A decoding unit may be an access unit or it may be a subset of an access unit, such as an integer number of NAL units. Encoders may determine that decoding units are for example tiles or CTU rows (when encoding constraints enabling wavefront processing have been applied). When a decoding unit is a subset of picture, a lower latency in the encoding and decoding may be achieved. The selection of the decoding unit may be indicated by an encoder in the bitstream. For example, decoding unit SEI messages may indicate decoding units as follows: The set of NAL units associated with a decoding unit information SEI message consists, in decoding order, of the SEI NAL unit containing the decoding unit information SEI message and all subsequent NAL units in the access unit up to but not including any subsequent SEI NAL unit containing a decoding unit information SEI message. Each decoding unit may be required to include at least one VCL NAL unit. All non-VCL NAL units associated with a VCL NAL unit may be included in the decoding unit containing the VCL NAL unit.

The HRD may operate as follows. Data associated with decoding units that flow into the CPB according to a specified arrival schedule may be delivered by the Hypothetical Stream Scheduler (HSS). The arrival schedule may be determined by the encoder and indicated for example through picture timing SEI messages, and/or the arrival schedule may be derived for example based on a bitrate which may be indicated for example as part of HRD parameters in video usability information (which may be included in the sequence parameter set). The HRD parameters in video usability information may contain many sets of parameters, each for different bitrate or delivery schedule. The data associated with each decoding unit may be removed and decoded instantaneously by the instantaneous decoding process at CPB removal times. A CPB removal time may be determined for example using an initial CPB buffering delay, which may be determined by the encoder and indicated for example through a buffering period SEI message, and differential removal delays indicated for each picture for example though picture timing SEI messages. The initial arrival time (i.e. the arrival time of the first bit) of the very first decoding unit may be determined to be 0. The initial arrival time of any subsequent decoding unit may be determined to be equal to the final arrival time of the previous decoding unit. Each decoded picture is placed in the DPB. A decoded picture may be removed from the DPB at the later of the DPB output time or the time that it becomes no longer needed for inter-prediction reference. Thus, the operation of the CPB of the HRD may comprise timing of decoding unit initial arrival (when the first bit of the decoding unit enters the CPB), timing of decoding unit removal and decoding of decoding unit, whereas the operation of the DPB of the HRD may comprise removal of pictures from the DPB, picture output, and current decoded picture marking and storage.

The operation of an AU-based coded picture buffering in the HRD can be described in a simplified manner as follows. It is assumed that bits arrive into the CPB at a constant arrival bitrate (when the so-called low-delay mode is not in use). Hence, coded pictures or access units are associated with initial arrival time, which indicates when the first bit of the coded picture or access unit enters the CPB. Furthermore, in the low-delay mode the coded pictures or access units are assumed to be removed instantaneously when the last bit of the coded picture or access unit is inserted into CPB and the respective decoded picture is inserted then to the DPB, thus simulating instantaneous decoding. This time is referred to as the removal time of the coded picture or access unit. The removal time of the first coded picture of the coded video sequence is typically controlled, for example by the Buffering Period Supplemental Enhancement Information (SEI) message. This so-called initial coded picture removal delay ensures that any variations of the coded bitrate, with respect to the constant bitrate used to fill in the CPB, do not cause starvation or overflow of the CPB. It is to be understood that the operation of the CPB is somewhat more sophisticated than what described here, having for example the low-delay operation mode and the capability to operate at many different constant bitrates. Moreover, the operation of the CPB may be specified differently in different standards.

When the bitstream starts at an IRAP picture, for example as a result of accessing a file or stream randomly and starting the decoding from an IRAP picture or tuning into a broadcast, there can be leading pictures (RADL and/or RASL pictures) that follow the IRAP picture in decoding order and precede it in output order. It is possible to discard or omit the decoding of these leading pictures following the RAP picture without affecting the decoding operation, as these leading pictures have no effect on the decoding process of any other pictures.

The buffering period SEI message of HEVC supports indicating two sets of initial buffering delay and initial buffering delay offset parameters, which can be signaled for example at an IRAP picture. One set of values specifies the required initial buffering when the leading pictures associated with the IRAP picture (with which the buffering period SEI message is associated) are present in the bitstream. The other set of values specifies the required initial buffering when leading pictures are not present in the bitstream or are discarded prior to scheduling them with HSS and/or inputting them into the CPB. The HRD operation may be required to be verified with the HRD for both sets of buffering parameters provided in the buffering period SEI message.

The DPB is used, among other things, to control the required memory resources for decoding of conforming bitstreams. There are two reasons to buffer decoded pictures, for references in prediction and for reordering decoded pictures into output order. As H.264/AVC and HEVC provide a great deal of flexibility for both reference picture marking and output reordering, separate buffers for reference picture buffering and output picture buffering could have been a waste of memory resources. Hence, the DPB includes a unified decoded picture buffering process for reference pictures and output reordering. A decoded picture may be removed from the DPB when it is no longer used as reference and needed for output.

In output cropping, lines and/or columns of samples may be removed from decoded pictures according to a cropping rectangle to form output pictures. In HEVC, a cropped decoded picture is defined as the result of cropping a decoded picture based on the conformance cropping window specified in the SPS that is referred to by the corresponding coded picture. Conforming decoders are require to produce numerically identical cropped decoded pictures as the decoding process specified in HEVC. The output cropping of HEVC produces cropped decoded pictures.

The HRD may be used to check conformance of bitstreams and decoders.

Bitstream conformance requirements of the HRD may comprise for example the following and/or alike. The CPB is required not to overflow (relative to the size which may be indicated for example within HRD parameters of video usability information) or underflow (i.e. the removal time of a decoding unit cannot be smaller than the arrival time of the last bit of that decoding unit). The number of pictures in the DPB may be required to be smaller than or equal to a certain maximum number, which may be indicated for example in the sequence parameter set. All pictures used as prediction references may be required to be present in the DPB. It may be required that the interval for outputting consecutive pictures from the DPB is not smaller than a certain minimum.

Decoder conformance requirements of the HRD may comprise for example the following. A decoder claiming conformance to a specific profile and level may be required to decode successfully all conforming bitstreams specified for decoder conformance provided that all sequence parameter sets and picture parameter sets referred to in the VCL NAL units, and appropriate buffering period and picture timing SEI messages are conveyed to the decoder, in a timely manner, either in the bitstream (by non-VCL NAL units), or by external means. There may be two types of conformance that can be claimed by a decoder: output timing conformance and output order conformance.

To check conformance of a decoder, test bitstreams conforming to the claimed profile and level may be delivered by a hypothetical stream scheduler (HSS) both to the HRD and to the decoder under test (DUT). All pictures output by the HRD may also be required to be output by the DUT and, for each picture output by the HRD, the values of all samples that are output by the DUT for the corresponding picture may also be required to be equal to the values of the samples output by the HRD.

For output timing decoder conformance, the HSS may operate e.g. with delivery schedules selected from those indicated in the HRD parameters of video usability information, or with "interpolated" delivery schedules. The same delivery schedule may be used for both the HRD and DUT. For output timing decoder conformance, the timing (relative to the delivery time of the first bit) of picture output may be required to be the same for both HRD and the DUT up to a fixed delay.

For output order decoder conformance, the HSS may deliver the bitstream to the DUT "by demand" from the DUT, meaning that the HSS delivers bits (in decoding order) only when the DUT requires more bits to proceed with its processing. The HSS may deliver the bitstream to the HRD by one of the schedules specified in the bitstream such that the bit rate and CPB size are restricted. The order of pictures output may be required to be the same for both HRD and the DUT.

HEVC enable encoders and/or other entities, such as a splicers, to control picture output from the decoding process and/or HRD with the values of the pic_output_flag and/or no_output_of_prior_pics_flag syntax elements as described in the following.

The pic_output_flag syntax element, which may be present in the slice segment header, affects the derivation of the variable PicOutputFlag. Each decoded picture is associated with a value of PicOutputFlag (which may differ from the value of PicOutputFlag of other pictures). PicOutputFlag is set to 1 for pictures that are not RASL pictures associated with an IRAP picture with NoRaslOutputFlag equal to 1. Otherwise, PicOutputFlag is set to be equal to pic_output_flag. Pictures with PicOutputFlag equal to 0 are not output. Picture with PicOutputFlag equal to 1 are output, unless they become affected by NoOutputOfPriorPicsFlag, as explained in the following.

The no_output_of_prior_pics_flag syntax element, which is present for IRAP pictures in the slice segment header, affects the output of previously-decoded pictures in the decoded picture buffer after the decoding of an IDR or a BLA picture that is not the first picture in the bitstream as follows: The removal of pictures from the DPB before decoding of the current picture (but after parsing the slice header of the first slice of the current picture) happens instantaneously at the CPB removal time of the first decoding unit of access unit n (containing the current picture) and proceeds as follows:

The reference picture set of the current picture is decoded.
When the current picture is an IRAP picture with NoRaslOutputFlag equal to 1 that is not picture 0, the following ordered steps are applied:
The variable NoOutputOfPriorPicsFlag is derived as follows:
If the current picture is a CRA picture, NoOutputOfPriorPicsFlag is set equal to 1 (regardless of the value of no_output_of_prior_pics_flag).
Otherwise, if the width, height, or the DPB capacity of the current picture differ from those of the previous picture, NoOutputOfPriorPicsFlag may but need not be set equal to 1 or may be set equal to no_output_of_prior_pics_flag.
Otherwise, NoOutputOfPriorPicsFlag is set equal to no_output_of_prior_pics_flag.
The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.
When both of the following conditions are true for any pictures k in the DPB, all such pictures k in the DPB are removed from the DPB:
Picture k is marked as "unused for reference".
Picture k has PicOutputFlag equal to 0 or its DPB output time is less than or equal to the CPB removal time of the first decoding unit (denoted as decoding unit m) of the current picture n.
For each picture that is removed from the DPB, the DPB fullness is decremented by one.

Splicers or other entities concatenating coded video sequences or bitstreams may set no_output_of_prior_pics_flag equal to 1 for example when the output of a spliced coded video sequence might overlap with the output of some picture in the previous coded video sequence.

Spatial resolution of an image or a picture may be defined as the number of pixels or samples representing the image/picture in horizontal and vertical direction. In this document, expressions such as "images at different resolution" may be interpreted as two images have different number of pixels either in horizontal direction, or in vertical direction, or in both directions.

In signal processing, resampling of images is usually understood as changing the sampling rate of the current image in horizontal or/and vertical directions. Resampling results in a new image which is represented with different number of pixels in horizontal or/and vertical direction. In some applications, the process of image resampling is equal to image resizing. In general, resampling is classified in two processes: downsampling and upsampling.

Downsampling or subsampling process may be defined as reducing the sampling rate of a signal, and it typically results in reducing of the image sizes in horizontal and/or vertical directions . . . . In image downsampling, the spatial resolution of the output image, i.e. the number of pixels in the output image, is reduced compared to the spatial resolution of the input image. Downsampling ratio or factor may be defined as the horizontal or vertical resolution of the downsampled image divided by the respective resolution of the input image for downsampling. Downsampling ratio may alternatively be defined as the number of samples in the downsampled image divided by the number of samples in the input image for downsampling. As the two definitions differ, the term downsampling ratio may be further characterized by indicating whether it is indicated along one coordinate axis or both coordinate axes (and hence as a ratio of number of pixels in the images). Horizontal and vertical downsampling ratios need not be the same. Image downsampling may be performed for example by selecting a specific number of pixels, based on the downsampling ratio, out of the total number of pixels in the original image.

Upsampling process may be defined as increasing the sampling rate of the signal, and it typically results in increasing of the image sizes in horizontal and/or vertical directions. In image upsampling, the spatial resolution of the output image, i.e. the number of pixels in the output image, is increased compared to the spatial resolution of the input image. Upsampling ratio or factor may be defined as the horizontal or vertical resolution of the upsampled image divided by the respective resolution of the input image. Upsampling ratio may alternatively be defined as the number of samples in the upsampled image divided by the number of samples in the input image. As the two definitions differ, the term upsampling ratio may be further characterized by indicating whether it is indicated along one coordinate axis or both coordinate axes (and hence as a ratio of number of pixels in the images). Horizontal and vertical upsampling ratios need not be the same.

Downsampling and/or upsampling may be considered to include and/or may be connected with filtering. For example, downsampling may include low-pass filtering.

Downsampling can be utilized in image/video coding to improve coding efficiency of existing coding scheme or to reduce computation complexity of these solutions. For example, quarter-resolution (half-resolution along both coordinate axes) depth maps compared to the texture pictures may be used as input to transform-based coding such as H.264/AVC, MVC, MVC+D, HEVC, MV-HEVC, combinations and/or derivations thereof, or any similar coding scheme.

Alternatively, upsampling process is commonly used in state-of-the-art video coding technologies in order to improve coding efficiency of those. For example, 4× resolution upsampling of coded video data may be utilized in coding loop of H.264/AVC, MVC, MVC+D, HEVC, MV-HEVC combinations and/or derivations thereof, or any similar coding scheme due to ¼-pixel motion vector accuracy and interpolation of the sub-pixel values for the ¼-pixel grid that can be referenced by motion vectors.

Scalable video coding refers to a coding structure where one bitstream can contain multiple representations of the content at different bitrates, resolutions, frame rates and/or other types of scalability. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver.

A scalable bitstream may consist of a base layer providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer can be predicted from lower layers. Similarly the pixel data of the lower layers can be used to create prediction for the enhancement layer. Each layer together with all its dependent layers is one representation of the video signal at a certain spatial resolution, temporal resolution, quality level, and/or operation point of other types of scalability. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction. Multi-loop decoding enables the decoder to output more than one decoded picture per time instant or access unit, e.g. a decoded base-layer picture and a decoded enhancement-layer picture.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

Another type of scalability is standard scalability, which may also be referred to as hybrid codec scalability. When the encoder 200 uses a coder other than HEVC (203) in the base layer, such an encoder is for standard scalability. In this type, the base layer and enhancement layer belong to different video coding standards. An example case is where the base layer is coded with H.264/AVC whereas the enhancement layer is coded with HEVC. In this way, the same bitstream can be decoded by both legacy H.264/AVC based systems as well as HEVC based systems.

Other types of scalability and scalable video coding include bit-depth scalability, where base layer pictures are coded at lower bit-depth (e.g. 8 bits) per luma and/or chroma sample than enhancement layer pictures (e.g. 10 or 12 bits), chroma format scalability, where base layer pictures provide higher fidelity and/or higher spatial resolution in chroma (e.g. coded in 4:4:4 chroma format) than enhancement layer pictures (e.g. 4:2:0 format), and color gamut scalability, where the enhancement layer pictures have a richer/broader color representation range than that of the base layer pictures—for example the enhancement layer may have UHDTV (ITU-R BT.2020) color gamut and the base layer may have the ITU-R BT.709 color gamut.

While the previous paragraphs described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

In scalable multiview coding, the same bitstream may contain coded view components of multiple views and at least some coded view components may be coded using quality and/or spatial scalability.

Figure 11B:
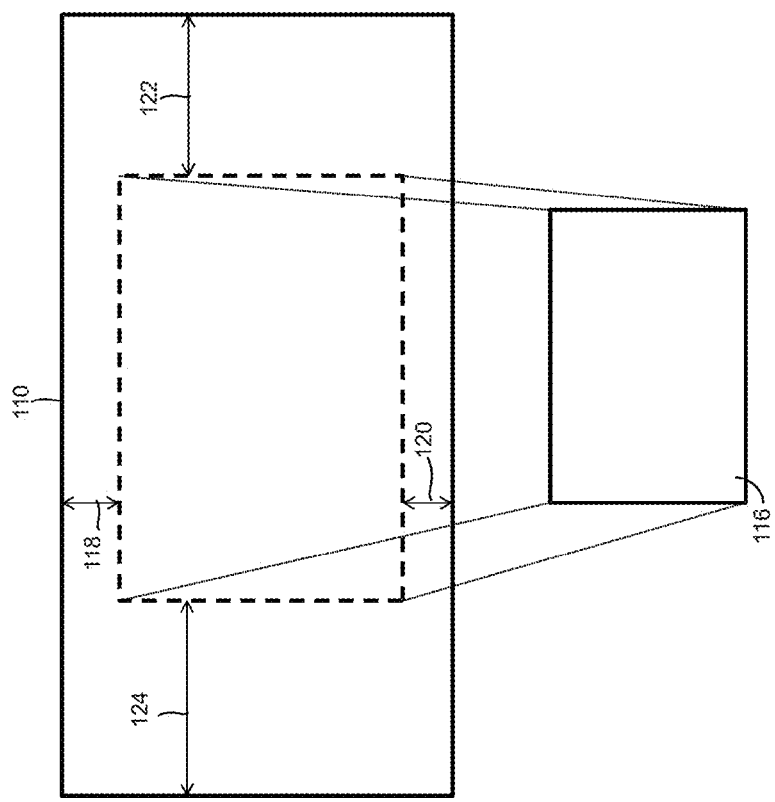
FIG. 11b depicts an example of scaled reference layer offsets for a region of an enhancement layer corresponding to the reference layer picture.
Figure 11A:
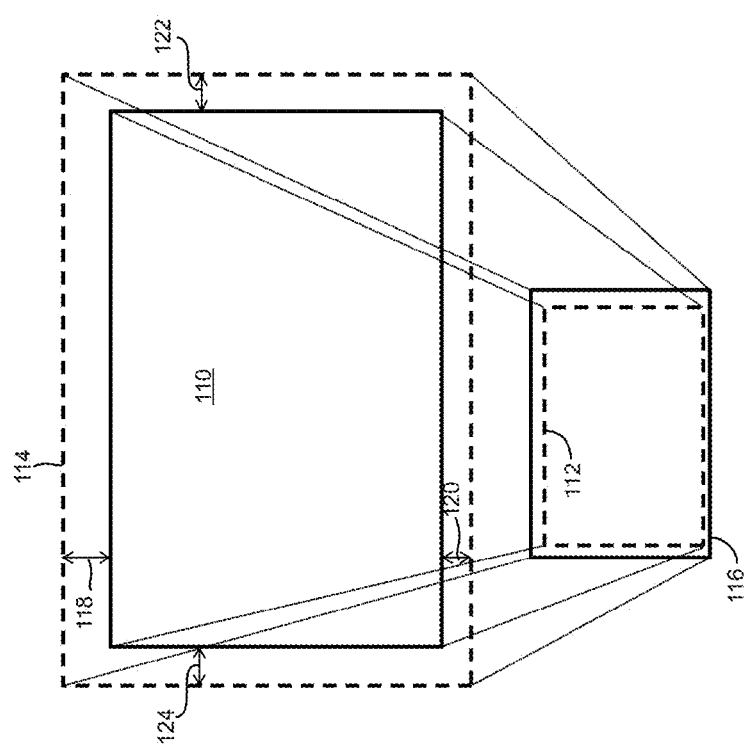
FIG. 11a depicts an example of scaled reference layer offsets for an enhancement layer enhancing a region of the reference layer.

Scalable video encoding and/or decoding methods may support enhancement layers that enhance a region of the reference-layer picture, illustrated in FIG. 11a, and/or that enhance a superset of the reference-layer picture area, illustrated in FIG. 11b. In the latter case, the base-layer picture may be considered to correspond to a region of the enhancement layer picture. Such spatial scalability may be referred to as extended spatial scalability.

The spatial correspondence between the enhancement layer picture 110 and the reference layer region 112, or similarly the enhancement layer region 114 and the base layer picture 116 may be indicated by the encoder and/or decoded by the decoder using for example so-called scaled reference layer offsets. Scaled reference layer offsets may be considered to specify the positions of the corner samples of the upsampled reference layer picture relative to the respective corner samples of the enhancement layer picture. Scaled reference layer offsets may be indicated by four syntax elements (e.g. per a pair of an enhancement layer and its reference layer), which may be referred to as scaled_ref_layer_top_offset 118, scaled_ref_layer_bottom_offset 120, scaled_ref_layer_right_offset 122 and scaled_ref_layer_left_offset 124. The offset values may be signed, which enables the use of the offset values to be used in both types of extended spatial scalability, illustrated in FIG. 11a and FIG. 11b. In case of region-of-interest scalability (FIG. 11a), the enhancement layer picture 110 corresponds to a region 112 of the reference layer picture 116 and the scaled reference layer offsets indicate the corners of the upsampled reference layer picture that extend the area of the enhancement layer picture. The reference layer region that is upsampled may be concluded by the encoder and/or the decoder by downscaling the scaled reference layer offsets according to the ratio between the enhancement layer picture height or width and the upsampled reference layer picture height or width, respectively. The downscaled scaled reference layer offset may be then be used to obtain the reference layer region that is upsampled and/or to determine which samples of the reference layer picture collocate to certain samples of the enhancement layer picture. In case the reference layer picture corresponds to a region of the enhancement layer picture (FIG. 11b), the scaled reference layer offsets indicate the corners of the upsampled reference layer picture that are within the area of the enhancement layer picture. The scaled reference layer offset may be used to determine which samples of the upsampled reference layer picture collocate to certain samples of the enhancement layer picture. It is also possible to mix the types of extended spatial scalability, i.e apply one type horizontally and another type vertically. Scaled reference layer offsets may be indicated by the encoder in and/or decoded by the decoder from for example a sequence-level syntax structure, such as SPS and/or VPS. The accuracy of scaled reference offsets may be pre-defined for example in a coding standard and/or specified by the encoder and/or decoded by the decoder from the bitstream. For example, an accuracy of 1/16th of the luma sample size in the enhancement layer may be used. Scaled reference layer offsets may be indicated, decoded, and/or used in the encoding, decoding and/or displaying process when no inter-layer prediction takes place between two layers.

The encoder and/or the decoder may derive a horizontal scale factor (e.g. stored in variable ScaleFactorX) and a vertical scale factor (e.g. stored in variable ScaleFactorY) for a pair of an enhancement layer and its reference layer for example based on the scaled reference layer offsets for the pair. If either or both scale factors are not equal to 1, the reference layer picture may be resampled to generate a reference picture for predicting the enhancement layer picture. The process and/or the filter used for resampling may be pre-defined for example in a coding standard and/or indicated by the encoder in the bitstream (e.g. as an index among pre-defined resampling processes or filters) and/or decoder by the decoder from the bitstream. A different resampling process may be indicated by the encoder and/or decoded by the decoder and/or inferred by the encoder and/or the decoder depending on the values of the scale factor. For example, when both scale factors are less than 1, a pre-defined downsampling process may be inferred; and when both scale factors are greater than 1, a pre-defined upsampling process may be inferred. Additionally or alternatively, a different resampling process may be indicated by the encoder and/or decoded by the decoder and/or inferred by the encoder and/or the decoder depending on which sample array is processed. For example, a first resampling process may be inferred to be used for luma sample arrays and a second resampling process may be inferred to be used for chroma sample arrays.

An example of an inter-layer resampling process for obtaining a resampled luma sample value is provided in the following. The input luma sample array, which may be also referred to as the luma reference sample array, is referred through variable rlPicSampleL. The resampled luma sample value is derived for a luma sample location (xP, yP) relative to the top-left luma sample of the enhancement-layer picture. As a result, the process generates a resampled luma sample, accessed through variable intLumaSample. In this example the following 8-tap filter with coefficients fL[p, x] with p=0 . . . 15 and x=0 . . . 7 is used for the luma resampling process.

| phase p | $f_L$ [p, 0] | $f_L$ [p, 1] | $f_L$ [p, 2] | $f_L$ [p, 3] | $f_L$ [p, 4] | $f_L$ [p, 5] | $f_L$ [p, 6] | $f_L$ [p, 7] |
|---|---|---|---|---|---|---|---|---|
| | | | interpolation filter coefficients | | | | | |
| 0 | 0 | 0 | 0 | 64 | 0 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

The value of the interpolated luma sample IntLumaSample may be derived by applying the following ordered steps:

1. The reference layer sample location corresponding to or collocating with (xP, yP) may be derived for example on the basis of scaled reference layer offsets. This reference layer sample location is referred to as (xRef16, yRef16) in units of 1/16-th sample.
2. The variables xRef and xPhase are derived as follows:
xRef=(xRef16>>4)
xPhase=(xRef16) % 16
where
">>" is a bit-shift operation to the right, i.e. an arithmetic right shift of a two's complement integer representation of x by y binary digits. This function may be defined only for non-negative integer values of y. Bits shifted into the MSBs (most significant bits) as a result of the right shift have a value equal to the MSB of x prior to the shift operation.
"%" is a modulus operation, i.e. the remainder of x divided by y, defined only for integers x and y with x>=0 and y>0.
3. The variables yRef and yPhase are derived as follows:
yRef=(yRef16>>4)
yPhase=(yRef16) % 16
4. The variables shift1, shift2 and offset are derived as follows:
shift1=RefLayerBitDepth$_Y$−8
shift2=20−BitDepth$_Y$
offset=1<<(shift2−1)
where
RefLayerBitDepth$_Y$ is the number of bits per luma sample in the reference layer.
BitDepth$_Y$ is the number of bits per luma sample in the enhancement layer.
"<<" is a bit-shift operation to the left, i.e. an arithmetic left shift of a two's complement integer representation of x by y binary digits. This function may be defined only for non-negative integer values of y. Bits shifted into the LSBs (least significant bits) as a result of the left shift have a value equal to 0.
5. The sample value tempArray[n] with n=0 . . . 7, is derived as follows:

yPosRL=Clip3(0,RefLayerPicHeightInSamplesY−1, yRef+n−1)

refW=RefLayerPicWidthInSamplesY tempArray[n]=($f_L$[xPhase,0]*rlPicSample$_L$[Clip3(0, refW−1,xRef−3),yPosRL]+$f_L$[xPhase,1]*rlPicSample$_L$[Clip3(0,refW−1,xRef−2),yPosRL]+$f_L$[xPhase,2]*rlPicSample$_L$[Clip3(0,refW−1,xRef−1),yPosRL]+$f_L$[xPhase,3]*rlPicSample$_L$[Clip3(0, refW−1,xRef),yPosRL]+$f_L$[xPhase,4]* rlPicSample$_L$[Clip3(0,refW−1,xRef+1),yPosRL]+ $f_L$[xPhase,5]*rlPicSample$_L$[Clip3(0,refW−1, xRef+2),yPosRL]+$f_L$[xPhase,6]*rlPicSample$_L$ [Clip3(0,refW−1,xRef+3),yPosRL]+$f_L$[xPhase,7]* rlPicSample$_L$[Clip3(0,refW−1,xRef+4), yPosRL])>>shift1 where
RefLayerPicHeightInSamplesY is the height of the reference layer picture in luma samples.
RefLayerPicWidthInSamplesY is the width of the reference layer picture in luma samples.
6. The interpolated luma sample value intLumaSample is derived as follows:

intLumaSample=($f_L$[yPhase,0]*tempArray[0]+$f_L$ [yPhase,1]*tempArray[1]+$f_L$[yPhase,2]*tempArray[2]+$f_L$[yPhase,3]*tempArray[3]+$f_L$[yPhase,4]* tempArray[4]+$f_L$[yPhase,5]*tempArray[5]+$f_L$ [yPhase,6]*tempArray[6]+$f_L$[yPhase,7]*tempArray[7]+offset)>>shift2 intLumaSample=Clip3(0,(1<<BitDepth$_Y$)−1,intLumaSample)

An inter-layer resampling process for obtaining a resampled chroma sample value may be specified identically or similarly to the above-described process for a luma sample value. For example, a filter with a different number of taps may be used for chroma samples than for luma samples.

Resampling may be performed for example picture-wise (for the entire reference layer picture or region to be resampled), slice-wise (e.g. for a reference layer region corresponding to an enhancement layer slice) or block-wise (e.g. for a reference layer region corresponding to an enhancement layer coding tree unit). The resampling of a reference layer picture for the determined region (e.g. picture, slice, or coding tree unit in an enhancement layer picture) may for example be performed by looping over all sample positions of the determined region and performing a sample-wise resampling process, such as those provided in the above examples, for each sample position. However, it is to be understood that other possibilities for resampling a determined region exist—for example, the filtering of a certain sample location may use variable values of the previous sample location.

A HRD for a scalable video bitstream may operate similarly to a HRD for a single-layer bitstream. However, some changes may be required or desirable, particularly when it comes to the DPB operation in multi-loop decoding of a scalable bitstream. It is possible to specify DPB operation for multi-loop decoding of a scalable bitstream in multiple ways. In a layer-wise approach, each layer may have conceptually its own DPB, which may otherwise operate independently but some DPB parameters may be provided jointly for all the layer-wise DPBs and picture output may operate synchronously so that the pictures having the same output time are output at the same time or, in output order conformance checking, pictures from the same access unit are output next to each other. In another approach, referred to as the resolution-specific approach, layers having the same key properties share the same sub-DPB. The key properties may include one or more of the following: picture width, picture height, chroma format, bitdepth, color format/gamut.

It may be possible to support both layer-wise and resolution-specific DPB approach with the same DPB model, which may be referred to as the sub-DPB model. The DPB is partitioned into several sub-DPBs, and each sub-DPB is otherwise managed independently but some DPB parameters may be provided jointly for all the sub-DPBs and picture output may operate synchronously so that the pictures having the same output time are output at the same time or, in output order conformance checking, pictures from the same access unit are output next to each other.

Frame Packing

Frame packing refers to a method where more than one frame is packed into a single frame at the encoder side as a pre-processing step for encoding and then the frame-packed frames are encoded with a conventional 2D video coding scheme. The output frames produced by the decoder therefore may contain constituent frames that correspond to the input frames spatially packed into one frame in the encoder side. Frame packing may be used e.g. for stereoscopic video, where a pair of frames, one corresponding to the left eye/camera/view and the other corresponding to the right eye/camera/view, is packed into a single frame. Frame packing may also or alternatively be used for depth or disparity enhanced video, where one of the constituent frames represents depth or disparity information corresponding to another constituent frame containing the regular color information (luma and chroma information). The use of frame-packing may be signaled in the video bitstream, for example using the frame packing arrangement SEI message of H.264/AVC or similar. The use of frame-packing may also or alternatively be indicated over video interfaces, such as High-Definition Multimedia Interface (HDMI). The use of frame-packing may also or alternatively be indicated and/or negotiated using various capability exchange and mode negotiation protocols, such as Session Description Protocol (SDP).

While the previous paragraphs described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded.

In some embodiments a method of overlaying two or more scalability layers for displaying may be described as follows. Video material, such as news reports, music videos and movie trailers, may comprise rapid cuts between separate image material scenes. Sometimes the cuts are abrupt, but some other times a procedure known as scene transition may be used in which transfer from one scene to another takes place by dimming, wiping, mosaic dissolving or scrolling the image frames of a previous scene, and, correspondingly, by presenting those of a later scene. One type of scene transition, fading, may be carried out by gradually reducing the intensity or luminance of the image frames of a first scene to zero, while gradually increasing the intensity of the image frames of a second scene to its maximum value. This scene transition may be referred to as cross-faded scene transition. An example of the fading is depicted in FIG. 18 in which a picture of a sailing boat is gradually overlaid and replaced by a figure of a face.

Generally speaking, a computer-made image can be thought of as consisting of layers, or image objects. Each object can be defined with reference to at least three information types: the structure of the image object, its shape and transparency, and the layering order (depth) in relation to the background of the image and to other image objects. Shape and transparency may be determined using what is known as the alpha plane, which measures opacity and the value of which is usually determined separately for each image object, possibly excluding the background, which may be determined as non-transparent. The alpha plane value of a non-transparent image object, such as the background, can thus be set at e.g. 1.0, whereas the alpha plane value of a fully transparent image object may be e.g. 0.0. The values in between define the intensity of the visibility of a specific image object in a picture in proportion to the background and to other, at least partly overlapping, image objects that have a higher depth value than the image object in question.

The superimposition of image objects in layers according to their shape, transparency and depth position may be referred to as scene composition. In practice the procedure may be based on the use of weighted averages, and may operate for example as follows. First, the image object that is closest to the background, i.e. deepest according to its depth position, is placed onto the background and a combined image is formed of the two. The pixel values of the combined image are formed as an average weighted by the alpha plane values of the background image and the image object in question. The alpha plane value of the combined image may then be set at 1.0, after which it serves as a background image for the next image object. The process may be continued until all image objects are attached to the image.

In the following, a procedure will be described in which video sequence scalability layers are combined with the above described image objects of image frames and their information types to provide a scene transition with scalable video coding that may also have good compression efficiency.

This procedure is illustrated in the following by way of example and in a simplified manner by using cross-faded scene transition, on one hand, and abrupt scene transition, on the other hand, as examples. The image frames to be displayed during a scene transition may be formed of two superimposed image frames, a first image frame comprising a first image scene and a second image frame a second scene. One of the image frames serves as the background image and the other, which is referred to as a foreground image, is placed on top of the background image. The opacity of the background image, i.e. its non-transparency value, is constant. In other words, its pixel-specific alpha plane values are not adjusted.

In this procedure, the background and foreground images are both defined according to scalability layer. This is illustrated in FIG. 15*a*, which shows an example of how image frames of two different scenes can be placed on scalability layers during a scene transition.

FIG. 15a shows a first image frame 190 of a first (terminating) scene positioned on the base layer. The image frame 190 may be either an I-frame containing image information that has not been determined using motion-compensated temporal predicting, or it may be a P-frame that is a motion-compensated image frame predicted from previous image frames. The coding of a second (initiating) scene starts during the temporally following image frame and the image frames of the scene may also be placed on the base layer. Remaining image frames 192, 194 of the second (terminating) scene may then be placed on enhancement layer 1. These image frames may be e.g. P-frames.

The image frames of the second (initiating) scene are thus placed on the base layer, at least for the duration of the scene transition. The first image frame 196 of the scene may be an I-frame, and it is used for temporally predicting the succeeding image frames of the scene. Consequently, the succeeding image frames of the second scene are temporally predicted frames, typically P-frames, such as frames 198 and 199 shown in FIG. 15a.

This placing of image frames on scalability layers can be used for implementing a cross-faded scene transition by determining the image layer that is on the base layer always as a background image of maximum opacity (100%), or non-transparency value. During a scene transition, image frames located on enhancement layers are placed onto the background image and their opacity is adjusted for example by means of suitable filters such that the frames gradually change from non-transparent to transparent.

In the video sequence of FIG. 15a, there are no image frames on the lower scalability layers during the first base layer image frame 190. For this time instant, the first image frame 190 is only coded into the video sequence.

The next image frame 196 of the base layer initiates a new (second) scene, during which the image frame 196 is provided with depth positioning that places it as the background image, and its opacity value is set to the maximum. Temporally simultaneously with the image frame 196 of the base layer, there is an image frame 192 of a terminating (first) scene on enhancement layer 1. To allow a cross-faded scene transition to be produced, the transparency of the frame 192 must be increased. The example of FIG. 15a assumes that the opacity of the image frame 192 is set at 67% and, in addition, the image frame 192 is provided with depth positioning that determines it as a foreground image. For this time instant, an image combining the image frames 196 and 192 is coded into the video sequence, image 196 being visible as a weaker image on the background and image 192 as a stronger image at the front, because its opacity value is essentially high (67%).

During the temporally following image frame, there is a second image frame 198 of the second scene on the base layer, the frame 198 being thus correspondingly provided with depth positioning determining it as a background image, and its opacity value is set to the maximum. Enhancement layer 1 further comprises the last image frame 194 of a temporally simultaneously terminating (first) scene, the opacity value of the frame being set at 33% and, in addition, the image frame 194 being provided with depth positioning that determines it as a foreground image as well. Consequently, for this time instant, an image combined of the image frames 198 and 194 is coded into the video sequence, the image 198 being displayed as a stronger image on the background and the image 194 as a weaker image on the foreground, because the opacity value of the image 194 is no longer more than 33%.

During the temporally following image frame, the base layer comprises a third image frame 199 of the second scene. Since the first scene has terminated, only the image frame 199 is coded into the video sequence, and the displaying of the second scene continues from the frame 199.

FIG. 15a illustrates one possibility to arrange pictures in scalability layers within a scene transition period. It needs to be understood that other possibilities of arranging pictures in scalability layers within a scene transition period also exist. For example, all pictures of a first scene may be in a first layer and all pictures of a second scene may be in a second layer.

The above disclosure describes, by way of example, the positioning of image frames on scalability layers to implement cross-faded scene transition in a manner that may be advantageous from the point of view of coding efficiency. However, it may be possible that when a video sequence is being transmitted or decoded, a situation arises in which the bit rate of the video sequence should be adjusted according to the maximum value of the bandwidth and/or terminal device decoding rate available for data transfer.

One or more scalability layers, or independently decodable sub-sequences included in them, may be removed from a video sequence, whereby the bit rate of the video sequence may be decreased and yet, at the same time, the video sequence may be decoded without reducing image frequency. In the image frame positioning according to FIG. 15a, this may be implemented by removing enhancement layer 1 from the video sequence. The video sequence is thus only used for displaying the image frames 190, 196, 198 and 710 of the base layer. In other words, a direct transition from the first (terminating) scene to the second (initiating) scene takes place in the form of an abrupt scene transition, i.e. directly from the image frame 190 of the first scene into the I-image frame 706 that initiates the second scene. The transition is thus not a cross-faded scene transition but an abrupt scene transition. Nevertheless, the scene transition may be carried out in an advantageous manner without affecting the quality of the video sequence image, and the viewer usually may not experience an abrupt scene transition carried out instead of a cross-faded scene transition in any way disturbing or faulty.

In the related standardization contribution, JVT-O076, the signalling of the overlaying operation was proposed to be based on a new slice type, overlay (O) slice, as follows. If O slice is indicated, the following additional fields are present in the slice header:

Slice coding type (SCT). This field indicates the slice coding type (Intra, Inter, B, etc.). An overlay slice shall not be indicated again.

Source direction (SDIR). If this field is zero, the source picture for filtering is coded earlier than the current picture, and its picture number shall be calculated by subtracting SPND from the current picture number (in modulo MAX_PN arithmetic). If this field is one, the source picture is coded later than the current picture, and its picture number shall be calculated by increasing the current picture number by SPND (in modulo MAX_PN arithmetic).

Source picture number difference (SPND). The codeword index equals to SPND-1. SDIR and SPND indicate the source picture for transition.

Filter identifier (FID). The field indicates the filter to use.
0: cross-dissolve.
1: additive dissolve.
2: weighted additive dissolve.

Other values are reserved for the time being.

Number of filtering parameters (NFP). This field indicates the number of codewords following the current one and defining the specific parameters for filtering. The semantics of the codewords depend on the filter identifier.

The cross-dissolve filter includes one filtering parameter, namely the opacity of the current slice. It is a value between one and 255, and it is coded as an 8-bit fixed length code. Opacity equal to zero would indicate a non-transparent slice and 256 would indicate a fully transparent slice, whereas values between 0 and 256 indicate a linear transition from non-transparent to transparent defined as follows. If A is a pixel in the source picture and B is the spatially corresponding pixel in the current slice, the pixel resulting from the cross-dissolve operation shall be equal to (A×opacity+(256−B)×opacity)/256, where/is division by truncation.

The additive dissolve filter includes no filtering parameters. If A is a pixel in the source picture and B is the spatially corresponding pixel in the current slice, the pixel resulting from the additive dissolve operation shall be equal to min(A+B, 255).

Additive dissolve may be useful when amplitude weighting has been applied for the source sequences prior to encoding. Otherwise, cross-dissolve is likely to be the choice to obtain a cross-fading scene transition.

The weighted additive dissolve filter includes two filtering parameters WA and WB, which are 7-bit fixed-length codes interpreted as natural binary representations of unsigned integers. 7-bit precision was selected to limit the intermediate calculation to 16-bit precision. The luminance and chrominance output (OY and OC respectively) are calculated as follows from input pixels A and B and their luminance (AY, BY) and chrominance components (AC, BC).

$$O_Y = \max\left(0, \min\left(255, \frac{A_Y \times W_A + B_Y \times W_B}{128}\right)\right)$$

$$O_C = \max\left(0, \min\left(255, \frac{(A_C - 128) \times W_A + (B_C - 128) \times W_B}{128} + 128\right)\right)$$

Output Layer Sets and Alternative Output Layers

A coding standard or system may refer to a term operation point, which may indicate the scalable layers and/or sub-layers under which the decoding operates and/or may be associated with a sub-bitstream that includes the scalable layers and/or sub-layers being decoded. Some non-limiting definitions of an operation point are provided in the following.

In HEVC, an operation point is defined as bitstream created from another bitstream by operation of the sub-bitstream extraction process with the another bitstream, a target highest TemporalId, and a target layer identifier list as inputs.

The VPS of HEVC specifies layer sets and HRD parameters for these layer sets. A layer set may be used as the target layer identifier list in the sub-bitstream extraction process.

In SHVC and MV-HEVC, an operation point definition may include a consideration of a target output layer set. In SHVC and MV-HEVC, an operation point may be defined as a bitstream that is created from another bitstream by operation of the sub-bitstream extraction process with the another bitstream, a target highest TemporalId, and a target layer identifier list as inputs, and that is associated with a set of target output layers.

The MV-HEVC/SHVC draft specification (in documents JCT3V-E1004 and JCTVC-N1008, respectively) derives a default output layer set for each layer set specified in the VPS. The VPS extension flag default_one_target_output_layer_flag, when equal to 0, may specify that each layer is an output layer, and when equal to 1, may specify that only the highest layer is an output layer. In addition, to the default output layer sets, the VPS extension enables to specify additional output layer sets with selected layers indicated to be output layers.

While a constant set of output layers suits well use cases and bitstreams where the highest layer stays unchanged in each access unit, they may not support use cases where the highest layer changes from one access unit to another. It has therefore been proposed that each output layer in an output layer set is associated with a minimum alternative output layer. The minimum alternative output layer for each output layer of each output layer set may be indicated in a sequence-level syntax structure (e.g. VPS in H.265/HEVC and its extensions). It is used to specify the minimum layer identifier value of a picture that can be output instead of the specified output layer, if a picture at the output layer is not present in an access unit. The first direct or indirect inter-layer reference picture present in the access unit in descending layer identifier order down to the indicated minimum alternative output layer may be output. For the default output layer sets, the minimum output layer may be specified to be the same as the output layer; i.e. when a default output layer set is in use, the decoder may only output the specified output layers. For the additional output layer sets, one or more syntax elements may control the assignment of alternative output layers. For example, a VPS extension may include u(1)-coded alt_output_layer_flag. When alt_output_layer_flag is equal to 0, pictures that are not at the target output layers are not output. When alt_output_layer_flag equal to 1 and a picture at the a target output layer is not present in an access unit, a picture with highest nuh_layer_id among those pictures of the access unit for which PicOutputFlag is equal to 1 and which are not among the target output layers is output. In another example, the syntax element min_alt_output_layer_idx[i][j] is added to the VPS extension syntax for each output layer of the non-default output layer sets and specifies the alternative output layer index for the j-th layer within the i-th output layer set.

Region of Interest (ROI) coding refers to coding a particular region within a video at a higher fidelity. There exists several methods for encoders and/or other entities to determine ROIs from input pictures to be encoded. For example, face detection may be used and faces may be determined to be ROIs. Additionally or alternatively, in another example, objects that are in focus may be detected and determined to be ROIs, while objects out of focus are determined to be outside ROIs. Additionally or alternatively, in another example, the distance to objects may be estimated or known, e.g. on the basis of a depth sensor, and ROIs may be determined to be those objects that are relatively close to the camera rather than in the background.

There exists several different applications for ROI with different requirements. For example, an enhancement layer can be transmitted to enhance the quality and/or a resolution of a region in the base layer. A decoder receiving both enhancement and base layer bitstream might decode both layers and overlay the decoded pictures on top of each other and display the final picture.

However there are other applications where overlaying the ROI enhancement layer over base layer might not be desired in the display. For example, an ROI enhancement layer could enhance a participant's video feed in a multi-party video conferencing, so when viewed in full-screen, EL may be used to achieve full resolution. In these cases, the intended display behaviour is showing the EL independently or in a separate window, but does not overlay over the base layer.

FIG. 6 illustrates an example in which a region of interest is displayed by a display 210 as a separate window 213 on top of another picture 211. In some embodiments, the picture 213 may be considered to be displayed on a window that is separate from the window of picture 211, even though the windows may be overlapped on the screen. The display process connected with the video decoding and output processes may consider the picture 213 and the picture 211 as separate pictures and output them into logically separate display windows provided e.g. by the operating system. The logically separate display windows may happen to overlap as depicted in FIG. 6. In some embodiments, the picture 211 may be coded e.g. as an enhancement layer that does predict from the base layer. The relative position of picture 211 on the picture area of the picture 213 may be specified for example using the scaled reference layer offsets as described elsewhere in this patent application. The picture 213 may be considered to be overlaid on picture 211 in the displaying process, i.e. both the picture resulting from the overlaying operation of pictures 213 and 211 may be considered to be displayed on one logical display window provided e.g. by the operating system.

Similarly to ROI layers, the intended display behaviour related to auxiliary pictures might not be clear. For example, it is not clear if overlay pictures are required to be displayed or if the player can choose whether to display overlay pictures. In another example, a primary picture is associated with an alpha picture, but it might not be clear if the content creator allows displaying the primary picture without the alpha blending suggested by the presence of the alpha picture.

Scalable video coding schemes, such as SHVC/MV-HEVC, may allow access unit containing pictures for some but not all layers present in the bitstream. For example, the picture rate in different layers may differ. In some applications, it may be advantageous to keep a BL picture unchanged while a ROI EL may be coded more frequently. For example, a picture-in-picture (PIP) EL may have a higher picture rate than that of the base layer. In another example, a background picture over which an alpha-blended primary picture is superimposed keeps unchanged for a period of time. This may also be considered the other way round: a background picture may be superimposed on top of the primary picture.

The SVC extension of H.264/AVC includes the possibility that an enhancement layer picture represents only a selected rectangular area of its corresponding reference layer picture, which is coded with a higher or identical spatial resolution. Alternatively, the enhancement layer picture may contain additional parts beyond the borders of the reference layer picture. This reference and enhancement layer cropping, which may also be combined, can even be modified on a picture-by-picture basis. The specified SVC decoding process uses a single motion compensation loop, i.e. only the pictures of the highest decoded EL are maintained in the DPB. Hence, SVC can be considered to be an example of a codec where displaying of a EL without BL may be required.

When multiple layers are output by the decoder, the intended display behaviour has been governed by the scalability dimensions between the layers. For example, if the output layers represent different views, the intended displaying behavior may be to display all of the output layers (or as many output layers as is suitable for the display equipment). In the example presented above scalability layers are to be overlapped as part of the decoding or displaying process, as governed by the scalability type (O slice) of the EL.

The MV-HEVC/SHVC design allows access units in which the pictures may represent a subset of the layers present in the bitstream. This characteristic can be used for example for the following purposes:

Different picture rate in different layers, e.g. the base layer at a lower spatial resolution with 60 Hz and the enhancement layer at a higher spatial resolution with 30 Hz;

Use of SHVC for enabling adaptive resolution change of otherwise single-layer bitstream;

Layer-wise start-up, where the number of layers is step-wise increased after the start of the bitstream.

The MV-HEVC/SHVC design includes output layer sets specified in the VPS extension, each of which specifies the layers that are output by the decoder when that output layer set is in use. The selection of the output layer set in use is intended to be performed by external means (e.g. through an interface to the decoding), similarly to selecting the target temporal level for example. Each specified output layer set may be tested in conformance checking with HRD. In order to enable conformance checking in the HRD, the selected output layer set must remain unchanged for the entire coded video sequence (CVS). Term target output layer set may be used for the output layer set that has been selected into use by external means or by the HRD. Term target output layer may be used for each output layer included in a target output layer set.

The MV-HEVC/SHVC draft specification (in documents JCT3V-E1004 and JCTVC-N1008, respectively) derives a default output layer set for each layer set specified in the VPS. The VPS extension flag default_one_target_output_layer_flag, when equal to 0, may specify that each layer is an output layer, and when equal to 1, may specify that only the highest layer is an output layer. In addition, to the default output layer sets, the VPS extension enables to specify additional output layer sets with selected layers indicated to be output layers.

The target output layer set affects the picture output from the decoding process and/or HRD. Only pictures that are on target output layers may be output (depending on their value of PicOutputFlag and depending on impacts of pictures having NoOutputOfPriorPicsFlag equal to 1, if any). Pictures that are not on target output layers are not output. This may be enforced for example by setting PicOutputFlag equal to 0 for pictures that are not included in any target output layer.

The SVC approach of using a scalability dimension (quality_id in SVC) for indicating layers that may or may not be present in access units couples the layer output behavior with the scalability dimension. Consequently, the scalability dimension value itself would not be sufficient e.g. to differentiate between spatial and SNR scalability, as it merely indicates that the layers are alternatives when it comes to output and the preference order of outputting the layers (e.g. the layer representation with the highest present quality_id is decoded and output). Moreover, the SVC approach required the base layer representation (quality_id equal to 0) to be present in each access unit, which may be undesirable e.g. in temporal scalability use cases.

In some embodiments each output layer in an output layer set may be associated with a minimum alternative output layer. The minimum alternative output layer for each output layer of each output layer set may be indicated in a sequence-level syntax structure (e.g. VPS in H.265/HEVC and its extensions). It is used to specify the minimum layer identifier value of a picture that can be output instead of the specified output layer, if a picture at the output layer is not present in an access unit. The first direct or indirect inter-layer reference picture present in the access unit in descending layer identifier order down to the indicated minimum alternative output layer may be output.

Figure 12:
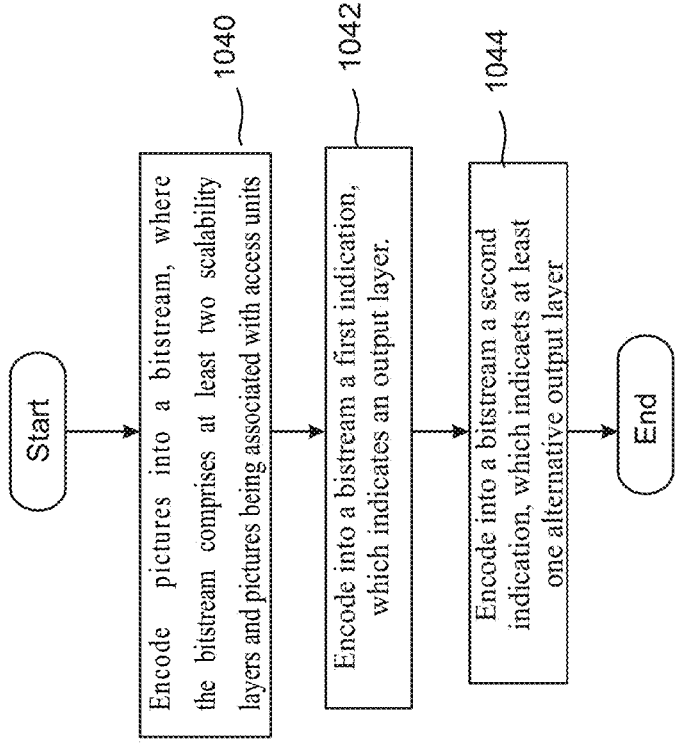
FIG. 12 shows a high level flow chart of an encoding method.

In an example method shown in FIG. 12 pictures are encoded into a bitstream 1040. The bitstream comprises at least two scalability layers and pictures being associated with access units. A first indication and a second indication are encoded into the bitstream 1042, 1044. The first indication is configured to indicate an output layer, and the second indication is configured to indicate at least one alternative output layer. The first indication and the second indication jointly have an impact that a first picture of said at least one alternative output layer is output by a decoding process of the bitstream when no picture of the output layer is in an access unit containing said first picture of said at least one alternative output layer. In a further embodiment, the layers are associated with one or more scalability dimensions and with different value sets of the one or more scalability dimensions. The second indication is coded independently of the one or more scalability dimensions.

Figure 13:
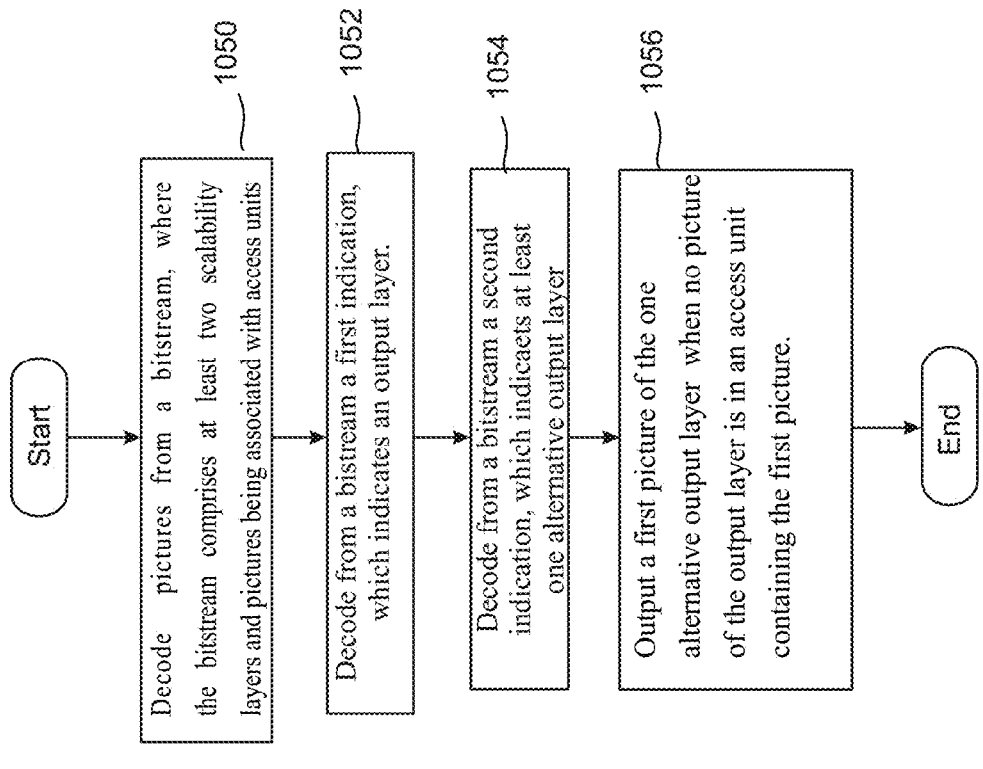
FIG. 13 shows a high level flow chart of a decoding method.

In an example method shown in FIG. 13, pictures may be decoded from a bitstream 1050. The bitstream comprises at least two scalability layers and at least two pictures being associated with access units. A first indication and a second indication may be decoded from the bitstream 1052, 1054. The first indication may indicate an output layer, and the second indication may indicate at least one alternative output layer. A first picture of the at least one alternative layer may be output 1056 when no picture of the output layer is in a first access unit containing said first picture. In a further embodiment, a second picture of the output layer may be output, the second picture being associated with a second access unit. In a further embodiment, the layers may be associated with one or more scalability dimensions and with different value sets of the one or more scalability dimensions. The second indication may be coded independently of the one or more scalability dimensions. Hence, the assignment of one or more scalability dimensions and their values to layers may be decoded independently of decoding the second indication to conclude at least one alternative output layer.

Yet in other words, each output layer may be associated with a minimum alternative output layer. For the default output layer sets, the minimum output layer may be the same as the output layer; i.e. when a default output layer set is in use, the decoder may output only the specified output layers. For the additional output layer sets, the syntax element min_alt_output_layer_idx[i][j] is added to the VPS extension syntax for each output layer of the non-default output layer sets.

It is

```
if( output_layer_flag[ i ][ j ] )
    min_alt_output_layer_idx[ i ][ j ]          ue(v)
}
``` used to specify the minimum nuh_layer_id value of a picture that can be output instead of the specified output layer, if a picture at the output layer is not present in an access unit. The first direct or indirect inter-layer reference picture present in the access unit in descending nuh_layer_id order down to the minimum value derived from min_alt_output_layer_idx[i][j] is output.

The variables NumRecursiveRefLayers[i] and RecursiveRefLayerFlag[i][j] are derived and indicate the number of direct and indirect reference layers and the direct and indicated reference layer mask, respectively, for layer i. The variables NumRecursiveRefLayers[i] and RecursiveRefLayerFlag[i][j] are derived as follows:

NumRecursiveRefLayers[i] and RecursiveRefLayerFlag[i][j] are first initialized to 0 for all values of i and j in the range of 0 to 63, inclusive.
  The function setRefLayerFlags(currLayerId) is specified as follows. The function is used to modify RecursiveRefLayerFlag[i][j].
    for(j=0; j<NumDirectRefLayers[currLayerId]; j++)
      refLayerId=RefLayerId[currLayerId][j]
      setRefLayerFlags(refLayerId)
      for(k=0; k<=63; k++)
        RecursiveRefLayerFlag[currLayerId][k]=
          RecursiveRefLayerFlag[currLayerId][k]|RecursiveRefLayerFlag[refLayerId][k]
  The function setRefLayerFlags(currLayerId) is called as follows:
    for(i=0; i<=vps_max_layers_minus1; i++) {
    iNuhLId=layer_id_in_nuh[i]
    setRefLayerFlags(iNuhLId)
    for(j=0; j<i; j++)
      NumRecursiveRefLayers[iNuhLId]+=RecursiveRefLayerFlag[iNuhLId][j]

The variable OutputLayerFlag[i][j] for output layer set with index i and for layer j is derived and indicates whether the layer is an output layer.

The variable MinAltOutputLayerId[i][j] for output layer set with index i and for layer j is derived and indicates the minimum nuh_layer_id value of a picture that can be output instead of the specified output layer, if a picture at the output layer is not present in an access unit. min_alt_output_layer_idx[i][j] is used to derive variable MinAltOutputLayerId[i][j]. The value of min_alt_output_layer_idx[i][j] shall be in the range of 0 to NumRecursiveRefLayers[LayerSetLayerIdList[lsIdx][j]−1, inclusive.

Variables OutputLayerFlag[i][j] and MinAltOutputLayerId[i][j] where i is the index of the output layer set and j is a nuh_layer_id value are derived as follows:

```
for( i = 0; i < numOutputLayerSets; i++) {
  for( j = 0; j <= 63; j++ ) {
    OutputLayerFlag[ i ][ j ] = 0
    MinAltOutputLayerId[ i ][ j ] = 0
  }
  if( i <= vps_number_layer_sets_minus1 )
    if( default_one_target_output_layer_flag ) {
      layerId = LayerSetLayerIdList[ i ][ NumLayersInIdList[ i ] − 1]
      OutputLayerFlag[ i ][ layerId ] = 1
      MinAltOutputLayerId[ i ][ layerId ] = layerId
    } else
```

```
        for( j = 0; j < NumLayersInIdList[ i ]; j++ ) {
           layerId = LayerSetLayerIdList[ i ][ j ]
           OutputLayerFlag[ i ][ layerId ] = 1
           MinAltOutputLayerId[ i ][ layerId ] = layerId
        }
     else {
        lsIdx = output_layer_set_idx_minus1[ i ] + 1
        for( j = 0 ; j < NumLayersInIdList[ lsIdx ] - 1; j++) {
           layerId = LayerSetLayerIdList[ i ][ j ]
           OutputLayerFlag[ i ][ layerId ] = output_layer_flag[ i ][ j ]
           MinAltOutputLayerId[ i ][ layerId ] =
LayerSetLayerIdList[ i ][ min_alt_output_layer_idx[ i ][ j ] ]
        }
     }
  }
```

The variable TargetOutputLayerSetIdx is set by external means, or (if not set by external means) by the HRD, or (if neither of the previous) set to 0.

If some external means is available to set TargetOutputLayerSetIdx, TargetOutputLayerSetIdx is set by the external means.

Otherwise, if the decoding process is invoked in a bitstream conformance test.

Otherwise, TargetOutputLayerSetIdx is set equal to 0.

In an embodiment the derivation of PicOutputFlag stays unchanged compared to the current MV-HEVC and SHVC drafts (documents JCT3V-E1004 and JCTVC-N1008, respectively) when each picture is decoded. This process basically sets the value of PicOutputFlag as if the picture belonged to a layer that is output. When all pictures of an access unit have been decoded the values of PicOutputFlag are updated depending on the output layers in the output layer set in use and if output layers are present in the access unit.

When the decoding of the last picture of an access unit has been completed PicOutputFlag for each picture in the access unit is updated as follows:

If an access unit does not contain a picture at a target output layer and alt_output_layer_flag is equal to 1, the following ordered steps apply:

The list nonOutputLayerPictures is the list of pictures of the access unit with PicOutputFlag equal to 1 and with nuh_layer_id values that are included in the TargetDecLayerIdList (i.e. the layer identifier values of the layers being decoded) and that are not on target output layers.

The picture with the highest nuh_layer_id value among the list nonOutputLayerPictures is removed from the list nonOutputLayerPictures.

PicOutputFlag for each picture that is included in the list nonOutputLayerPictures is set equal to 0.

Otherwise, PicOutputFlag for pictures that are not included in a target output layer is set equal to 0.

In some embodiments, to indicate a composition of pictures of different time instants, some usability information may be embedded to the video bitstream indicating the intended display behavior when more than one layer is used and associated display behavior using this information. More specifically, the embedded information may indicate how the layers need to be composed in the video bitstream. In some embodiments the information to be embedded includes one or more of the following: The information may indicate if the intended display behaviour is to combine base layer and enhancement layer decoded pictures. The information may indicate that the base and enhancement layer decoded pictures are allowed to be overlaid. In addition or alternatively, the information may indicate that the enhancement layer picture should not be combined with base layer picture during display. One further option is that the information indicates that the intended display behaviour is to modify the decoded primary picture according to the decoded auxiliary pictures associated with the primary picture as determined by the type and indicated characteristics of the auxiliary pictures, or whether such modification is allowed but not always required. In some embodiments, the

```
for( i =0; i <= 63; i++ )
   outputLayerIdNeeded[ i ] = 0
for( i = 0; i <= 63; i++ )
   if( OutputLayerFlag[ TargetOutputLayerSetIdx ][ i ] )
      if( picture with nuh_layer_id equal to i is present in the access unit &&
         PicOutputFlag of the picture with with nuh_layer_id equal to i in the access unit
is equal to 1 )
         outputLayerIdNeeded[ i ] = 1
      else {
         foundFlag = 0
         for( j = i - 1; j >= MinAltOutputLayerId[ TargetOutputLayerSetIdx ][ i ] &&
!foundFlag; j--)
            if( RecursiveRefLayerFlag[ i ][ j ] &&
              picture with nuh_layer_id equal to j is present in the access unit
&&
              PicOutputFlag of the picture with with nuh_layer_id equal to i in
access unit is equal to 1 ) {
                 outputLayerIdNeeded[ j ] = 1
                 foundFlag = 1
            }
      }
for( i =0; i <= 63; i++ )
   if( picture with nuh_layer_id equal to i is present in the access unit &&
      PicOutputFlag of the picture with nuh_layer_id equal to i in the access unit is equal to 1
&&
      outputLayerIdNeeded[ i ] is equal to 0 )
         PicOutputFlag of of the picture with nuh_layer_id equal to i in the access unit is set
equal to 0
```

In some embodiments, the following may apply for one or more decoded access units:

auxiliary picture layers and/or auxiliary picture types to which the information applies may be indicated.

In the absence of a picture at an output layer and, in some embodiments, in the absence of a picture in any alternative output layer for the output layer, the information may indicate one of the following:
The intended display behavior is, within an access unit, to combine pictures at output layers that are present in an access unit and the previous picture (in output order) of those output layers that are not present in the access unit;
The intended display behavior is, within an access unit, to interpolate a picture from other pictures in the output layer; or
The intended display behavior is, within an access unit, to synthesize pictures for the viewpoints of output layers using depth-image-based rendering.

In some embodiments, the method to combine pictures at output layers to form a picture to be displayed may be pre-defined for example in a coding standard or in the semantics of the signaling for the indication, such as in the semantics of an SEI message used to indicate the displaying behavior. For example, combining pictures at output layer may be specified to mean overlaying pictures on top of each other according to various embodiments. Alternatively, the method to combine pictures may be inferred by the encoder and/or the decoder for example from the types or scalability dimensions of output layers. For example, if a first output layer is an alpha plane, it may be inferred to specify the transparency of a second output layer compared to another layer (which may be in the same bitstream, e.g. as a third output layer, or in a different bitstream) when the second output layer and another layer are overlaid. Alternatively, the method to combine pictures may be indicated by the encoder in the bitstream and/or decoded by the decoder from the bitstream. The method may be indicated for example as an index or an identifier to a set of pre-defined methods, which may be specified for example in a coding standard or in the semantics of the signaling for the indication, such as in the semantics of an SEI message. The pre-defined methods may for example include: overlaying of pictures at output layers, overlaying pictures at output layers with weighting as determined by alpha plane(s).

In some embodiments the associated display behavior for the above indications may also be implemented: If the indication in the bitstream is to overlay base layer and enhancement layer decoded pictures and the decoder receives both base and enhancement layers, the final picture displayed is decoded enhancement layer picture overlaid on decoded base layer picture. If the indication in the bitstream is that the base and enhancement layer decoded pictures are allowed to be overlaid and the decoder receives both base and enhancement layer, the final picture shown on display is either the decoded enhancement layer picture or decoded base layer picture.

In some embodiments the indication may also indicate that, if among the output pictures or output layers there are auxiliary pictures (e.g. alpha planes), which ones of those output pictures/layers should be processed (e.g. alpha blending applied) in generating the picture to be displayed; or which ones of those output pictures/layers are not required to be processed (but may be).

In some embodiments the indication may also indicate that, if an output layer is missing from an access unit, the missing picture should be replaced with the previous one (in output order) from the same layer. In some embodiments, it is recommended not to replace the missing picture with the previous one (in output order) from the same layer.

In depth-enhanced multiview coding the indication may also indicate that, if an output layer is missing from an access unit, the missing picture should be replaced with a synthesized one using depth-image-based rendering. In some embodiments, it is recommended not to replace the missing a synthesized picture.

It needs to be understood that while the embodiments above and some other embodiments refer to the indication (in singular), embodiments may be similarly realized when there are several indications. An indication may be one or more syntax elements (each associated with certain mnemonic name) and/or one or more syntax element values.

In some embodiments, an encoder or another entity, such as a file creator, receives the intended display behavior of different layers to be encoded through an interface. The intended display behavior may be for example by the user or users creating the content through a user interface, the settings of which then affect the intended display behavior that the encoder receives through an interface.

In some embodiments, an encoder or another entity, such as a file creator, determines, based on the input content and/or the encoding settings, the intended display behavior. For example, if two views are provided as input to be coded as layers, the encoder may determine that the intended display behavior is to display the views separately (e.g. on a stereoscopic display). In another example, the encoder receives encoding settings that a region-of-interest enhancement layer (EL) is to be encoded. The encoder may, for example, have a heuristic rule that if the scale factor between the ROI enhancement layer and its reference layer (RL) is smaller than or equal to a certain limit, e.g. 2, the intended display behavior is to overlay an EL picture on top of the respective upsampled RL picture.

Based on the received and/or determined display behavior, an encoder or another entity, such as a file creator, encodes an indication of the intended display behavior of two or more layers into the bitstream, for example in a sequence-level syntax structure, such as VPS and/or SPS (in which the indication may reside within their VUI part), or as SEI, e.g. in a SEI message. Alternatively or in addition, an encoder or another entity, such as a file creator, encodes an indication of the intended display behavior of two or more layers into a container file that includes coded pictures. Alternatively or in addition, an encoder or another entity, such as a file creator, encodes an indication of the intended display behavior of two or more layers into a description, such as MIME media parameters, SDP, or MPD.

A decoder or another entity, such as a media player or a file parser, decodes an indication of the intended display behavior of two or more layers from the bitstream, for example from a sequence-level syntax structure, such as VPS and/or SPS (in which the indication may reside within their VUI part), or through SEI mechanism, e.g. from a SEI message. Alternatively or in addition, a decoder or another entity, such as a media player or a file parser, decodes an indication of the intended display behavior of two or more layers from a container file that includes coded pictures. Alternatively or in addition, a decoder or another entity, such as a media player or a file parser, decodes an indication of the intended display behavior of two or more layers from a description, such as MIME media parameters, SDP, or MPD. Based on the decoded display behavior, a decoder or another entity, such as a media player or a file parser, creates one or more pictures to be displayed from decoded (and possibly cropped) pictures of two or more layers. A decoder or another entity, such as a media player or a file parser, may also display the one or more pictures to be displayed.

An example implementation to indicate the intended display behavior for ROI layers utilizes Supplemental Enhancement Information (SEI) mechanism, and the details of an SEI message including some of the above-described indications are shown below:

|  | Descriptor |
| --- | --- |
| display_composition_layers( payloadSize ) { | |
|   display_composition_id | ue(v) |
|   display_composition_cancel_flag | u(1) |
|   if( !display_composition_cancel_flag ) { | |
|     display_composition_persistence_flag | u(1) |
|     num_display_composition_hints | ue(v) |
|     for( i = 0; i < num_display_composition_hints; i++) { | |
|       display_composition_layer_id[ i ] | u(6) |
|       display_composition_idc[ display_composition_layer_id[ i ] ] | u(2) |
|     } | |
|   } | |
| } | |

This SEI message indicates the intended displaying behaviour, when two or more layers are output layers in an output layer set and either scaled reference layer offsets are specified between these layers or all of these layers have the same values of ScalabilityId[i][ j] values for values of j not equal to 2.

display_composition_id contains an identifying number that may be used to identify the usage of the display composition layers SEI message. It may be required that the value of display_composition_id is within a certain range, such as in the range of 0 to $2^{32}-2$, inclusive.

Value ranges of display_composition_id may be reserved for different purposes and/or organizations. For example, values of display_composition_id from 0 to 255 and from 512 to $2^{31}-1$ may be used as determined by the application, and/or values of display_composition_id from 256 to 511 and from $2^{31}$ to $2^{32}-2$ may be reserved for future use. Decoders may be required to ignore all display composition layers SEI messages containing a value of display_composition_id that is reserved for future use, and it may be required that bitstreams do not contain such values.

display_composition_cancel_flag equal to 1 indicates that the display composition layers SEI message cancels the persistence of any previous display composition layers SEI message in output order. display_composition_cancel_flag equal to 0 indicates that display composition hint information follows.

display_composition_persistence_flag specifies the persistence of the display composition layers SEI message.

display_composition_persistence_flag equal to 0 specifies that the display composition layers SEI message applies to the current access unit only.

display_composition_persistence_flag equal to 1 specifies that the display composition layers SEI message persists in output order until any of the following conditions are true:
  A new CVS begins.
  The bitstream ends.
  A picture in an access unit containing a display composition layers SEI message with the same value of display_composition_id is output following, in output order, the current picture, which condition may in HEVC and/or its extensions be the same as having PicOrderCntVal greater than PicOrderCnt(CurrPic).

num_display_composition_hints specifies the number of display composition hints present in the SEI message.

display_composition_layer_id[i] specifies the nuh_layer_id value for which display_composition_idc[i] is specified. A picture is associated with display_composition_layer_id[i], when the picture has nuh_layer_id equal to display_composition_layer_id[i]. In some embodiments, when an access unit has no picture with nuh_layer_id equal to display_composition_layer_id[i], a picture is associated with display_composition_idc[i] when the picture is in an alternative output layer of nuh_layer_id equal to display_composition_layer_id[i]. In HEVC and/or its extensions, when alt_output_layer_flag is equal to 1 and an access unit has no picture with nuh_layer_id equal to display_composition_layer_id[i], the picture associated with display_composition_idc[i] is selected to be output from the list nonOutputLayerPictures. The value of display_composition_layer_id[i] may be required to be among the layer_id_in_nuh[j] values when j is in the range of 1 to MaxLayersMinus1, inclusive, and shall be an output layer of at least one output layer set specified in the active VPS.

display_composition_idc[display_composition_layer_id[i]] specifies the intended display behaviour of the associated picture as specified in the following table. When not present, the value of display_composition_idc[display_composition_layer_id[i]] may be inferred to be equal to 0.

| display_composition_idc | Intended display behavior |
| --- | --- |
| 0 | The associated picture may or may not be overlaid over the decoded and output pictures with nuh_layer_id less than that of the associated picture |
| 1 | The associated picture should be overlaid over the decoded and output pictures with nuh_layer_id less than that of the associated picture |
| 2 | The associated picture should not be overlaid over the decoded and output pictures with nuh_layer_id less than that of the associated picture |

It needs to be understood that the above-described SEI message is merely a non-limiting example embodiment. Other similar embodiments of SEI messages may be realized for example by omitting some syntax elements and/or syntax element values of the presented SEI message or adding other syntax elements and/or syntax element values.

A decoder or a player according to an embodiment may include an output picture overlaying process, which may take as input two or more pictures from different layers that represent the same output time or the same output order. Said two or more pictures may for example reside on different scalability layers in the same access unit and both scalability layers may be output layers in an output layer set.

In some embodiments, a z-order or an overlaying order may be indicated by the encoder or another entity in the bitstream. In some embodiments, a z-order or an overlaying order may be inferred for example to be an ascending layer identifier order.

In the output picture overlaying process, scaled reference layer offsets and/or sampling grid offset are applied to locate said two or more pictures of said scalability layers on the same coordinates. Scaled reference layer offsets, which may be indicated e.g. by the encoder e.g. in SPS and/or VPS, may indicate the top, left, bottom and right offset values between a current picture of a current layer and a resampled reference layer picture, where the reference layer can be for example a layer preceding the current layer in the a z-order. Horizontal and vertical scaling factors may be counted based on scaled reference layer offsets or alike. If one or both of the horizontal scaling factor and the vertical scaling factor is not equal to 1, the reference layer picture may be resampled. For example, an upsampling process as described earlier may be used.

The output picture of the output picture overlaying process may be formed by locating the possibly resampled sample arrays of the two or more pictures in the z-order on top of each in such a manner that the sample array later in the z-order covers or replaces the sample values in collocated positions of the sample arrays earlier in the z-order. For example, an enhancement-layer picture representing a region of interest (ROI) of the base layer would replace that ROI of the base layer picture in the output overlaying process.

In addition to overlaying said two or more pictures, the output picture overlaying process may include aligning the decoded representations of said two or more pictures. For example, if one picture is represented by the YUV 4:2:0 chroma format and the other one, later in the z-order, is represented by the YUV 4:4:4 chroma format, the first one may be upsampled to YUV 4:4:4 as part of the process. Likewise, if one picture is represented by a first color gamut or format, such as TTU-R BT.709, and another one, later in the z-order, is represented by a second color gamut or format, such as TTU-R BT.2020, the first one may be converted to the second color gamut or format as part of the process.

In addition, the output picture overlaying process may include one or more conversions from a color representation format to another (or, equivalently, from one set of primary colors to another set of primary colors). The destination color representation format may be selected for example based on the display in use. For example, the output picture overlaying process may include a conversion from YUV to RGB Eventually, when all of the said two or more pictures are overlaid and processed as described above, the resulting picture may form the picture to be displayed.

It needs to be understood that the output picture overlaying process may additionally contain other steps than those described above and may lack some steps from those described above. Alternatively or additionally, the described steps of the output picture overlaying process may be performed in another order than that described above.

In another example embodiment, a decoder or a player according to an embodiment may operate as follows in response to the SEI message presented above. When the SEI message persists, the following ordered steps are applied for each decoded and output picture of an access unit in ascending order of nuh_layer_id of the decoded and output pictures to compose one or more pictures to be displayed. For the following example procedure, the current picture is defined to be the decoded and output picture of an access unit for which the steps apply. Each picture to be displayed is associated with a list of nuh_layer_id values called compositionLayers[layerId], where layerId is the smallest nuh_layer_id of the decoded and output pictures that is used to compose the picture to be displayed.

When the current picture is associated with display_composition_idc[display_composition_layer_id[i]] equal to 0, any alternative indication, which may be provided within the bitstream or by other means, is used to infer display_composition_idc[display_composition_layer_id[i]] equal to 1 or 2 for the current picture. The variable currLayerId is set equal to the nuh_layer_id value of the current picture. If the current picture has nuh_layer_id equal to 0 or is associated with display_composition_idc[display_composition_layer_id[i]] equal to 2, compositionLayers[currLayerId] is set equal to currLayerId and a picture to be displayed associated with compositionLayers[currLayerId] is formed by the current picture. On the other hand, if the current picture does not have nuh_layer_id equal to 0 and is not associated with display_composition_idc[display_composition_layer_id[i]] equal to 2, the following may apply.

If scaled reference layer offset parameters apply between the current picture and any of the decoded and output pictures in the same access unit with nuh_layer_id less than that of the current picture, refLayerId is set equal to the greatest value of nuh_layer_id relative to which scaled reference layer offset parameters are provided for the current picture and among the nuh_layer_id values of the decoded and output pictures in the same access unit. Otherwise, refLayerId is set equal to the greatest value of nuh_layer_id that is among the nuh_layer_id values of the decoded and output pictures of the same access unit that is smaller than currLayerId. A value of baseLayerId is set to such value for which the list compositionLayers[baseLayerId] includes refLayerId. The list compositionLayers[baseLayerId] is appended by currLayerId.

When needed, the current picture or the picture to be displayed associated with compositionLayers[baseLayerId] or both of them may be resampled so that the sample size of the current picture and the picture to be displayed match and the sampling grid positions of the current picture and the picture to be displayed are aligned. The samples of the picture to be displayed associated with compositionLayers[baseLayerId] that collocate with the current picture may be set equal to the collocated samples of the current picture.

There are several alternatives described to the above implementation, some of which are briefly discussed in the following.

Instead of transmitting the SEI message, the information could be derived from the other information present in the bitstream. For example, if the enhancement layer has a higher resolution but only corresponds to a small region in the base layer picture, it could be inferred that the EL picture should not be overlaid to BL picture.

When EL picture is overlaid to BL picture, the upsampling filter that is used to compose the overlaid picture from BL samples can be different than the upsampling filter used in the decoding process of EL picture. Alternatively the upsampling filter used for composing the overlaid picture can be signaled in the bitstream by an encoder and/or decoded from the bitstream by a decoder.

It should be understood that even though some embodiments are described with reference to ROI EL, the embodiments can likewise be applied to any type of EL (not necessarily ROI). For example, the embodiments may be applied to indicate the intended displaying behavior of scene transitions.

In some embodiments, the semantics of display_composition_idc (or any other similar indication for indicating the preferred display operation) may be appended to indicate whether auxiliary pictures should be applied in the display process or the player (or alike) can choose whether or not to apply auxiliary pictures in the display process. For example, the semantics may be specified as follows:

| display_composition_idc | Intended display behavior |
|---|---|
| 0 | When the associated picture is a primary picture, the associated picture may or may not be overlaid over the decoded and output primary pictures with nuh_layer_id less than |

| display_composition_idc | Intended display behavior |
| --- | --- |
| | that of the associated picture.<br>When the associated picture is an auxiliary picture, the process specified by the semantics of the auxiliary picture may or may not be applied to modify the primary picture associated with the auxiliary picture. |
| 1 | When the associated picture is a primary picture, the associated picture should be overlaid over the decoded and output pictures with nuh_layer_id less than that of the associated picture.<br>When the associated picture is an auxiliary picture, the process specified by the semantics of the auxiliary picture should be applied to modify the primary picture associated with the auxiliary picture. |
| 2 | The associated picture should not be overlaid over the decoded and output pictures with nuh_layer_id less than that of the associated picture |

In some embodiments, the syntax may include indication(s) of which auxiliary picture layers and/or auxiliary picture types are required to be used in generating a picture to be displayed. For example, the following syntax may be used:

| | Descriptor |
| --- | --- |
| display_composition_layers( payloadSize ) { | |
|   display_composition_id | ue(v) |
|   display_composition_cancel_flag | u(1) |
|   if( !display_composition_cancel_flag ) { | |
|     display_composition_persistence_flag | u(1) |
|     num_display_composition_hints | ue(v) |
|     for( i = 0; i < num_display_composition_hints; i++) { | |
|       display_composition_layer_id[ i ] | u(6) |
|       display_composition_idc[ display_composition_layer_id[ i ] ] | u(2) |
|       num_aux_types [ i ] | ue(v) |
|       for( j = 0; j < num_aux_types[ i ]; j++ ) | |
|         req_aux_id[ j ] | u(8) |
|     } | |
|   } | |
| } | |

The semantics of the added syntax elements may be specified as follows. num_aux_types[i] specifies the number of auxiliary picture types that should be processed when generating a picture to be displayed for a primary picture with nuh_layer_id equal to display_composition_layer_id [i]. req_aux_id[i] specifies the AuxId value of the auxiliary picture that is associated with the primary picture and required to be processed in order to generate a picture to be displayed from the primary picture.

In some embodiments, the encoder or another entity may indicate in the bitstream, e.g. in the display composition layers SEI message, what is the intended display behavior when a picture of an output layer is not present in an access unit. In some embodiments, the encoder or another entity may indicate in the bitstream, e.g. in the display composition layers SEI message, what is the intended display behavior when a picture of an output layer or any alternative output layer of the output layer is not present in an access unit. Likewise, in some embodiments, the decoder (or another entity such as a player) may decode from the bitstream, e.g. from the display composition layers SEI message, what is the intended display behavior when a picture of an output layer is not present in an access unit. In some embodiments, the decoder (or another entity such as a player) may decode from the bitstream, e.g. from the display composition layers SEI message, what is the intended display behavior when a picture of an output layer or any alternative output layer of the output layer is not present in an access unit.

FIG. 16 illustrates an example method at an encoder. The encoder or another entity may encode 160 pictures into a bitstream, where the bitstream comprises at least two scalability layers being associated with access units. The encoder may encode 162 into the bitstream at least a first indication which indicates a first output layer and a second output layer. The encoder may also encode 164 into the bitstream a second indication, which indicates at least one alternative output layer of the first output layer. In some embodiments, step 164 is omitted. The encoder may further encode 166 into the bitstream a third indication, which indicates the intended displaying behaviour of the first output layer and the second output layer. The third indication may, in general, indicate the intended displaying behavior, when two or more layers are output layers in an output layer set.

FIG. 17 illustrates an example method at a decoder. The decoder or another entity may decode 170 pictures from a bitstream, where the bitstream comprises at least two scalability layers being associated with access units. The decoder may decode 172 from the bitstream at least a first indication, which indicates a first output layer and a second output layer. The decoder may also decode 174 from the bitstream a second indication, which indicates at least one alternative output layer of the first output layer. If a picture of the first output layer is not present, the decoder may instead use a picture of the at least one alternative output layer subsequently. In some embodiments, step 174 is omitted. The decoder may further decode 176 from the bitstream a third indication, which indicates the intended displaying behavior of the first output layer and the second output layer. The third indication may, in general, indicate the intended displaying behavior, when two or more layers are output layers in an output layer set. The decoder may display 178 either both a first picture of the first output layer and a second picture of the second output layer, or a combined picture depending on the guidance revealed by the third indication.

Continuing the example embodiments presented in the previous paragraph, the intended display behavior may be (but is not limited to) one or more of the following:

When a picture of an output layer is not present in an access unit, the role of the previous picture in output order of the output layer in the process of generating a picture to be displayed from the access unit is indicated in (or decoded from) the bitstream or inferred. The role may be selected from one or more of the following: the previous picture should be used, may or may not be used, or should not be used in the process of generating a picture to be displayed. The previous picture may be further constrained for example so that only sub-layer reference pictures with TemporalId equal to 0 may be considered as a previous picture.

When a picture of an output layer is not present in an access unit with a certain picture order count (POC), the role of the closest picture, in terms of POC relative to the POC of the access unit, of the output layer in the process of generating a picture to be displayed from the access unit is indicated in (or decoded from) the bitstream or inferred. If there are several pictures equally close, for example the picture earlier in decoding order may be selected. The role the closest picture may be selected from one or more of the following: the closest picture should be used, may or may not be used, or should not be used in the process of generating a picture to be displayed. The closest picture may be further constrained for example so that only sub-layer reference pictures with TemporalId equal to 0 may be considered as a previous picture.

When a picture of an output layer is not present in an access unit, the picture to be used instead may be indicated in the bitstream or decoded from the bitstream, e.g. using its POC value, POC LSB value, or long-term reference picture index. For example, a background picture may be identified this way. In this embodiment and other embodiments where one or more pictures and/or access units are identified through a value, one or more of the following syntax elements or variables or combinations thereof may be used:
 a picture order count value;
 a part of the picture order count value;
 a frame number value;
 a variable derived from the frame number value;
 a temporal reference value;
 a decoding timestamp;
 a composition timestamp;
 an output timestamp;
 a presentation timestamp;
 an index of a long-term reference picture.

When a picture of an output layer is not present in an access unit and represents a view in a stereoscopic or multiview bitstream and when depth views or depth auxiliary pictures are present, the role of others pictures in the same access unit for the process of generating a picture to be displayed is indicated in (or decoded from) the bitstream or inferred. The role may be selected from one or more of the following: the other pictures should be used, may or may not be used, or should not be used in the process of generating a picture to be displayed. The process of generating a picture to be displayed may use a depth-image-based rendering method, in which one or more texture and depth pictures representing another viewpoint may be used in generating a picture at the output layer (representing a certain viewpoint). In another example, a depth picture may be present or synthesized for the viewpoint of the output layer, and backward warping (a.k.a. backward view synthesis) is used to generate a picture at the output layer.

In some embodiments, when a picture of an output layer or any of its alternative output layers is not present in an access unit, the role of the previous picture in output order of the output layer or any of its alternative output layers in the process of generating a picture to be displayed from the access unit is indicated in (or decoded from) the bitstream or inferred. The role may be selected from one or more of the following: the previous picture should be used, may or may not be used, or should not be used in the process of generating a picture to be displayed. The previous picture may be further constrained for example so that only sub-layer reference pictures with TemporalId equal to 0 may be considered as a previous picture.

In some embodiments, when a picture of an output layer or any of its alternative output layers is not present in an access unit with a certain picture order count (POC), the role of the closest picture, in terms of POC relative to the POC of the access unit, of the output layer or any of its alternative output layers in the process of generating a picture to be displayed from the access unit is indicated in (or decoded from) the bitstream or inferred. If there are several pictures equally close, for example the picture earlier in decoding order may be selected. The role the closest picture may be selected from one or more of the following: the closest picture should be used, may or may not be used, or should not be used in the process of generating a picture to be displayed. The closest picture may be further constrained for example so that only sub-layer reference pictures with TemporalId equal to 0 may be considered as a previous picture.

In some embodiments, when a picture of an output layer or any of its alternative output layers is not present in an access unit, the picture to be used instead may be indicated in the bitstream or decoded from the bitstream, e.g. using its POC value, POC LSB value, or long-term reference picture index. For example, a background picture may be identified this way.

In some embodiments, when a picture of an output layer or any of its alternative output layers is not present in an access unit and represents a view in a stereoscopic or multiview bitstream and when depth views or depth auxiliary pictures are present, the role of others pictures in the same access unit for the process of generating a picture to be displayed is indicated in (or decoded from) the bitstream or inferred. The role may be selected from one or more of the following: the other pictures should be used, may or may not be used, or should not be used in the process of generating a picture to be displayed. The process of generating a picture to be displayed may use a depth-image-based rendering method, in which one or more texture and depth pictures representing another viewpoint may be used in generating a picture at the output layer (representing a certain viewpoint). In another example, a depth picture may be present or synthesized for the viewpoint of the output layer, and backward warping (a.k.a. backward view synthesis) is used to generate a picture at the output layer.

FIG. 15b illustrates an example of a part of a picture stream provided in access units having two layers but in one access unit 204 the higher layer picture is missing.

An example embodiment of indicating the intended displaying behavior when a picture of an output layer, or in some embodiments a picture of an output layer or any of its alternative output layers, is not present in an access unit is presented below. The syntax may be identical or similar to other embodiments, but with a temporal_composition_idc syntax element added as follows:

| | Descriptor |
|---|---|
| display_composition_layers( payloadSize ) { | |
|   display_composition_id | ue(v) |
|   display_composition_cancel_flag | u(1) |
|   if( !display_composition_cancel_flag ) { | |
|     display_composition_persistence_flag | u(1) |
|     num_display_composition_hints | ue(v) |

| | Descriptor |
|---|---|
| ```
for( i = 0; i < num_display_composition_hints; i++) {
    display_composition_layer_id[ i ]
    display_composition_idc[ display_composition_layer_id[ i ] ]
    if( display_composition_idc[ display_composition_layer_id[ i ] ] = =
0 | |
      display_composition_idc[ display_composition_layer_id[ i ] ] = =1 )
      temporal_composition_idc[ display_composition_layer_id[ i ] ]
  }
  temporal_composition_idc[ 0 ]
  }
}
``` | u(6)<br>u(2)<br><br><br><br>u(2)<br><br>u(2) | temporal_composition_idc may be specified as follows. Let prevAu be the previous access unit, in output order, including a picture associated with display_composition_layer_id[i]. Let prevPic be the picture within the prevAu that is associated with display_composition_layer_id[i]. temporal_composition_idc[display_composition_layer_id[i]] equal to 0 specifies that when a picture associated with display_composition_layer_id[i] is not present in an access unit, prevPic may or may not be used when overlaying pictures to generate a picture to be displayed. temporal_composition_idc[display_composition_layer_id[i]] equal to 1 specifies that when a picture associated with display_composition_layer_id[i] is not present in an access unit, prevPic should be used when overlaying pictures to generate a picture to be displayed. temporal_composition_idc[display_composition_layer_id[i]] equal to 2 specifies that when a picture associated with display_composition_layer_id[i] is not present in an access unit, prevPic should not be used when overlaying pictures to generate a picture to be displayed.

In some embodiments, the above-described SEI message(s) may be associated with a certain layer or certain layers. The SEI message may be included in an SEI NAL unit in which the layer identifier (e.g. nuh_layer_id in H.265/HEVC and its extensions) is to be equal to the lowest value of display_composition_layer_id. Consequently, when layer identifier based sub-bitstream is performed, the SEI message gets removed when all layers that it concerns have been extracted out.

In some embodiments, the above-described SEI message(s) may be specific to certain output layer set. The SEI message may be included in a nesting SEI message that is indicated to concern only that output layer set.

In some embodiments, the syntax of the above-described SEI message(s) may be appended to identify the output layer set or output layer sets to which the provide display composition hints apply.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In one draft of HEVC standard, a coded video sequence was defined to be a sequence of access units that consists, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be an IDR access unit, a BLA access unit, or a CRA access unit. The value of NoRaslOutputFlag is equal to 1 for each IDR access unit, each BLA access unit, and each CRA access unit that is the first access unit in the bitstream in decoding order, is the first access unit that follows an end of sequence NAL unit in decoding order, or has HandleCraAsBlaFlag equal to 1. NoRaslOutputFlag equal to 1 has an impact that the RASL pictures associated with the IRAP picture for which the NoRaslOutputFlag is set are not output by the decoder. HandleCraAsBlaFlag may be set to 1 for example by a player that seeks to a new position in a bitstream or tunes into a broadcast and starts decoding and then starts decoding from a CRA picture.

A coded video sequence (CVS) in multiview and scalable extensions of HEVC may be specified as follows: A coded video sequence is a sequence of access units that consists, in decoding order, of an IRAP access unit containing an IRAP picture having nuh_layer_id equal to 0 and NoRaslOutputFlag equal to 1, followed by zero or more access units that are not IRAP access units containing an IRAP picture having nuh_layer_id equal to 0 and NoRaslOutputFlag equal to 1, including all subsequent access units up to but not including any subsequent access unit that is an IRAP access unit containing an IRAP picture having nuh_layer_id equal to 0 and NoRaslOutputFlag equal to 1.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP starts from an IDR access unit. In HEVC a closed GOP may also start from a BLA_W_DLP or a BLA_N_LP picture. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

Many hybrid video codecs, including H.264/AVC and HEVC, encode video information in two phases. In the first phase, pixel or sample values in a certain picture area or "block" are predicted. These pixel or sample values can be predicted, for example, by motion compensation mechanisms, which involve finding and indicating an area in one of the previously encoded video frames that corresponds closely to the block being coded. Additionally, pixel or sample values can be predicted by spatial mechanisms which involve finding and indicating a spatial region relationship.

Prediction approaches using image information from a previously coded image can also be called as inter prediction methods which may also be referred to as temporal prediction and motion compensation. Prediction approaches using image information within the same image can also be called as intra prediction methods.

The second phase is one of coding the error between the predicted block of pixels or samples and the original block of pixels or samples. This may be accomplished by transforming the difference in pixel or sample values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel or sample representation (i.e. the visual quality of the picture) and the size of the resulting encoded video representation (i.e. the file size or transmission bit rate).

The decoder reconstructs the output video by applying a prediction mechanism similar to that used by the encoder in order to form a predicted representation of the pixel or sample blocks (using the motion or spatial information created by the encoder and stored in the compressed representation of the image) and prediction error decoding (the inverse operation of the prediction error coding to recover the quantized prediction error signal in the spatial domain).

As explained above, many hybrid video codecs, including H.264/AVC and HEVC, encode video information in two phases, where the first phase may be referred to as a predictive coding and may include one or more of the following. In the so-called sample prediction, pixel or sample values in a certain picture area or "block" are predicted. These pixel or sample values can be predicted, for example, using one or more of the following ways:

Motion compensation mechanisms (which may also be referred to as a temporal prediction or motion-compensated temporal prediction), which involve finding and indicating an area in one of a previously encoded video frames that corresponds closely to the block being coded;

Inter-view prediction, which involves finding and indicating an area in one of the previously encoded view components that corresponds closely to the block being coded;

View synthesis prediction, which involves synthesizing a prediction block or image area where a prediction block is derived on the basis of reconstructed/decoded ranging information;

Inter-layer prediction using reconstructed/decoded samples, such as the so-called IntraBL mode of SVC; and Intra prediction, where pixel or sample values can be predicted by spatial mechanisms which involve finding and indicating a spatial region relationship.

In the so-called syntax prediction, which may also be referred to as a parameter prediction, syntax elements and/or syntax element values and/or variables derived from syntax elements are predicted from syntax elements (de)coded earlier and/or variables derived earlier. Non-limiting examples of syntax prediction are provided below.

In motion vector prediction, motion vectors e.g. for inter and/or inter-view prediction may be coded differentially with respect to a block-specific predicted motion vector. The predicted motion vectors may be created in a predefined way, for example by calculating the median of the encoded or decoded motion vectors of the adjacent blocks. Another way to create motion vector predictions, which may also be referred to as an advanced motion vector prediction (AMVP), is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted from adjacent blocks and/or co-located blocks in a temporal reference picture. Differential coding of motion vectors may be disabled across slice boundaries.

The block partitioning, e.g. from CTU to CUs and down to PUs, may be predicted.

In filter parameter prediction, the filtering parameters e.g. for sample adaptive offset may be predicted.

Another way of categorizing different types of prediction is to consider across which domains or scalability types the prediction crosses. This categorization may lead into one or more of the following types of prediction, which may also sometimes be referred to as prediction directions:

Temporal prediction e.g. of sample values or motion vectors from an earlier picture usually of the same scalability layer, view and component type (texture or depth);

Inter-view prediction, which may be also referred to as cross-view prediction, referring to prediction taking place between view components usually of the same time instant or access unit and the same component type;

Inter-layer prediction referring to prediction taking place between layers usually of the same time instant, of the same component type, and of the same view; and Inter-component prediction, which may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

Prediction approaches using image information from a previously coded image can also be called as inter prediction methods. Inter prediction may sometimes be considered to only include motion-compensated temporal prediction, while it may sometimes be considered to include all types of prediction where a reconstructed/decoded block of samples is used as a prediction source, therefore including conventional inter-view prediction, for example. Inter prediction may be considered to comprise only sample prediction but it may alternatively be considered to comprise both sample and syntax prediction.

As a result of syntax and sample prediction, a predicted block of pixels of samples may be obtained.

After applying pixel or sample prediction and error decoding processes the decoder combines the prediction and the prediction error signals (the pixel or sample values) to form the output video frame.

The decoder (and encoder) may also apply additional filtering processes in order to improve the quality of the output video before passing it for display and/or storing as a prediction reference for the forthcoming pictures in the video sequence.

Filtering may be used to reduce various artifacts such as blocking, ringing etc. from the reference images. After motion compensation followed by adding inverse transformed residual, a reconstructed picture is obtained. This picture may have various artifacts such as blocking, ringing etc. In order to eliminate the artifacts, various post-processing operations may be applied. If the post-processed pictures are used as a reference in the motion compensation loop, then the post-processing operations/filters are usually called loop filters. By employing loop filters, the quality of the reference pictures increases. As a result, better coding efficiency can be achieved.

Filtering may comprise e.g. a deblocking filter, a Sample Adaptive Offset (SAO) filter and/or an Adaptive Loop Filter (ALF).

A deblocking filter may be used as one of the loop filters. A deblocking filter is available in both H.264/AVC and HEVC standards. An aim of the deblocking filter is to remove the blocking artifacts occurring in the boundaries of the blocks. This may be achieved by filtering along the block boundaries.

In many video codecs, including H.264/AVC and HEVC, motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). H.264/AVC and HEVC, as many other video compression standards, divide a picture into a mesh of rectangles, for each of which a similar block in one of the reference pictures is indicated for inter prediction. The location of the prediction block is coded as a motion vector that indicates the position of the prediction block relative to the block being coded.

Inter prediction process may be characterized for example using one or more of the following factors.

The Accuracy of Motion Vector Representation.

For example, motion vectors may be of quarter-pixel accuracy, half-pixel accuracy or full-pixel accuracy and sample values in fractional-pixel positions may be obtained using a finite impulse response (FIR) filter.

Block Partitioning for Inter Prediction.

Many coding standards, including H.264/AVC and HEVC, allow selection of the size and shape of the block for which a motion vector is applied for motion-compensated prediction in the encoder, and indicating the selected size and shape in the bitstream so that decoders can reproduce the motion-compensated prediction done in the encoder.

Number of Reference Pictures for Inter Prediction.

The sources of inter prediction are previously decoded pictures. Many coding standards, including H.264/AVC and HEVC, enable storage of multiple reference pictures for inter prediction and selection of the used reference picture on a block basis. For example, reference pictures may be selected on macroblock or macroblock partition basis in H.264/AVC and on PU or CU basis in HEVC. Many coding standards, such as H.264/AVC and HEVC, include syntax structures in the bitstream that enable decoders to create one or more reference picture lists. A reference picture index to a reference picture list may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Many coding standards allow the use of multiple reference pictures for inter prediction. Many coding standards, such as H.264/AVC and HEVC, include syntax structures in the bitstream that enable decoders to create one or more reference picture lists to be used in inter prediction when more than one reference picture may be used. A reference picture index to a reference picture list may be used to indicate which one of the multiple reference pictures is used for inter prediction for a particular block. A reference picture index or any other similar information identifying a reference picture may therefore be associated with or considered part of a motion vector. A reference picture index may be coded by an encoder into the bitstream with some inter coding modes or it may be derived (by an encoder and a decoder) for example using neighboring blocks in some other inter coding modes. In many coding modes of H.264/AVC and HEVC, the reference picture for inter prediction is indicated with an index to a reference picture list. The index may be coded with variable length coding, which may cause a smaller index to have a shorter value for the corresponding syntax element.

Multi-Hypothesis Motion-Compensated Prediction.

H.264/AVC and HEVC enable the use of a single prediction block in P slices (herein referred to as uni-predictive slices) or a linear combination of two motion-compensated prediction blocks for bi-predictive slices, which are also referred to as B slices. Individual blocks in B slices may be bi-predicted, uni-predicted, or intra-predicted, and individual blocks in P slices may be uni-predicted or intra-predicted. The reference pictures for a bi-predictive picture may not be limited to be the subsequent picture and the previous picture in output order, but rather any reference pictures may be used. In many coding standards, such as H.264/AVC and HEVC, one reference picture list, referred to as reference picture list 0, is constructed for P slices, and two reference picture lists, list 0 and list 1, are constructed for B slices. For B slices, when prediction in forward direction may refer to prediction from a reference picture in reference picture list 0, and prediction in backward direction may refer to prediction from a reference picture in reference picture list 1, even though the reference pictures for prediction may have any decoding or output order with relation to each other or to the current picture.

Weighted Prediction.

Many coding standards use a prediction weight of 1 for prediction blocks of inter (P) pictures and 0.5 for each prediction block of a B picture (resulting into averaging). H.264/AVC allows weighted prediction for both P and B slices. In implicit weighted prediction, the weights are proportional to picture order counts, while in explicit weighted prediction, prediction weights are explicitly indicated. The weights for explicit weighted prediction may be indicated for example in one or more of the following syntax structure: a slice header, a picture header, a picture parameter set, an adaptation parameter set or any similar syntax structure.

In many video codecs, the prediction residual after motion compensation is first transformed with a transform kernel (like DCT) and then coded. The reason for this is that often there still exists some correlation among the residual and transform can in many cases help reduce this correlation and provide more efficient coding.

In a draft HEVC, each PU has prediction information associated with it defining what kind of a prediction is to be applied for the pixels within that PU (e.g. motion vector information for inter predicted PUs and intra prediction directionality information for intra predicted PUs). Similarly each TU is associated with information describing the prediction error decoding process for the samples within the TU (including e.g. DCT coefficient information). It may be signalled at CU level whether prediction error coding is applied or not for each CU. In the case there is no prediction error residual associated with the CU, it can be considered there are no TUs for the CU.

In some coding formats and codecs, a distinction is made between so-called short-term and long-term reference pictures. This distinction may affect some decoding processes such as motion vector scaling in the temporal direct mode or implicit weighted prediction. If both of the reference pictures used for the temporal direct mode are short-term reference pictures, the motion vector used in the prediction may be scaled according to the picture order count (POC) difference between the current picture and each of the reference pictures. However, if at least one reference picture for the temporal direct mode is a long-term reference picture, default scaling of the motion vector may be used, for example scaling the motion to half may be used. Similarly, if a short-term reference picture is used for implicit weighted prediction, the prediction weight may be scaled according to the POC difference between the POC of the current picture and the POC of the reference picture. However, if a long-term reference picture is used for implicit weighted prediction, a default prediction weight may be used, such as 0.5 in implicit weighted prediction for bi-predicted blocks.

Some video coding formats, such as H.264/AVC, include the frame_num syntax element, which is used for various decoding processes related to multiple reference pictures. In H.264/AVC, the value of frame_num for IDR pictures is 0. The value of frame_num for non-IDR pictures is equal to the frame_num of the previous reference picture in decoding order incremented by 1 (in modulo arithmetic, i.e., the value of frame_num wrap over to 0 after a maximum value of frame_num).

H.264/AVC and HEVC include a concept of picture order count (POC). A value of POC is derived for each picture and is non-decreasing with increasing picture position in output order. POC therefore indicates the output order of pictures. POC may be used in the decoding process for example for implicit scaling of motion vectors in the temporal direct mode of bi-predictive slices, for implicitly derived weights in weighted prediction, and for reference picture list initialization. Furthermore, POC may be used in the verification of output order conformance. In H.264/AVC, POC is specified relative to the previous IDR picture or a picture containing a memory management control operation marking all pictures as "unused for reference".

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control may require the presence of memory management control operation (MMCO) parameters in the bitstream. MMCO parameters may be included in a decoded reference picture marking syntax structure. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

One of the memory management control operations in H.264/AVC causes all reference pictures except for the current picture to be marked as "unused for reference". An instantaneous decoding refresh (IDR) picture contains only intra-coded slices and causes a similar "reset" of reference pictures.

In a draft HEVC standard, reference picture marking syntax structures and related decoding processes are not used, but instead a reference picture set (RPS) syntax structure and decoding process are used instead for a similar purpose. A reference picture set valid or active for a picture includes all the reference pictures used as a reference for the picture and all the reference pictures that are kept marked as "used for reference" for any subsequent pictures in decoding order. There are six subsets of the reference picture set, which are referred to as namely RefPicSetStCurr0 (which may also or alternatively referred to as RefPicSetStCurrBefore), RefPicSetStCurr1 (which may also or alternatively referred to as RefPicSetStCurrAfter), RefPicSetStFoll0, RefPicSetStFoll1, RefPicSetLtCurr, and RefPicSetLtFoll. In some HEVC draft specifications, RefPicSetStFoll0 and RefPicSetStFoll1 are regarded as one subset, which may be referred to as RefPicSetStFoll. The notation of the six subsets is as follows. "Curr" refers to reference pictures that are included in the reference picture lists of the current picture and hence may be used as inter prediction reference for the current picture. "Foll" refers to reference pictures that are not included in the reference picture lists of the current picture but may be used in subsequent pictures in decoding order as reference pictures. "St" refers to short-term reference pictures, which may generally be identified through a certain number of least significant bits of their POC value. "Lt" refers to long-term reference pictures, which are specifically identified and generally have a greater difference of POC values relative to the current picture than what can be represented by the mentioned certain number of least significant bits. "0" refers to those reference pictures that have a smaller POC value than that of the current picture. "1" refers to those reference pictures that have a greater POC value than that of the current picture. RefPicSetStCurr0, RefPicSetStCurr1, RefPicSetStFoll0 and RefPicSetStFoll1 are collectively referred to as the short-term subset of the reference picture set. RefPicSetLtCurr and RefPicSetLtFoll are collectively referred to as the long-term subset of the reference picture set.

In a draft HEVC standard, a reference picture set may be specified in a sequence parameter set and taken into use in the slice header through an index to the reference picture set. A reference picture set may also be specified in a slice header. A long-term subset of a reference picture set is generally specified only in a slice header, while the short-term subsets of the same reference picture set may be specified in the picture parameter set or slice header. A reference picture set may be coded independently or may be predicted from another reference picture set (known as inter-RPS prediction). When a reference picture set is independently coded, the syntax structure includes up to three loops iterating over different types of reference pictures; short-term reference pictures with lower POC value than the current picture, short-term reference pictures with higher POC value than the current picture and long-term reference pictures. Each loop entry specifies a picture to be marked as "used for reference". In general, the picture is specified with a differential POC value. The inter-RPS prediction exploits the fact that the reference picture set of the current picture can be predicted from the reference picture set of a previously decoded picture. This is because all the reference pictures of the current picture are either reference pictures of the previous picture or the previously decoded picture itself. It is only necessary to indicate which of these pictures should be reference pictures and be used for the prediction of the current picture. In both types of reference picture set coding, a flag (used_by_curr_pic_X_flag) is additionally sent for each reference picture indicating whether the reference picture is used for reference by the current picture (included in a *Curr list) or not (included in a *Foll list). Pictures that are included in the reference picture set used by the current slice are marked as "used for reference", and pictures that are not in the reference picture set used by the current slice are marked as "unused for reference". If the current picture is an IDR picture, RefPicSetStCurr0, RefPicSetStCurr1, RefPicSetStFoll0, RefPicSetStFoll1, RefPicSetLtCurr, and RefPicSetLtFoll are all set to empty.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

A reference picture list, such as reference picture list 0 and reference picture list 1, may be constructed in two steps: First, an initial reference picture list is generated. The initial reference picture list may be generated for example on the basis of frame_num, POC, temporal_id, or information on the prediction hierarchy such as GOP structure, or any combination thereof. Second, the initial reference picture list may be reordered by reference picture list reordering (RPLR) commands, also known as reference picture list modification syntax structure, which may be contained in slice headers. The RPLR commands indicate the pictures that are ordered to the beginning of the respective reference picture list. This second step may also be referred to as the reference picture list modification process, and the RPLR commands may be included in a reference picture list modification syntax structure. If reference picture sets are used, the reference picture list 0 may be initialized to contain RefPicSetStCurr0 first, followed by RefPicSetStCurr1, followed by RefPicSetLtCurr. Reference picture list 1 may be initialized to contain RefPicSetStCurr1 first, followed by RefPicSetStCurr0. The initial reference picture lists may be modified through the reference picture list modification syntax structure, where pictures in the initial reference picture lists may be identified through an entry index to the list.

The advanced motion vector prediction (AMVP) may operate for example as follows, while other similar realizations of advanced motion vector prediction are also possible for example with different candidate position sets and candidate locations with candidate position sets. Two spatial motion vector predictors (MVPs) may be derived and a temporal motion vector predictor (TMVP) may be derived. They may be selected among the positions shown in FIG. 10: three spatial motion vector predictor candidate positions 103, 104, 105 located above the current prediction block 100 (B0, B1, B2) and two 101, 102 on the left (A0, A1). The first motion vector predictor that is available (e.g. resides in the same slice, is inter-coded, etc.) in a pre-defined order of each candidate position set, (B0, B1, B2) or (A0, A1), may be selected to represent that prediction direction (up or left) in the motion vector competition. A reference index for the temporal motion vector predictor may be indicated by the encoder in the slice header (e.g. as a collocated_ref_idx syntax element). The motion vector obtained from the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate.

In addition to predicting the motion vector values, the reference index of previously coded/decoded picture can be predicted. The reference index may be predicted from adjacent blocks and/or from co-located blocks in a temporal reference picture.

Many high efficiency video codecs such as a draft HEVC codec employ an additional motion information coding/decoding mechanism, often called merging/merge mode/process/mechanism, where all the motion information of a block/PU is predicted and used without any modification/correction. The aforementioned motion information for a PU may comprise 1) The information whether 'the PU is uni-predicted using only reference picture list0' or 'the PU is uni-predicted using only reference picture list1' or 'the PU is bi-predicted using both reference picture list0 and list 1'; 2) Motion vector value corresponding to the reference picture list0; 3) Reference picture index in the reference picture list0; 4) Motion vector value corresponding to the reference picture list 1; and 5) Reference picture index in the reference picture list 1. A motion field may be defined to comprise the motion information of a coded picture.

Similarly, predicting the motion information is carried out using the motion information of adjacent blocks and/or co-located blocks in temporal reference pictures. A list, often called as a merge list, may be constructed by including motion prediction candidates associated with available adjacent/co-located blocks and the index of selected motion prediction candidate in the list is signalled and the motion information of the selected candidate is copied to the motion information of the current PU. When the merge mechanism is employed for a whole CU and the prediction signal for the CU is used as the reconstruction signal, i.e. prediction residual is not processed, this type of coding/decoding the CU is typically named as skip mode or merge based skip mode. In addition to the skip mode, the merge mechanism may also be employed for individual PUs (not necessarily the whole CU as in skip mode) and in this case, prediction residual may be utilized to improve prediction quality. This type of prediction mode is typically named as an inter-merge mode.

A syntax structure for decoded reference picture marking may exist in a video coding system.

For example, when the decoding of the picture has been completed, the decoded reference picture marking syntax structure, if present, may be used to adaptively mark pictures as "unused for reference" or "used for long-term reference". If the decoded reference picture marking syntax structure is not present and the number of pictures marked as "used for reference" can no longer increase, a sliding window reference picture marking may be used, which basically marks the earliest (in decoding order) decoded reference picture as unused for reference.

Inter-Picture Motion Vector Prediction and its Relation to Scalable Video Coding Multi-view coding has been realized as a multi-loop scalable video coding scheme, where the inter-view reference pictures are added into the reference picture lists. In MVC the inter-view reference components and inter-view only reference components that are included in the reference picture lists may be considered as not being marked as "used for short-term reference" or "used for long-term reference".

In HEVC temporal motion vector prediction (TMVP), the reference picture list to be used for obtaining a collocated partition is chosen according to the collocated_from_l0_flag syntax element in the slice header. When the flag is equal to 1, it specifies that the picture that contains the collocated partition is derived from list 0, otherwise the picture is derived from list 1. When collocated_from_l0_flag is not present, it is inferred to be equal to 1. The collocated_ref_idx in the slice header specifies the reference index of the picture that contains the collocated partition. When the current slice is a P slice, collocated_ref_idx refers to a picture in list 0. When the current slice is a B slice, collocated_ref_idx refers to a picture in list 0 if collocated_from_l0 is 1, otherwise it refers to a picture in list 1. collocated_ref_idx always refers to a valid list entry, and the resulting picture is the same for all slices of a coded picture. When collocated_ref_idx is not present, it is inferred to be equal to 0.

In HEVC, when the current PU uses the merge mode, the target reference index for TMVP is set to 0 (for both reference picture list 0 and 1). In AMVP, the target reference index is indicated in the bitstream.

In HEVC, the availability of a candidate predicted motion vector (PMV) for the merge mode may be determined as follows (both for spatial and temporal candidates) (SRTP=short-term reference picture, LRTP=long-term reference picture)

| reference picture for target reference index | reference picture for candidate PMV | candidate PMV availability |
|---|---|---|
| STRP | STRP | "available" (and scaled) |
| STRP | LTRP | "unavailable" |
| LTRP | STRP | "unavailable" |
| LTRP | LTRP | "available" but not scaled |

Motion vector scaling may be performed in the case both target reference picture and the reference index for candidate PMV are short-term reference pictures. The scaling may be performed by scaling the motion vector with appropriate POC differences related to the candidate motion vector and the target reference picture relative to the current picture, e.g. with the POC difference of the current picture and the target reference picture divided by the POC difference of the current picture and the POC difference of the picture containing the candidate PMV and its reference picture.

SVC uses an inter-layer prediction mechanism, wherein certain information can be predicted from layers other than the currently reconstructed layer or the next lower layer. Information that could be inter-layer predicted includes intra texture, motion and residual data. Inter-layer motion prediction includes the prediction of block coding mode, header information, etc., wherein motion from the lower layer may be used for prediction of the higher layer. In case of intra coding, a prediction from surrounding macroblocks or from co-located macroblocks of lower layers is possible. These prediction techniques do not employ information from earlier coded access units and hence, are referred to as intra prediction techniques. Furthermore, residual data from lower layers can also be employed for prediction of the current layer.

SVC specifies a concept known as single-loop decoding. It is enabled by using a constrained intra texture prediction mode, whereby the inter-layer intra texture prediction can be applied to macroblocks (MBs) for which the corresponding block of the base layer is located inside intra-MBs. At the same time, those intra-MBs in the base layer use constrained intra-prediction (e.g., having the syntax element "constrained_intra_pred_flag" equal to 1). In single-loop decoding, the decoder performs motion compensation and full picture reconstruction only for the scalable layer desired for playback (called the "desired layer" or the "target layer"), thereby greatly reducing decoding complexity. All of the layers other than the desired layer do not need to be fully decoded because all or part of the data of the MBs not used for inter-layer prediction (be it inter-layer intra texture prediction, inter-layer motion prediction or inter-layer residual prediction) is not needed for reconstruction of the desired layer. A single decoding loop is needed for decoding of most pictures, while a second decoding loop is selectively applied to reconstruct the base representations, which are needed as prediction references but not for output or display, and are reconstructed only for the so called key pictures (for which "store_ref_base_pic_flag" is equal to 1).

In some cases of scalable video coding or processing of scalable video bitstreams, data in an enhancement layer can be truncated after a certain location, or even at arbitrary positions, where each truncation position may include additional data representing increasingly enhanced visual quality. Such scalability is referred to as fine-grained (granularity) scalability (FGS). FGS was included in some draft versions of the SVC standard, but it was eventually excluded from the final SVC standard. FGS is subsequently discussed in the context of some draft versions of the SVC standard. The scalability provided by those enhancement layers that cannot be truncated is referred to as coarse-grained (granularity) scalability (CGS). It collectively includes the traditional quality (SNR) scalability and spatial scalability. The SVC standard supports the so-called medium-grained scalability (MGS), where quality enhancement pictures are coded similarly to SNR scalable layer pictures but indicated by high-level syntax elements similarly to FGS layer pictures, by having the quality_id syntax element greater than 0.

The scalability structure in the SVC draft is characterized by three syntax elements: "temporal_id," "dependency_id" and "quality_id." The syntax element "temporal_id" is used to indicate the temporal scalability hierarchy or, indirectly, the frame rate. A scalable layer representation comprising pictures of a smaller maximum "temporal_id" value has a smaller frame rate than a scalable layer representation comprising pictures of a greater maximum "temporal_id". A given temporal layer typically depends on the lower temporal layers (i.e., the temporal layers with smaller "temporal_id" values) but does not depend on any higher temporal layer. The syntax element "dependency_id" is used to indicate the CGS inter-layer coding dependency hierarchy (which, as mentioned earlier, includes both SNR and spatial scalability). At any temporal level location, a picture of a smaller "dependency_id" value may be used for inter-layer prediction for coding of a picture with a greater "dependency_id" value. The syntax element "quality_id" is used to indicate the quality level hierarchy of a FGS or MGS layer. At any temporal location, and with an identical "dependency_id" value, a picture with "quality_id" equal to QL uses the picture with "quality_id" equal to QL−1 for inter-layer prediction. A coded slice with "quality_id" larger than 0 may be coded as either a truncatable FGS slice or a non-truncatable MGS slice.

For simplicity, all the data units (e.g., Network Abstraction Layer units or NAL units in the SVC context) in one access unit having identical value of "dependency_id" are referred to as a dependency unit or a dependency representation. Within one dependency unit, all the data units having identical value of "quality_id" are referred to as a quality unit or layer representation.

A base representation, also known as a decoded base picture, is a decoded picture resulting from decoding the Video Coding Layer (VCL) NAL units of a dependency unit having "quality_id" equal to 0 and for which the "store_ref_base_pic_flag" is set equal to 1. An enhancement representation, also referred to as a decoded picture, results from the regular decoding process in which all the layer representations that are present for the highest dependency representation are decoded.

As mentioned earlier, CGS includes both spatial scalability and SNR scalability. Spatial scalability is initially designed to support representations of video with different resolutions. For each time instance, VCL NAL units are coded in the same access unit and these VCL NAL units can correspond to different resolutions. During the decoding, a low resolution VCL NAL unit provides the motion field and residual which can be optionally inherited by the final decoding and reconstruction of the high resolution picture. When compared to older video compression standards, SVC's spatial scalability has been generalized to enable the base layer to be a cropped and zoomed version of the enhancement layer.

MGS quality layers are indicated with "quality_id" similarly as FGS quality layers. For each dependency unit (with the same "dependency_id"), there is a layer with "quality_id" equal to 0 and there can be other layers with "quality_id" greater than 0. These layers with "quality_id" greater than 0 are either MGS layers or FGS layers, depending on whether the slices are coded as truncatable slices.

In the basic form of FGS enhancement layers, only inter-layer prediction is used. Therefore, FGS enhancement layers can be truncated freely without causing any error propagation in the decoded sequence. However, the basic form of FGS suffers from low compression efficiency. This issue arises because only low-quality pictures are used for inter prediction references. It has therefore been proposed that FGS-enhanced pictures be used as inter prediction references. However, this may cause encoding-decoding mismatch, also referred to as drift, when some FGS data are discarded.

One feature of a draft SVC standard is that the FGS NAL units can be freely dropped or truncated, and a feature of the SVCV standard is that MGS NAL units can be freely dropped (but cannot be truncated) without affecting the conformance of the bitstream. As discussed above, when those FGS or MGS data have been used for inter prediction reference during encoding, dropping or truncation of the data would result in a mismatch between the decoded pictures in the decoder side and in the encoder side. This mismatch is also referred to as drift.

To control drift due to the dropping or truncation of FGS or MGS data, SVC applied the following solution: In a certain dependency unit, a base representation (by decoding only the CGS picture with "quality_id" equal to 0 and all the dependent-on lower layer data) is stored in the decoded picture buffer. When encoding a subsequent dependency unit with the same value of "dependency_id," all of the NAL units, including FGS or MGS NAL units, use the base representation for inter prediction reference. Consequently, all drift due to dropping or truncation of FGS or MGS NAL units in an earlier access unit is stopped at this access unit. For other dependency units with the same value of "dependency_id," all of the NAL units use the decoded pictures for inter prediction reference, for high coding efficiency.

Each NAL unit includes in the NAL unit header a syntax element "use_ref_base_pic_flag." When the value of this element is equal to 1, decoding of the NAL unit uses the base representations of the reference pictures during the inter prediction process. The syntax element "store_ref_base_pic_flag" specifies whether (when equal to 1) or not (when equal to 0) to store the base representation of the current picture for future pictures to use for inter prediction.

NAL units with "quality_id" greater than 0 do not contain syntax elements related to reference picture lists construction and weighted prediction, i.e., the syntax elements "num_refactive_1×_minus1" (x=0 or 1), the reference picture list reordering syntax table, and the weighted prediction syntax table are not present. Consequently, the MGS or FGS layers have to inherit these syntax elements from the NAL units with "quality_id" equal to 0 of the same dependency unit when needed.

In SVC, a reference picture list consists of either only base representations (when "use_ref_base_pic_flag" is equal to 1) or only decoded pictures not marked as "base representation" (when "use_ref_base_pic_flag" is equal to 0), but never both at the same time.

In an H.264/AVC bit stream, coded pictures in one coded video sequence uses the same sequence parameter set, and at any time instance during the decoding process, only one sequence parameter set is active. In SVC, coded pictures from different scalable layers may use different sequence parameter sets. If different sequence parameter sets are used, then, at any time instant during the decoding process, there may be more than one active sequence picture parameter set. In the SVC specification, the one for the top layer is denoted as the active sequence picture parameter set, while the rest are referred to as layer active sequence picture parameter sets. Any given active sequence parameter set remains unchanged throughout a coded video sequence in the layer in which the active sequence parameter set is referred to.

A scalable nesting SEI message has been specified in SVC. The scalable nesting SEI message provides a mechanism for associating SEI messages with subsets of a bitstream, such as indicated dependency representations or other scalable layers. A scalable nesting SEI message contains one or more SEI messages that are not scalable nesting SEI messages themselves. An SEI message contained in a scalable nesting SEI message is referred to as a nested SEI message. An SEI message not contained in a scalable nesting SEI message is referred to as a non-nested SEI message.

As indicated earlier, MVC is an extension of H.264/AVC. H.264/AVC includes a multiview coding extension, MVC. In MVC, both inter prediction and inter-view prediction use similar motion-compensated prediction process. Inter-view reference pictures (as well as inter-view only reference pictures, which are not used for temporal motion-compensated prediction) are included in the reference picture lists and processed similarly to the conventional ("intra-view") reference pictures with some limitations. There is an ongoing standardization activity to specify a multiview extension to HEVC, referred to as MV-HEVC, which would be similar in functionality to MVC.

Many of the definitions, concepts, syntax structures, semantics, and decoding processes of H.264/AVC apply also to MVC as such or with certain generalizations or constraints. Some definitions, concepts, syntax structures, semantics, and decoding processes of MVC are described in the following.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit results in one decoded picture consisting of one or more decoded view components, when decoding errors, bitstream errors or other errors which may affect the decoding do not occur. In other words, an access unit in MVC contains the view components of the views for one output time instance.

A view component in MVC is referred to as a coded representation of a view in a single access unit.

Inter-view prediction may be used in MVC and refers to prediction of a view component from decoded samples of different view components of the same access unit. In MVC, inter-view prediction is realized similarly to inter prediction. For example, inter-view reference pictures are placed in the same reference picture list(s) as reference pictures for inter prediction, and a reference index as well as a motion vector are coded or inferred similarly for inter-view and inter reference pictures.

An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

As mentioned earlier, non-base views of MVC bitstreams may refer to a subset sequence parameter set NAL unit. A subset sequence parameter set for MVC includes a base SPS data structure and an sequence parameter set MVC extension data structure. In MVC, coded pictures from different views may use different sequence parameter sets. An SPS in MVC (specifically the sequence parameter set MVC extension part of the SPS in MVC) can contain the view dependency information for inter-view prediction. This may be used for example by signaling-aware media gateways to construct the view dependency tree.

In the context of multiview video coding, view order index may be defined as an index that indicates the decoding or bitstream order of view components in an access unit. In MVC, the inter-view dependency relationships are indicated in a sequence parameter set MVC extension, which is included in a sequence parameter set. According to the MVC standard, all sequence parameter set MVC extensions that are referred to by a coded video sequence are required to be identical.

In MVC, an operation point may be defined as follows: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process with tIdTarget equal to the temporal_id value and viewIdTargetList consisting of the set of view_id values as inputs. More than one operation point may be associated with the same bitstream subset. When "an operation point is decoded", a bitstream subset corresponding to the operation point may be decoded and subsequently the target output views may be output.

In scalable multiview coding, the same bitstream may contain coded view components of multiple views and at least some coded view components may be coded using quality and/or spatial scalability.

In a so called depth-enhanced video coding both texture views and depth views are coded.

A texture view refers to a view that represents ordinary video content, for example has been captured using an ordinary camera, and is usually suitable for rendering on a display. A texture view typically comprises pictures having three components, one luma component and two chroma components. In the following, a texture picture typically comprises all its component pictures or color components unless otherwise indicated for example with terms luma texture picture and chroma texture picture.

A ranging information for a particular view represents distance information of a texture sample from the camera sensor, disparity or parallax information between a texture sample and a respective texture sample in another view, or similar information.

Ranging information of real-word 3D scene depends on the content and may vary for example from 0 to infinity. Different types of representation of such ranging information can be utilized. Below some non-limiting examples of such representations are given.

Depth Value.

Real-world 3D scene ranging information can be directly represented with a depth value (Z) in a fixed number of bits in a floating point or in fixed point arithmetic representation. This representation (type and accuracy) can be content and application specific. Z value can be converted to a depth map and disparity as it is shown below.

Depth Map Value.

To represent real-world depth value with a finite number of bits, e.g. 8 bits, depth values Z may be non-linearly quantized to produce depth map values d as shown below and the dynamical range of represented Z are limited with depth range parameters Znear/Zfar.

$$d = \left\lfloor (2^N - 1) \cdot \frac{\frac{1}{z} - \frac{1}{Z_{far}}}{\frac{1}{Z_{near}} - \frac{1}{Z_{far}}} + 0.5 \right\rfloor$$

In such representation, N is the number of bits to represent the quantization levels for the current depth map, the closest and farthest real-world depth values Znear and Zfar, corresponding to depth values $(2^N-1)$ and 0 in depth maps, respectively. The equation above could be adapted for any number of quantization levels by replacing $2^N$ with the number of quantization levels. To perform forward and backward conversion between depth and depth map, depth map parameters (Znear/Zfar, the number of bits N to represent quantization levels) may be needed.

Disparity Map Value.

Every sample of the ranging data can be represented as a disparity value or vector (difference) of a current image sample location between two given stereo views. For conversion from depth to disparity, certain camera setup parameters (namely the focal length f and the translation distance/ between the two cameras) may be required:

$$D = \frac{f \cdot l}{Z}$$

Disparity D may be calculated out of the depth map value v with the following equation:

$$D = f \cdot l \cdot \left( \frac{d}{(2^2 - 1)} \left( \frac{1}{Z_{near}} - \frac{1}{Z_{far}} \right) + \frac{1}{Z_{far}} \right)$$

Disparity D may be calculated out of the depth map value v with following equation:

$$D = (w * v + o) >> n,$$

where w is a scale factor, o is an offset value, and n is a shift parameter that depends on the required accuracy of the disparity vectors. An independent set of parameters w, o and n required for this conversion may be required for every pair of views.

Other forms of ranging information representation that take into consideration real world 3D scenery can be deployed.

A depth view refers to a view that represents distance information of a texture sample from the camera sensor, disparity or parallax information between a texture sample and a respective texture sample in another view, or similar information. A depth view may comprise depth pictures (a.k.a. depth maps) having one component, similar to the luma component of texture views. A depth map is an image with per-pixel depth information or similar. For example, each sample in a depth map represents the distance of the respective texture sample or samples from the plane on which the camera lies. In other words, if the z axis is along the shooting axis of the cameras (and hence orthogonal to the plane on which the cameras lie), a sample in a depth map represents the value on the z axis. The semantics of depth map values may for example include the following:

1. Each luma sample value in a coded depth view component represents an inverse of real-world distance (Z) value, i.e. 1/Z, normalized in the dynamic range of the luma samples, such to the range of 0 to 255, inclusive, for 8-bit luma representation. The normalization may be done in a manner where the quantization 1/Z is uniform in terms of disparity.
2. Each luma sample value in a coded depth view component represents an inverse of real-world distance (Z) value, i.e. 1/Z, which is mapped to the dynamic range of the luma samples, such to the range of 0 to 255, inclusive, for 8-bit luma representation, using a mapping function f(1/Z) or table, such as a piece-wise linear mapping. In other words, depth map values result in applying the function f(1/Z).
3. Each luma sample value in a coded depth view component represents a real-world distance (Z) value normalized in the dynamic range of the luma samples, such to the range of 0 to 255, inclusive, for 8-bit luma representation.
4. Each luma sample value in a coded depth view component represents a disparity or parallax value from the present depth view to another indicated or derived depth view or view position.

While phrases such as depth view, depth view component, depth picture and depth map are used to describe various embodiments, it is to be understood that any semantics of depth map values may be used in various embodiments including but not limited to the ones described above. For example, embodiments of the invention may be applied for depth pictures where sample values indicate disparity values.

An encoding system or any other entity creating or modifying a bitstream including coded depth maps may create and include information on the semantics of depth samples and on the quantization scheme of depth samples into the bitstream. Such information on the semantics of depth samples and on the quantization scheme of depth samples may be for example included in a video parameter set structure, in a sequence parameter set structure, or in an SEI message.

Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views.

A texture view component may be defined as a coded representation of the texture of a view in a single access unit. A texture view component in depth-enhanced video bitstream may be coded in a manner that is compatible with a single-view texture bitstream or a multi-view texture bitstream so that a single-view or multi-view decoder can decode the texture views even if it has no capability to decode depth views. For example, an H.264/AVC decoder may decode a single texture view from a depth-enhanced H.264/AVC bitstream. A texture view component may alternatively be coded in a manner that a decoder capable of single-view or multi-view texture decoding, such H.264/AVC or MVC decoder, is not able to decode the texture view component for example because it uses depth-based coding tools. A depth view component may be defined as a coded representation of the depth of a view in a single access unit. A view component pair may be defined as a texture view component and a depth view component of the same view within the same access unit.

Depth-enhanced video may be coded in a manner where texture and depth are coded independently of each other. For example, texture views may be coded as one MVC bitstream and depth views may be coded as another MVC bitstream. Depth-enhanced video may also be coded in a manner where texture and depth are jointly coded. In a form a joint coding of texture and depth views, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. In another option, coded video data of texture and coded video data of depth are not predicted from each other or one is not coded/decoded on the basis of the other one, but coded texture and depth view may be multiplexed into the same bitstream in the encoding and demultiplexed from the bitstream in the decoding. In yet another option, while coded video data of texture is not predicted from coded video data of depth in e.g. below slice layer, some of the high-level coding structures of texture views and depth views may be shared or predicted from each other. For example, a slice header of coded depth slice may be predicted from a slice header of a coded texture slice. Moreover, some of the parameter sets may be used by both coded texture views and coded depth views.

Depth-enhanced video formats enable generation of virtual views or pictures at camera positions that are not represented by any of the coded views. Generally, any depth-image-based rendering (DIBR) algorithm may be used for synthesizing views.

A simplified model of a DIBR-based 3DV system is shown in FIG. 8. The input of a 3D video codec comprises a stereoscopic video and corresponding depth information with stereoscopic baseline b0. Then the 3D video codec synthesizes a number of virtual views between two input views with baseline (bi<b0). DIBR algorithms may also enable extrapolation of views that are outside the two input views and not in between them. Similarly, DIBR algorithms may enable view synthesis from a single view of texture and the respective depth view. However, in order to enable DIBR-based multiview rendering, texture data should be available at the decoder side along with the corresponding depth data.

In such 3DV system, depth information is produced at the encoder side in a form of depth pictures (also known as depth maps) for texture views.

Depth information can be obtained by various means. For example, depth of the 3D scene may be computed from the disparity registered by capturing cameras or color image sensors. A depth estimation approach, which may also be referred to as stereo matching, takes a stereoscopic view as an input and computes local disparities between the two offset images of the view. Since the two input views represent different viewpoints or perspectives, the parallax creates a disparity between the relative positions of scene points on the imaging planes depending on the distance of the points. A target of stereo matching is to extract those disparities by finding or detecting the corresponding points between the images. Several approaches for stereo matching exist. For example, in a block or template matching approach each image is processed pixel by pixel in overlapping blocks, and for each block of pixels a horizontally localized search for a matching block in the offset image is performed. Once a pixel-wise disparity is computed, the corresponding depth value z is calculated by equation (1):

$$z = \frac{f \cdot b}{d + \Delta d}, \qquad (1)$$

where f is the focal length of the camera and b is the baseline distance between cameras, as shown in FIG. 9. Further, d may be considered to refer to the disparity observed between the two cameras or the disparity estimated between corresponding pixels in the two cameras. The camera offset $\Delta d$ may be considered to reflect a possible horizontal misplacement of the optical centers of the two cameras or a possible horizontal cropping in the camera frames due to pre-processing. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Alternatively or in addition to the above-described stereo view depth estimation, the depth value may be obtained using the time-of-flight (TOF) principle for example by using a camera which may be provided with a light source, for example an infrared emitter, for illuminating the scene. Such an illuminator may be arranged to produce an intensity modulated electromagnetic emission for a frequency between e.g. 10-100 MHz, which may require LEDs or laser diodes to be used. Infrared light may be used to make the illumination unobtrusive. The light reflected from objects in the scene is detected by an image sensor, which may be modulated synchronously at the same frequency as the illuminator. The image sensor may be provided with optics; a lens gathering the reflected light and an optical bandpass filter for passing only the light with the same wavelength as the illuminator, thus helping to suppress background light. The image sensor may measure for each pixel the time the light has taken to travel from the illuminator to the object and back. The distance to the object may be represented as a phase shift in the illumination modulation, which can be determined from the sampled data simultaneously for each pixel in the scene.

Alternatively or in addition to the above-described stereo view depth estimation and/or TOF-principle depth sensing, depth values may be obtained using a structured light approach which may operate for example approximately as follows. A light emitter, such as an infrared laser emitter or an infrared LED emitter, may emit light that may have a certain direction in a 3D space (e.g. follow a raster-scan or a pseudo-random scanning order) and/or position within an array of light emitters as well as a certain pattern, e.g. a certain wavelength and/or amplitude pattern. The emitted light is reflected back from objects and may be captured using a sensor, such as an infrared image sensor. The image/signals obtained by the sensor may be processed in relation to the direction of the emitted light as well as the pattern of the emitted light to detect a correspondence between the received signal and the direction/position of the emitted lighted as well as the pattern of the emitted light for example using a triangulation principle. From this correspondence a distance and a position of a pixel may be concluded.

It is to be understood that the above-described depth estimation and sensing methods are provided as non-limiting examples and embodiments may be realized with the described or any other depth estimation and sensing methods and apparatuses.

Disparity or parallax maps, such as parallax maps specified in ISO/IEC International Standard 23002-3, may be processed similarly to depth maps. Depth and disparity have a straightforward correspondence and they can be computed from each other through mathematical equation.

Texture views and depth views may be coded into a single bitstream where some of the texture views may be compatible with one or more video standards such as H.264/AVC and/or MVC. In other words, a decoder may be able to decode some of the texture views of such a bitstream and can omit the remaining texture views and depth views.

Inter-component prediction may be defined to comprise prediction of syntax element values, sample values, variable values used in the decoding process, or anything alike from a component picture of one type to a component picture of another type. For example, inter-component prediction may comprise prediction of a texture view component from a depth view component, or vice versa.

In a depth-enhanced video coding extensions to the HEVC standard, which may be referred to as 3D-HEVC, texture views and depth views may be coded into a single bitstream where some of the texture views may be compatible with HEVC. In other words, an HEVC decoder may be able to decode some of the texture views of such a bitstream and can omit the remaining texture views and depth views.

The characteristics of depth pictures and/or the depth view(s) may be indicated by the encoder in the bitstream and/or may be decoded by the decoder from the bitstream. The characteristics may be used for example in synthesizing intermediate pictures or views using DIBR. The depth representation information SEI message of a draft MVC+D standard (JCT-3V document JCT2-A1001), presented in the following, may be regarded as an example of how information about depth representation format may be represented. The syntax of the SEI message is as follows:

| | C | Descriptor |
|---|---|---|
| depth_representation_information( payloadSize ) { | | |
|   depth_representation_type | 5 | ue(v) |
|   all_views_equal_flag | 5 | u(1) |
|   if( all_views_equal_flag == 0 ){ | | |
|     num_views_minus1 | 5 | ue(v) |
|     numViews = num_views_minus1 + 1 | | |
|   }else{ | | |
|     numViews = 1 | | |
|   } | | |
|   for( i = 0; i < numViews; i++ ) { | | |
|     depth_representation_base_view_id[i] | 5 | ue(v) |
|   } | | |
| if ( depth_representation_type == 3 ) { | | |
|   depth_nonlinear_representation_num_minus1 | | ue(v) |
|   depth_nonlinear_representation_num = | | |
|     depth_nonlinear_representation_num_minus1+1 | | |
|   for( i = 1; i <= depth_nonlinear_representation_num; i++ ) | | |
|     depth_nonlinear_representation_model[ i ] | | ue(v) |
|   } | | |
| } | | |

The semantics of the depth representation SEI message may be specified as follows. The syntax elements in the depth representation information SEI message specifies various depth representation for depth views for the purpose of processing decoded texture and depth view components prior to rendering on a 3D display, such as view synthesis. It is recommended, when present, the SEI message is associated with an IDR access unit for the purpose of random access. The information signaled in the SEI message applies to all the access units from the access unit the SEI message is associated with to the next access unit, in decoding order, containing an SEI message of the same type, exclusively, or to the end of the coded video sequence, whichever is earlier in decoding order.

Continuing the exemplary semantics of the depth representation SEI message, depth_representation_type specifies the representation definition of luma pixels in coded frame of depth views as specified in the table below. In the table below, disparity specifies the horizontal displacement between two texture views and Z value specifies the distance from a camera.

| depth_representation_type | Interpretation |
|---|---|
| 0 | Each luma pixel value in coded frame of depth views represents an inverse of Z value normalized in range from 0 to 255 |
| 1 | Each luma pixel value in coded frame of depth views represents disparity normalized in range from 0 to 255 |
| 2 | Each luma pixel value in coded frame of depth views represents Z value normalized in range from 0 to 255 |
| 3 | Each luma pixel value in coded frame of depth views represents nonlinearly mapped disparity, normalized in range from 0 to 255. |

Continuing the exemplary semantics of the depth representation SEI message, all_views_equal_flag equal to 0 specifies that depth representation base view may not be identical to respective values for each view in target views. all_views_equal_flag equal to 1 specifies that the depth representation base views are identical to respective values for all target views. depth_representaion_base_view_id[i] specifies the view identifier for the NAL unit of either base view which the disparity for coded depth frame of i-th view_id is derived from (depth_representation_type equal to 1 or 3) or base view which the Z-axis for the coded depth frame of i-th view_id is defined as the optical axis of (depth_representation_type equal to 0 or 2). depth_nonlinear_representation_num_minus 1+2 specifies the number of piecewise linear segments for mapping of depth values to a scale that is uniformly quantized in terms of disparity. depth_nonlinear_representation_model[i] specifies the piecewise linear segments for mapping of depth values to a scale that is uniformly quantized in terms of disparity. When depth_representation_type is equal to 3, depth view component contains nonlinearly transformed depth samples. Variable DepthLUT [i], as specified below, is used to transform coded depth sample values from nonlinear representation to the linear representation—disparity normalized in range from 0 to 255. The shape of this transform is defined by means of line-segment-approximation in two-dimensional linear-disparity-to-nonlinear-disparity space. The first (0, 0) and the last (255, 255) nodes of the curve are predefined. Positions of additional nodes are transmitted in form of deviations (depth_nonlinear_representation_model [i]) from the straight-line curve. These deviations are uniformly distributed along the whole range of 0 to 255, inclusive, with spacing depending on the value of nonlinear_depth_representation_num.

Variable DepthLUT[i] for i in the range of 0 to 255, inclusive, is specified as follows.

```
depth_nonlinear_representation_model[ 0 ] = 0
depth_nonlinear_representation_model[depth_nonlinear_representation_num + 1 ] = 0
for( k=0; k<= depth_nonlinear_representation_num; ++k )
{
pos1 = ( 255 * k) / (depth_nonlinear_representation_num + 1 )
dev1 = depth_nonlinear_representation_model[ k ]
pos2 = ( 255 * ( k+1) ) / (depth_nonlinear_representation_num + 1 ) )
dev2 = depth_nonlinear_representation_model[ k+1 ]
x1 = pos1 – dev1
y1 = pos1 + dev1
x2 = pos2 – dev2
y2 = pos2 + dev2
for ( x = max( x1, 0 ); x <= min( x2, 255 ); ++x )
    DepthLUT[ x ] = Clip3( 0, 255, Round( ( ( x – x1 ) * ( y2 – y1 ) ) ÷ ( x2 – x1 ) + y1
) )
}
```

In a scheme referred to as unpaired multiview video-plus-depth (MVD), there may be an unequal number of texture and depth views, and/or some of the texture views might not have a co-located depth view, and/or some of the depth views might not have a co-located texture view, some of the depth view components might not be temporally coinciding with texture view components or vice versa, co-located texture and depth views might cover a different spatial area, and/or there may be more than one type of depth view components. Encoding, decoding, and/or processing of unpaired MVD signal may be facilitated by a depth-enhanced video coding, decoding, and/or processing scheme.

Terms co-located, collocated, and overlapping may be used interchangeably to indicate that a certain sample or area in a texture view component represents the same physical objects or fragments of a 3D scene as a certain co-located/collocated/overlapping sample or area in a depth view component. In some embodiments, the sampling grid of a texture view component may be the same as the sampling grid of a depth view component, i.e. one sample of a component image, such as a luma image, of a texture view component corresponds to one sample of a depth view component, i.e. the physical dimensions of a sample match between a component image, such as a luma image, of a texture view component and the corresponding depth view component. In some embodiments, sample dimensions (twidth×theight) of a sampling grid of a component image, such as a luma image, of a texture view component may be an integer multiple of sample dimensions (dwidth×dheight) of a sampling grid of a depth view component, i.e. twidth=m×dwidth and theight=n×dheight, where m and n are positive integers. In some embodiments, dwidth=m× twidth and dheight=n×theight, where m and n are positive integers. In some embodiments, twidth=m×dwidth and theight=n×dheight or alternatively dwidth=m×twidth and dheight=n×theight, where m and n are positive values and may be non-integer. In these embodiments, an interpolation scheme may be used in the encoder and in the decoder and in the view synthesis process and other processes to derive co-located sample values between texture and depth. In some embodiments, the physical position of a sampling grid of a component image, such as a luma image, of a texture view component may match that of the corresponding depth view and the sample dimensions of a component image, such as a luma image, of the texture view component may be an integer multiple of sample dimensions (dwidth× dheight) of a sampling grid of the depth view component (or vice versa)—then, the texture view component and the depth view component may be considered to be co-located and represent the same viewpoint. In some embodiments, the position of a sampling grid of a component image, such as a luma image, of a texture view component may have an integer-sample offset relative to the sampling grid position of a depth view component, or vice versa. In other words, a top-left sample of a sampling grid of a component image, such as a luma image, of a texture view component may correspond to the sample at position (x, y) in the sampling grid of a depth view component, or vice versa, where x and y are non-negative integers in a two-dimensional Cartesian coordinate system with non-negative values only and origo in the top-left corner. In some embodiments, the values of x and/or y may be non-integer and consequently an interpolation scheme may be used in the encoder and in the decoder and in the view synthesis process and other processes to derive co-located sample values between texture and depth. In some embodiments, the sampling grid of a component image, such as a luma image, of a texture view component may have unequal extents compared to those of the sampling grid of a depth view component. In other words, the number of samples in horizontal and/or vertical direction in a sampling grid of a component image, such as a luma image, of a texture view component may differ from the number of samples in horizontal and/or vertical direction, respectively, in a sampling grid of a depth view component and/or the physical width and/or height of a sampling grid of a component image, such as a luma image, of a texture view component may differ from the physical width and/or height, respectively, of a sampling grid of a depth view component. In some embodiments, non-uniform and/or non-matching sample grids can be utilized for texture and/or depth component. A sample grid of depth view component is non-matching with the sample grid of a texture view component when the sampling grid of a component image, such as a luma image, of the texture view component is not an integer multiple of sample dimensions (dwidth×dheight) of a sampling grid of the depth view component or the sampling grid position of a component image, such as a luma image, of the texture view component has a non-integer offset compared to the sampling grid position of the depth view component or the sampling grids of the depth view component and the texture view component are not aligned/rectified. This could happen for example on purpose to reduce redundancy of data in one of the components or due to inaccuracy of the calibration/rectification process between a depth sensor and a color image sensor.

A coded depth-enhanced video bitstream, such as an MVC+D bitstream or an AVC-3D bitstream, may be considered to include two types of operation points: texture video operation points, such as MVC operation points, and texture-plus-depth operation points including both texture views and depth views. A coded depth-enhanced video bitstream, such as an MVC+D bitstream or an AVC-3D bitstream, contains depth views, and therefore the whole bitstream as well as sub-bitstreams can provide so-called 3DVC operation points, which in the draft MVC+D and AVC-3D specifications contain either depth or texture or both depth and texture for each target output view.

The coding and/or decoding order of texture view components and depth view components may determine presence of syntax elements related to inter-component prediction and allowed values of syntax elements related to inter-component prediction.

In the case of joint coding of texture and depth for depth-enhanced video, view synthesis can be utilized in the loop of the codec, thus providing view synthesis prediction (VSP). In VSP, a prediction signal, such as a VSP reference picture, is formed using a DIBR or view synthesis algorithm, utilizing texture and depth information. For example, a synthesized picture (i.e., VSP reference picture) may be introduced in the reference picture list in a similar way as it is done with interview reference pictures and inter-view only reference pictures. Alternatively or in addition, a specific VSP prediction mode for certain prediction blocks may be determined by the encoder, indicated in the bitstream by the encoder, and used as concluded from the bitstream by the decoder.

In MVC, both inter prediction and inter-view prediction use similar motion-compensated prediction process. Inter-view reference pictures and inter-view only reference pictures are essentially treated as long-term reference pictures in the different prediction processes. Similarly, view synthesis prediction may be realized in such a manner that it uses essentially the same motion-compensated prediction process as inter prediction and inter-view prediction. To differentiate from motion-compensated prediction taking place only within a single view without any VSP, motion-compensated prediction that includes and is capable of flexibly selecting mixing inter prediction, inter-prediction, and/or view synthesis prediction is herein referred to as mixed-direction motion-compensated prediction.

As reference picture lists in MVC and coding schemes for MVD and in similar coding schemes may contain more than one type of reference pictures, i.e. inter reference pictures (also known as intra-view reference pictures), inter-view reference pictures, inter-view only reference pictures, and VSP reference pictures, a term prediction direction may be defined to indicate the use of intra-view reference pictures (temporal prediction), inter-view prediction, or VSP. For example, an encoder may choose for a specific block a reference index that points to an inter-view reference picture, thus the prediction direction of the block is inter-view.

A VSP reference picture may also be referred to as synthetic reference component, which may be defined to contain samples that may be used for view synthesis prediction. A synthetic reference component may be used as a reference picture for view synthesis prediction but is typically not output or displayed. A view synthesis picture may be generated for the same camera location assuming the same camera parameters as for the picture being coded or decoded.

A view-synthesized picture may be introduced in the reference picture list in a similar way as is done with inter-view reference pictures. Signaling and operations with reference picture list in the case of view synthesis prediction may remain identical or similar to those specified in H.264/AVC or HEVC.

A synthesized picture resulting from VSP may be included in the initial reference picture lists List0 and List 1 for example following temporal and inter-view reference frames. However, reference picture list modification syntax (i.e., RPLR commands) may be extended to support VSP reference pictures, thus the encoder can order reference picture lists at any order, indicate the final order with RPLR commands in the bitstream, causing the decoder to reconstruct the reference picture lists having the same final order.

Processes for predicting from view synthesis reference picture, such as motion information derivation, may remain identical or similar to processes specified for inter, inter-layer, and inter-view prediction of H.264/AVC or HEVC. Alternatively or in addition, specific coding modes for the view synthesis prediction may be specified and signaled by the encoder in the bitstream. In other words, VSP may alternatively or also be used in some encoding and decoding arrangements as a separate mode from intra, inter, inter-view and other coding modes. For example, in a VSP skip/direct mode the motion vector difference (de)coding and the (de)coding of the residual prediction error for example using transform-based coding may also be omitted. For example, if a macroblock may be indicated within the bitstream to be coded using a skip/direct mode, it may further be indicated within the bitstream whether a VSP frame is used as a reference. Alternatively or in addition, view-synthesized reference blocks, rather than or in addition to complete view synthesis reference pictures, may be generated by the encoder and/or the decoder and used as prediction reference for various prediction processes.

To enable view synthesis prediction for the coding of the current texture view component, the previously coded texture and depth view components of the same access unit may be used for the view synthesis. Such a view synthesis that uses the previously coded texture and depth view components of the same access unit may be referred to as a forward view synthesis or forward-projected view synthesis, and similarly view synthesis prediction using such view synthesis may be referred to as forward view synthesis prediction or forward-projected view synthesis prediction.

Forward View Synthesis Prediction (VSP) may be performed as follows. View synthesis may be implemented through depth map (d) to disparity (D) conversion with following mapping pixels of source picture s(x,y) in a new pixel location in synthesized target image t(x+D,y).

$$t(\lfloor x+D \rfloor, y) = s(x, y), \quad (2)$$

$$D(s(x, y)) = \frac{f \cdot l}{z}$$

$$z = \left( \frac{d(s(x, y))}{255} \left( \frac{1}{Z_{near}} - \frac{1}{Z_{far}} \right) + \frac{1}{Z_{far}} \right)^{-1}$$

In the case of projection of texture picture, s(x,y) is a sample of texture image, and d(s(x,y)) is the depth map value associated with s(x,y).

In the case of projection of depth map values, s(x,y)=d(x,y) and this sample is projected using its own value d(s(x,y))=d(x,y).

The forward view synthesis process may comprise two conceptual steps: forward warping and hole filling. In forward warping, each pixel of the reference image is mapped to a synthesized image. When multiple pixels from reference frame are mapped to the same sample location in the synthesized view, the pixel associated with a larger depth value (closer to the camera) may be selected in the mapping competition. After warping all pixels, there may be some hole pixels left with no sample values mapped from the reference frame, and these hole pixels may be filled in for example with a line-based directional hole filling, in which a "hole" is defined as consecutive hole pixels in a horizontal line between two non-hole pixels. Hole pixels may be filled by one of the two adjacent non-hole pixels which have a smaller depth sample value (farther from the camera).

In a scheme referred to as a backward view synthesis or backward-projected view synthesis or backward warping, the depth map co-located with the synthesized view is used in the view synthesis process. View synthesis prediction using such backward view synthesis may be referred to as backward view synthesis prediction or backward-projected view synthesis prediction or B-VSP. To enable backward view synthesis prediction for the coding of the current texture view component, the depth view component of the currently coded/decoded texture view component is required to be available. In other words, when the coding/decoding order of a depth view component precedes the coding/decoding order of the respective texture view component, backward view synthesis prediction may be used in the coding/decoding of the texture view component.

With the B-VSP, texture pixels of a dependent view can be predicted not from a synthesized VSP-frame, but directly from the texture pixels of the base or reference view. Displacement vectors required for this process may be produced from the depth map data of the dependent view, i.e. the depth view component corresponding to the texture view component currently being coded/decoded.

The concept of B-VSP may be explained as follows. Let us assume that the following coding order is utilized: (T0, D0, D1, T1). Texture component T0 is a base view and T1 is dependent view coded/decoded using B-VSP as one prediction tool. Depth map components D0 and D1 are respective depth maps associated with T0 and T1, respectively. In dependent view T1, sample values of currently coded block Cb may be predicted from reference area R(Cb) that consists of sample values of the base view T0. The displacement vector (motion vector) between coded and reference samples may be found as a disparity between T1 and T0 from a depth map value associated with a currently coded texture sample.

The process of conversion of depth (1/Z) representation to disparity may be performed for example with following equations:

$$Z(Cb(j, i)) = \frac{1}{\frac{d(Cb(j, i))}{255} \cdot \left( \frac{1}{Z_{near}} - \frac{1}{Z_{far}} \right) + \frac{1}{Z_{far}}}; \quad (3)$$

$$D(Cb(j, i)) = \frac{f \cdot b}{Z(Cb(j, i))};$$

where j and i are local spatial coordinates within Cb, d(Cb(j,i)) is a depth map value in depth map image of a view #1, Z is its actual depth value, and D is a disparity to a particular view #0. The parameters f, b, Znear and Zfar are parameters specifying the camera setup; i.e. the used focal length (f), camera separation (b) between view #1 and view #0 and depth range (Znear,Zfar) representing parameters of depth map conversion.

Many video encoders utilize the Lagrangian cost function to find rate-distortion optimal coding modes, for example the desired macroblock mode and associated motion vectors. This type of cost function uses a weighting factor or 2 to tie together the exact or estimated image distortion due to lossy coding methods and the exact or estimated amount of information required to represent the pixel/sample values in an image area. The Lagrangian cost function may be represented by the equation:

$$C=D+\lambda R$$

where C is the Lagrangian cost to be minimised, D is the image distortion (for example, the mean-squared error between the pixel/sample values in original image block and in coded image block) with the mode and motion vectors currently considered, λ is a Lagrangian coefficient and R is the number of bits needed to represent the required data to reconstruct the image block in the decoder (including the amount of data to represent the candidate motion vectors).

In the following, term layer is used in context of any type of scalability, including view scalability and depth enhancements. An enhancement layer refers to any type of an enhancement, such as SNR, spatial, multiview, depth, bit-depth, chroma format, and/or color gamut enhancement. A base layer also refers to any type of a base operation point, such as a base view, a base layer for SNR/spatial scalability, or a texture base view for depth-enhanced video coding.

There are ongoing standardization activities to specify a multiview extension of HEVC (which may be referred to as MV-HEVC), a depth-enhanced multiview extension of HEVC (which may be referred to as 3D-HEVC), and a scalable extension of HEVC (which may be referred to as SHVC). A multi-loop decoding operation has been envisioned to be used in all these specifications.

In scalable video coding schemes utilizing multi-loop (de)coding, decoded reference pictures for each (de)coded layer may be maintained in a decoded picture buffer (DPB).

The memory consumption for DPB may therefore be significantly higher than that for scalable video coding schemes with single-loop (de)coding operation. However, multi-loop (de)coding may have other advantages, such as relatively few additional parts compared to single-layer coding.

In order to reduce the DPB memory consumption in scalable video coding with multi-loop (de)coding operation pictures marked as used for reference need not originate from the same access units in all layers. For example, a smaller number of reference pictures may be maintained in an enhancement layer compared to the base layer. In some embodiments a temporal inter-layer prediction, which may also be referred to as a diagonal inter-layer prediction or diagonal prediction, can be used to improve compression efficiency in such coding scenarios.

Gradual view refresh (GVR) (a.k.a. view random access, VRA, or stepwise view access, SVA) may improve compression efficiency compared to the use of anchor access units in depth-enhanced multiview video coding. When decoding is started from a GVR access unit, a subset of the views in the multiview bitstream may be accurately decoded, while the remaining views can only be approximately reconstructed. Accurate decoding of all views may be achieved in a subsequent anchor or GVR access unit. When the gradual view refresh period is short, the fact that some coded views are inaccurately reconstructed may be hardly perceivable. When decoding has started prior to a GVR access unit, all views may be accurately reconstructed at GVR access units and there may be no decrease in subjective quality compared to conventional stereoscopic video coding. The GVR method can also be used in unicast streaming for fast startup.

GVR access units are coded in a manner that inter prediction is selectively enabled and hence compression improvement compared to anchor access units may be reached. The encoder selects which views are refreshed in a GVR access unit and codes these view components in the GVR access unit without inter prediction, while the remaining non-refreshed views may use both inter and inter-view prediction. The refreshed views may be coded as IRAP pictures within the GVR access unit, whereas the non-refreshed views may be coded for example as trailing pictures within the GVR access unit. The selection of refreshed views may be done in a manner that each view becomes refreshed within a reasonable period, which may depend on the targeted application but may be up to few seconds at most. The encoder may have different strategies to refresh each view, for example round-robin selection of refreshed views in consequent GVR access units or periodic coding of anchor access units.

When decoding is started from a GVR access unit, the texture and depth view components which do not use inter prediction are decoded. Then, DIBR may be used to reconstruct those views that cannot be decoded, because inter prediction was used for them. It is noted that the separation between the base view and the synthesized view may be selected based on the rendering preferences for the used display environment and therefore need not be the same as the camera separation between the coded views. Decoding of the non-refreshed views can be started at subsequent anchor or GVR access units.

When starting up unicast video streaming or when the user seeks to a new position during streaming, a fast startup strategy may be used such as smaller media bitrate compared to the transmission bitrate, in order to establish a reception buffer occupancy level that enables smoothing out some throughput variations and to start playback within a reasonable time for a user. When depth-enhanced multiview video is streamed, gradual view refresh can be used as a fast-startup strategy. To be more exact, a subset of the texture and depth views is sent at the beginning in order to have a considerably smaller media bitrate compared to the throughput. As explained earlier, the decoder can use DIBR to render the content on stereoscopic or multiview displays.

In an embodiment, the encoder encodes picture into a bitstream, where the bitstream comprises at least two scalability layers, representing at least a first texture view and a second texture view and at least a first depth view, the picture being associated with access units. The encoder encodes into the bitstream a first indication, indicating that the layers for the first texture view and the second texture view are output layers, e.g. by including these layers as output layers in an output layer set that is encoded in a VPS. The encoder encodes into the bitstream a third indication, indicating whether DIBR should not, may or should be used to derive a synthesized picture representing the first texture view in the display process in the absence of a picture of the first texture view in an access unit. The encoder encodes into the bitstream one or more access units where no picture representing the first texture view is present, while pictures of the second texture view and the first texture view are present in those access units. For example, the encoder may use a less frequent TRAP picture interval for the first texture view than for the second texture view, or the encoder may interleave the IRAP pictures of the first texture view and of the second texture view so that TRAP pictures are not aligned in all access units (i.e. may be present for either the first texture view or the second texture view but not both). The encoder may further align some or all of the IRAP pictures of the first depth view with those of the second texture view.

In an embodiment, the decoder decodes pictures from the bitstream, where the bitstream comprises at least two scalability layers, representing at least a first texture view and a second texture view and at least a first depth view, the picture being associated with access units. The decoder decodes from the bitstream a first indication, indicating that the layers for the first texture view and the second texture view are output layers, e.g. by decoding from a VPS that these layers are output layers in an output layer set. The decoder decodes from the bitstream an access unit where no picture representing the first texture view is present, while pictures of the second texture view and the first texture view are present in the access unit. For example, in this access unit IRAP pictures may be present for the second texture view and the first depth view. The decoder or another entity, such as a post-processor, decodes from the bitstream a third indication, indicating whether DIBR should not, may or should be used to derive a synthesized picture representing the first texture view in the display process in the absence of a picture of the first texture view in an access unit. If the third indication indicates that DIBR may or should be used to derive a synthesized picture, the decoder or another entity, such as a post-processor, may apply DIBR to create a synthesized picture representing, in the display process, the first texture view for the time instant of the access unit. The decoded pictures of the second texture view and/or the first depth view from the access unit may be used as input for the DIBR process.

In some embodiments a displaying behavior of two or more output pictures or output layers of the same access unit that are output by the decoder may be specified by the above described process utilizing the indication in the bitstream. For example, this may be utilized in a multipoint conferencing in which there are two display windows, one window for a BL picture where each participant may have a small resolution "tile" and another window for an EL picture containing a high resolution picture of the person who is speaking (coded as ROI EL). These two display windows might not be overlaid, because the relative spatial resolutions of the "tiles" in the BL picture and the ROI EL may differ quite much and hence people who are not speaking may look unclear if the BL picture is scaled up. An arrangement of two display windows may also save space on the screen (when compared to upsampling the BL picture and overlaying the ROI EL on top of it).

In the above-mentioned multipoint conferencing use case, there may be a central unit, a middle-box, a media-aware network element (MANE), a multipoint conference control unit (MCU) or alike (subsequently referred to as a middle-box) that receives coded pictures from endpoints. The middle-box may forward coded pictures of one endpoint selectively to other endpoints. The middle-box may compose a tiled picture wherein each tile is independent of others from coded pictures of endpoints and forward the tiled picture to one or more endpoints. The middle-box may forward a spatial enhancement-layer picture originating from one endpoint to other endpoints. The spatial enhancement-layer picture may enhance one tile or region of the tiled picture.

Figure 4A:
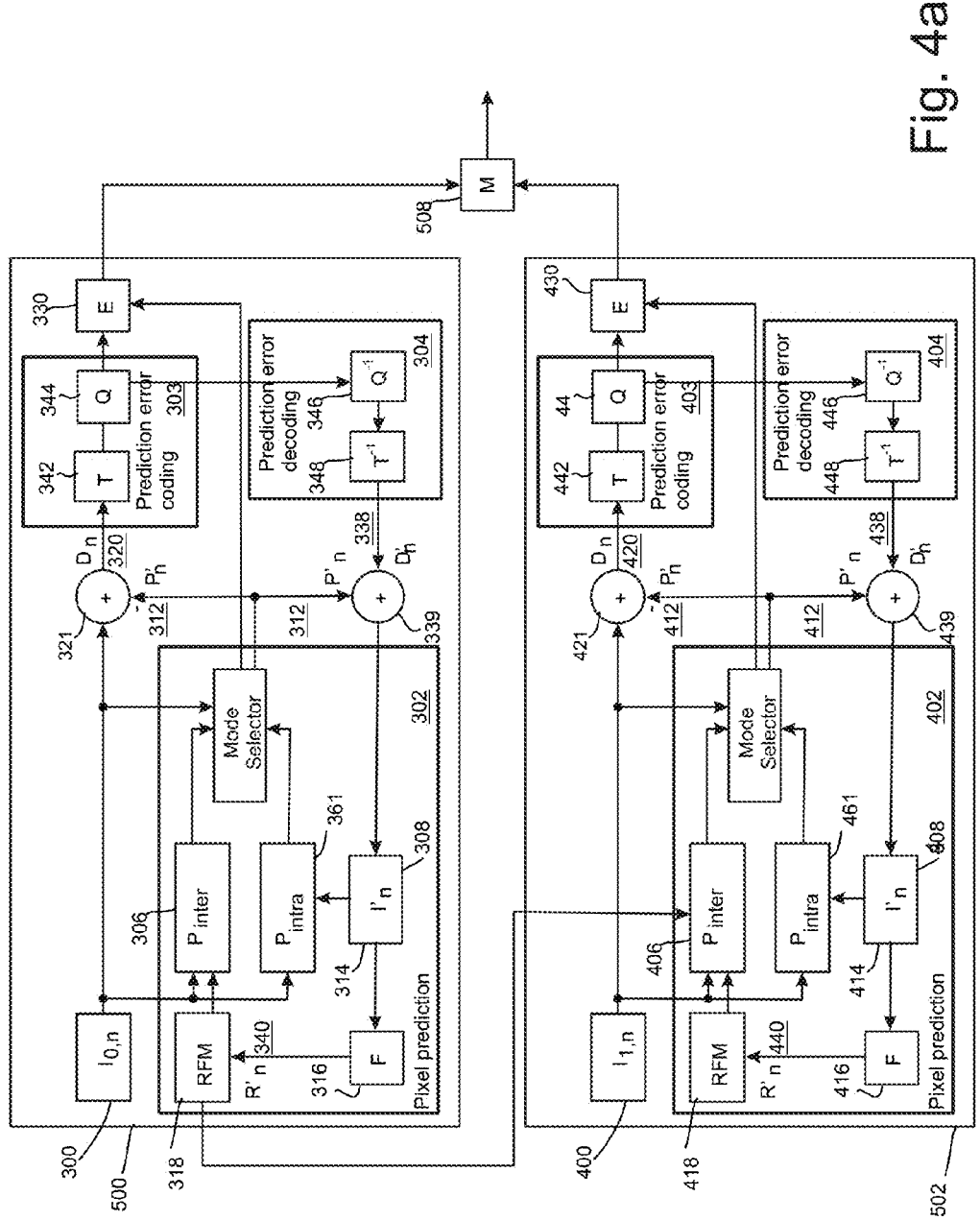
FIG. 4a shows schematically an embodiment of an encoder.

FIG. 4a shows a block diagram of a video encoder suitable for employing embodiments of the invention. FIG. 4a presents an encoder for two layers, but it would be appreciated that presented encoder could be similarly extended to encode more than two layers. FIG. 4a illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4a also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

The mode selector 310 may use, in the cost evaluator block 382, for example Lagrangian cost functions to choose between coding modes and their parameter values, such as motion vectors, reference indexes, and intra prediction direction, typically on block basis. This kind of cost function may use a weighting factor lambda to tie together the (exact or estimated) image distortion due to lossy coding methods and the (exact or estimated) amount of information that is required to represent the pixel values in an image area: C=D+lambda×R, where C is the Lagrangian cost to be minimized, D is the image distortion (e.g. Mean Squared Error) with the mode and their parameters, and R the number of bits needed to represent the required data to reconstruct the image block in the decoder (e.g. including the amount of data to represent the candidate motion vectors).

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer pictures 300 is compared in inter-prediction operations. Subject to the base layer being selected and indicated to be the source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer pictures 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

FIG. 4b depicts an embodiment of a spatial scalability encoding apparatus 200 comprising a base layer encoding element 203 and an enhancement layer encoding element 207. The base layer encoding element 203 encodes the input video signal 201 to a base layer bitstream 204 and, respectively, the enhancement layer encoding element 207 encodes the input video signal 201 to an enhancement layer bitstream 208. The spatial scalability encoding apparatus 200 may also comprise a downsampler 202 for downsampling the input video signal if the resolution of the base layer representation and the enhancement layer representation differ from each other. For example, the scaling factor between the base layer and an enhancement layer may be 1:2 wherein the resolution of the enhancement layer is twice the resolution of the base layer (in both horizontal and vertical direction). The spatial scalability encoding apparatus 200 may further comprise a filter 205 for filtering and an upsampler 206 for downsampling the encoded video signal if the resolution of the base layer representation and the enhancement layer representation differ from each other.

The base layer encoding element 203 and the enhancement layer encoding element 207 may comprise similar elements with the encoder depicted in FIG. 4a or they may be different from each other.

In many embodiments the reference frame memory 318 may be capable of storing decoded pictures of different layers or there may be different reference frame memories for storing decoded pictures of different layers.

The operation of the pixel predictor 302, 402 may be configured to carry out any pixel prediction algorithm.

The pixel predictor 302, 402 may also comprise a filter 385 to filter the predicted values before outputting them from the pixel predictor 302, 402.

The filter 316, 416 may be used to reduce various artifacts such as blocking, ringing etc. from the reference images.

The filter 316, 416 may comprise e.g. a deblocking filter, a Sample Adaptive Offset (SAO) filter and/or an Adaptive Loop Filter (ALF). In some embodiments the encoder determines which region of the pictures are to be filtered and the filter coefficients based on e.g. RDO and this information is signalled to the decoder.

When the enhancement layer encoding element 420 is encoding a region of an image of an enhancement layer (e.g. a CTU), it determines which region in the base layer corresponds with the region to be encoded in the enhancement layer. For example, the location of the corresponding region may be calculated by scaling the coordinates of the CTU with the spatial resolution scaling factor between the base and enhancement layer. The enhancement layer encoding element 420 may also examine if the sample adaptive offset filter and/or the adaptive loop filter should be used in encoding the current CTU on the enhancement layer. If the enhancement layer encoding element 420 decides to use for this region the sample adaptive filter and/or the adaptive loop filter, the enhancement layer encoding element 420 may also use the sample adaptive filter and/or the adaptive loop filter to filter the sample values of the base layer when constructing the reference block for the current enhancement layer block. When the corresponding block of the base layer and the filtering mode has been determined, reconstructed samples of the base layer are then e.g. retrieved from the reference frame memory 318 and provided to the filter 440 for filtering. If, however, the enhancement layer encoding element 420 decides not to use for this region the sample adaptive filter and the adaptive loop filter, the enhancement layer encoding element 420 may also not use the sample adaptive filter and the adaptive loop filter to filter the sample values of the base layer.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a macroblock filter which may filter the reconstructed macroblock according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

In some embodiments the filter 440 comprises the sample adaptive filter, in some other embodiments the filter 440 comprises the adaptive loop filter and in yet some other embodiments the filter 440 comprises both the sample adaptive filter and the adaptive loop filter.

If the resolution of the base layer and the enhancement layer differ from each other, the filtered base layer sample values may need to be upsampled by the upsampler 450. The output of the upsampler 450 i.e. upsampled filtered base layer sample values are then provided to the enhancement layer encoding element 420 as a reference for prediction of pixel values for the current block on the enhancement layer.

For completeness a suitable decoder is hereafter described. However, some decoders may not be able to process enhancement layer data wherein they may not be able to decode all received images.

Figure 5A:
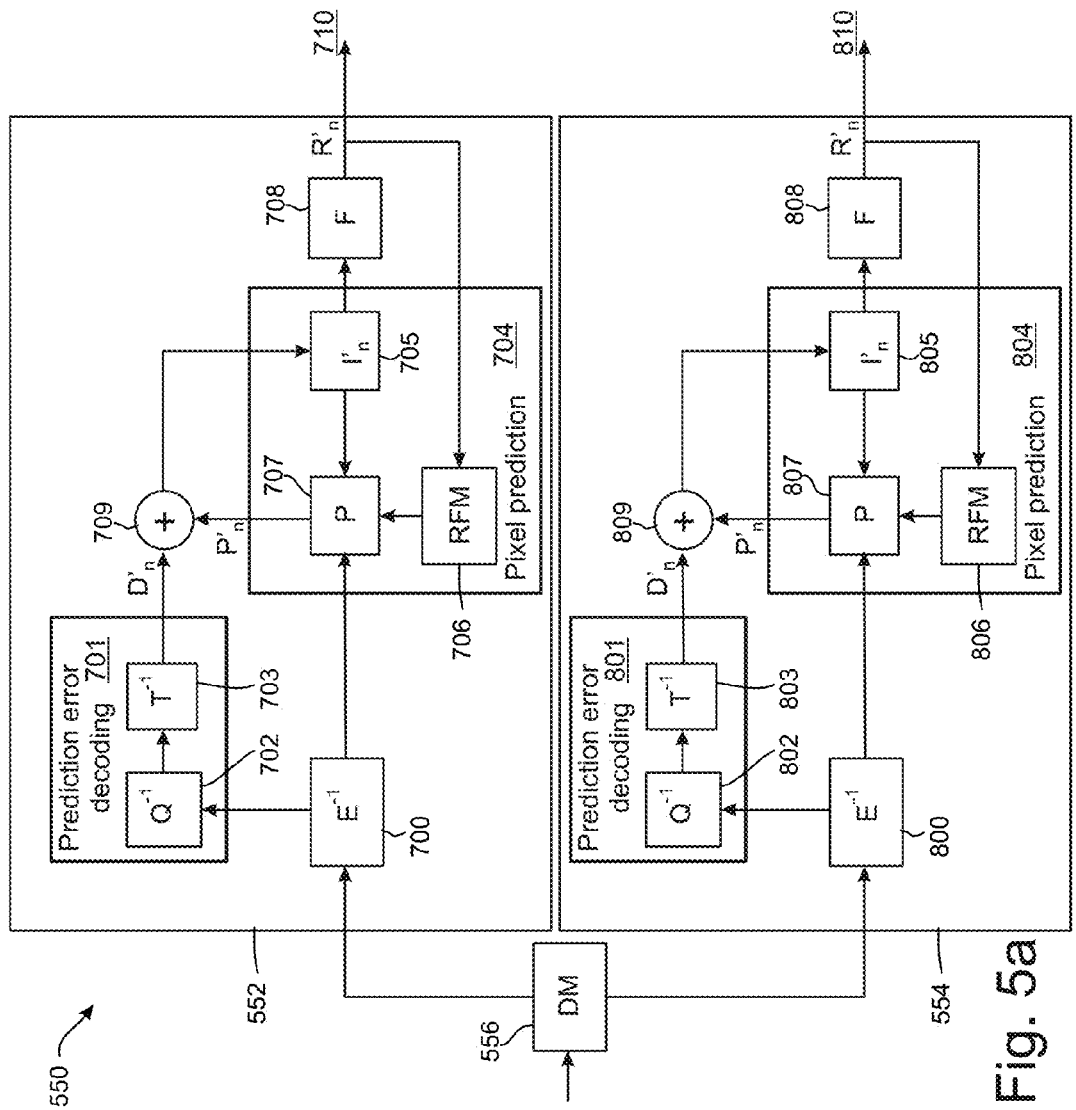
FIG. 5a shows schematically an embodiment of a decoder.

At the decoder side similar operations are performed to reconstruct the image blocks. FIG. 5a shows a block diagram of a video decoder 550 suitable for employing embodiments of the invention. In this embodiment the video decoder 550 comprises a first decoder section 552 for base view components and a second decoder section 554 for non-base view components. Block 556 illustrates a demultiplexer for delivering information regarding base view components to the first decoder section 552 and for delivering information regarding non-base view components to the second decoder section 554. The decoder shows an entropy decoder 700, 800 which performs an entropy decoding ($E^{-1}$) on the received signal. The entropy decoder thus performs the inverse operation to the entropy encoder 330, 430 of the encoder described above. The entropy decoder 700, 800 outputs the results of the entropy decoding to a prediction error decoder 701, 801 and pixel predictor 704, 804. Reference $P'_n$ stands for a predicted representation of an image block. Reference $D'_n$ stands for a reconstructed prediction error signal. Blocks 705, 805 illustrate preliminary reconstructed images or image blocks ($I'_n$). Reference $R'_n$ stands for a final reconstructed image or image block. Blocks 703, 803 illustrate inverse transform ($T^{-1}$). Blocks 702, 802 illustrate inverse quantization ($Q^{-1}$). Blocks 706, 806 illustrate a reference frame memory (RFM). Blocks 707, 807 illustrate prediction (P) (either inter prediction or intra prediction). Blocks 708, 808 illustrate filtering (F). Blocks 709, 809 may be used to combine decoded prediction error information with predicted base view/non-base view components to obtain the preliminary reconstructed images ($I'_n$). Preliminary reconstructed and filtered base view images may be output 710 from the first decoder section 552 and preliminary reconstructed and filtered base view images may be output 810 from the second decoder section 554.

The pixel predictor 704, 804 receives the output of the entropy decoder 700, 800. The output of the entropy decoder 700, 800 may include an indication on the prediction mode used in encoding the current block. A predictor selector 707, 807 within the pixel predictor 704, 804 may determine that the current block to be decoded is an enhancement layer block. Hence, the predictor selector 707, 807 may select to use information from a corresponding block on another layer such as the base layer to filter the base layer prediction block while decoding the current enhancement layer block. An indication that the base layer prediction block has been filtered before using in the enhancement layer prediction by the encoder may have been received by the decoder wherein the pixel predictor 704, 804 may use the indication to provide the reconstructed base layer block values to the filter 708, 808 and to determine which kind of filter has been used, e.g. the SAO filter and/or the adaptive loop filter, or there may be other ways to determine whether or not the modified decoding mode should be used.

The predictor selector may output a predicted representation of an image block $P'_n$ to a first combiner 709. The predicted representation of the image block is used in conjunction with the reconstructed prediction error signal $D'_n$ to generate a preliminary reconstructed image $I'_n$. The preliminary reconstructed image may be used in the predictor 704, 804 or may be passed to a filter 708, 808. The filter applies a filtering which outputs a final reconstructed signal $R'_n$. The final reconstructed signal $R'_n$ may be stored in a reference frame memory 706, 806, the reference frame memory 706, 806 further being connected to the predictor 707, 807 for prediction operations.

The prediction error decoder 702, 802 receives the output of the entropy decoder 700, 800. A dequantizer 702, 802 of the prediction error decoder 702, 802 may dequantize the output of the entropy decoder 700, 800 and the inverse transform block 703, 803 may perform an inverse transform operation to the dequantized signal output by the dequantizer 702, 802. The output of the entropy decoder 700, 800 may also indicate that prediction error signal is not to be applied and in this case the prediction error decoder produces an all zero output signal.

It should be understood that for various blocks in FIG. 5a inter-layer prediction may be applied, even if it is not illustrated in FIG. 5a. Inter-layer prediction may include sample prediction and/or syntax/parameter prediction. For example, a reference picture from one decoder section (e.g. RFM 706) may be used for sample prediction of the other decoder section (e.g. block 807). In another example, syntax elements or parameters from one decoder section (e.g. filter parameters from block 708) may be used for syntax/parameter prediction of the other decoder section (e.g. block 808).

FIG. 5b illustrates a block diagram of a spatial scalability decoding apparatus 210 corresponding to the encoder 200 shown in FIG. 4b. In this embodiment the decoding apparatus comprises a base layer decoding element 212 and an enhancement layer decoding element 217. The base layer decoding element 212 decodes the encoded base layer bitstream 211 to a base layer decoded video signal 213 and, respectively, the enhancement layer decoding element 217 decodes the encoded enhancement layer bitstream 216 to an enhancement layer decoded video signal 218. The spatial scalability decoding apparatus 210 may also comprise a filter 214 for filtering reconstructed base layer pixel values and an upsampler 215 for upsampling filtered reconstructed base layer pixel values.

The base layer decoding element 212 and the enhancement layer decoding element 217 may comprise similar elements with the decoder depicted in FIG. 5a or they may be different from each other. In other words, both the base layer decoding element 212 and the enhancement layer decoding element 217 may comprise all or some of the elements of the decoder shown in FIG. 5a. In some embodiments the same decoder circuitry may be used for implementing the operations of the base layer decoding element 212 and the enhancement layer decoding element 217 wherein the decoder is aware the layer it is currently decoding.

It is assumed that the decoder has decoded the corresponding base layer block from which information for the modification may be used by the decoder. The current block of pixels in the base layer corresponding to the enhancement layer block may be searched by the decoder or the decoder may receive and decode information from the bitstream indicative of the base block and/or which information of the base block to use in the modification process.

When filtering 214 is applied, the filter parameters that define how the base layer samples are processed may be included e.g. in data units that are considered part of enhancement layer, such as coded slice NAL units of enhancement layer pictures or adaptation parameter set for enhancement layer pictures. Consequently, a sub-bitstream extraction process resulting into a base layer bitstream only may omit the filter parameters from the bitstream. A decoder decoding the base layer bitstream or a decoder decoding the base layer only may therefore omit the filtering processes controlled by the filter parameters.

In situations in which base layer spatial resolution is smaller than that of the enhancement layer, the processing for the base layer can be applied before or after the base layer undergoes an upsampling process. The filtering and upsampling processes can be also performed jointly by modifying the upsampling process based on the indicated filtering parameters. This process can also be applied for the same standards scalability case in which both base layer and enhancement layer are coded with HEVC.

In many video communication or transmission systems, transport mechanisms and multimedia container file formats there are mechanisms to transmit or store the base layer separately from the enhancement layer(s). It may be considered that layers are stored in or transmitted through separate logical channels. Examples are provided in the following:

1. ISO Base Media File Format (ISOBMFF, ISO/IEC International Standard 14496-12): Base layer can be stored as a track and each enhancement layer can be stored in another track. Similarly, in a hybrid codec scalability case, a non-HEVC-coded base layer can be stored as a track (e.g. of sample entry type 'avc1'), while the enhancement layer(s) can be stored as another track which is linked to the base-layer track using so-called track references.

2. Real-time Transport Protocol (RTP): either RTP session multiplexing or synchronization source (SSRC) multiplexing can be used to logically separate different layers.

3. MPEG-2 transport stream (TS): Each layer can have a different packet identifier (PID) value.

Many video communication or transmission systems, transport mechanisms and multimedia container file formats provides means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The SVC and MVC file formats are specified as amendments to the AVC file format. The ISO file format is the base for derivation of all the above mentioned file formats (excluding the ISO file format itself). These file formats (including the ISO file format itself) are generally called the ISO family of file formats.

The basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track box. A track may be one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, typically one media track is selected. Samples of a track may be implicitly associated with sample numbers that are incremented by 1 in the indicated decoding order of samples. The first sample in a track may be associated with sample number 1.

An example of a simplified file structure according to the ISO base media file format may be described as follows. The file may include the moov box and the mdat box and the moov box may include one or more tracks that correspond to video and audio, respectively.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, also included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used when recording content to ISO files in order to avoid losing data if a recording application crashes, runs out of memory space, or some other incident occurs. Without movie fragments, data loss may occur because the file format may typically require that all metadata, e.g., the movie box, be written in one contiguous area of the file. Furthermore, when recording a file, there may not be sufficient amount of memory space (e.g., RAM) to buffer a movie box for the size of the storage available, and re-computing the contents of a movie box when the movie is closed may be too slow. Moreover, movie fragments may enable simultaneous recording and playback of a file using a regular ISO file parser. Finally, a smaller duration of initial buffering may be required for progressive downloading, e.g., simultaneous reception and playback of a file, when movie fragments are used and the initial movie box is smaller compared to a file with the same media content but structured without movie fragments.

The movie fragment feature may enable splitting the metadata that conventionally would reside in the movie box into multiple pieces. Each piece may correspond to a certain period of time for a track. In other words, the movie fragment feature may enable interleaving file metadata and media data. Consequently, the size of the movie box may be limited and the use cases mentioned above be realized.

In some examples, the media samples for the movie fragments may reside in an mdat box, as usual, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

In some embodiments, an encoder or another entity, such as a file creator, encodes an indication of the intended display behavior of two or more layers into a container file conforming to the ISO Base Media File Format and possibly some of its derivative file formats. The container file may include coded pictures and/or may refer another file or files including coded pictures. For example, a box within the sample entry description may include display_composition_idc or a similar indication for layers that are represented by the track containing the sample entry description.

In some embodiments, a decoder or another entity, such as a media player or a file parser, decodes an indication of the intended display behavior of two or more layers from a container file conforming to the ISO Base Media File Format and possibly some of its derivative file formats. The container file may include coded pictures and/or may refer another file or files including coded pictures. For example, the indication may be decoded from a box within the sample entry description, where the box may include display_composition_idc or a similar indication for layers that are represented by the track containing the sample entry description.

In dynamic adaptive streaming over HTTP (DASH) or alike, the multimedia content may be captured and stored on an HTTP server and may be delivered using HTTP. The content may be stored on the server in two parts: Media Presentation Description (MPD) (or alike description or file, which may be also referred as a manifest), which describes a manifest of the available content, its various alternatives, their URL addresses, and other characteristics; and segments, which contain the actual multimedia bitstreams in the form of chunks, in single or multiple files. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

The media presentation description (MPD) may provide information for clients to establish a dynamic adaptive streaming over HTTP. MPD may contain information describing media presentation, such as an HTTP—uniform resource locator (URL) of each Segment to make GET Segment request.

A DASH service may be provided as an on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments may be created continuously as the content is produced and published to DASH clients by a content provider. Segment URLs construction method may be either template-based Segment URLs construction method or the Segment list generation method. In the former, a DASH client may be able to construct Segment URLs without updating an MPD before requesting a Segment. In the latter, a DASH client may need to periodically download the updated MPDs to get Segment URLs. For live service, hence, the template-based Segment URLs construction method may be superior to the Segment list generation method.

An Internet media type, which may also be referred to as Multipurpose Internet Mail Extensions (MIME) type, is a standard identifier used on the Internet to indicate the type of data that a file or a resource (e.g. URL) contains. A media type is composed of a type, a subtype, and zero or more parameters (which may also be referred to as MIME media parameters). The type may for example be application, text, image, video, or audio. The subtype may be used for example to identify a coding scheme. The parameters may be specified to the type and subtype. Some parameters may be mandatory while others may be optional. The Internet media type may be used in many contexts, such as within SDP descriptions, to identify the format and settings of the media content, to indicate media capability of an endpoint, and/or for similar purposes.

Figure 1:
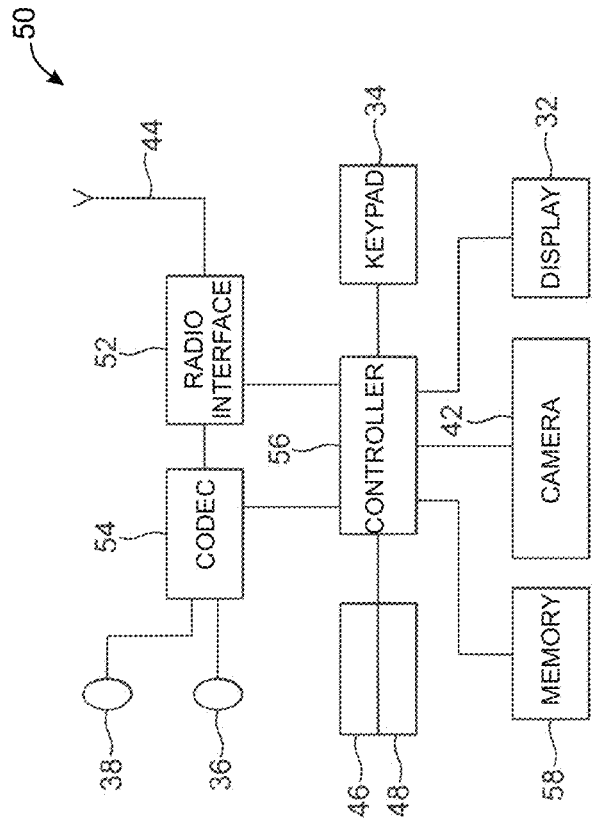
FIG. 1 shows schematically an electronic device employing some embodiments of the invention.

FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In some embodiments the apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
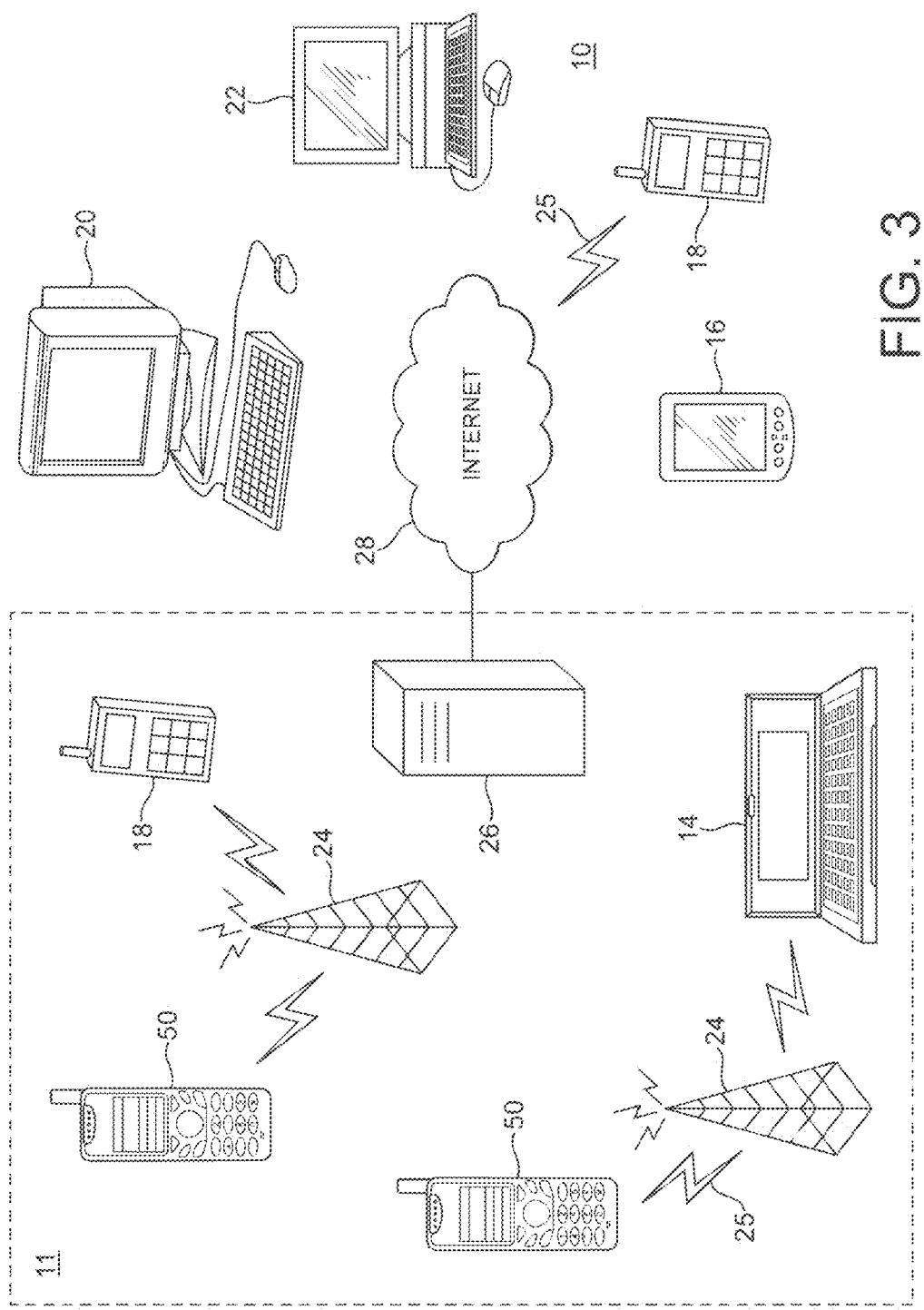
FIG. 3 further shows schematically electronic devices employing embodiments of the invention connected using wireless and/or wired network connections.

FIG. 3 shows an arrangement for video coding comprising a plurality of apparatuses, networks and network elements according to an example embodiment. With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In the above, some embodiments have been described in relation to particular types of parameter sets. It needs to be understood, however, that embodiments could be realized with any type of parameter set or other syntax structure in the bitstream.

In the above, some embodiments have been described in relation to encoding indications, syntax elements, and/or syntax structures into a bitstream or into a coded video sequence and/or decoding indications, syntax elements, and/or syntax structures from a bitstream or from a coded video sequence. It needs to be understood, however, that embodiments could be realized when encoding indications, syntax elements, and/or syntax structures into a syntax structure or a data unit that is external from a bitstream or a coded video sequence comprising video coding layer data, such as coded slices, and/or decoding indications, syntax elements, and/or syntax structures from a syntax structure or a data unit that is external from a bitstream or a coded video sequence comprising video coding layer data, such as coded slices. For example, in some embodiments, an indication according to any embodiment above may be coded into a video parameter set or a sequence parameter set, which is conveyed externally from a coded video sequence for example using a control protocol, such as SDP. Continuing the same example, a receiver may obtain the video parameter set or the sequence parameter set, for example using the control protocol, and provide the video parameter set or the sequence parameter set for decoding.

In the above, the example embodiments have been described with the help of syntax of the bitstream. It needs to be understood, however, that the corresponding structure and/or computer program may reside at the encoder for generating the bitstream and/or at the decoder for decoding the bitstream. Likewise, where the example embodiments have been described with reference to an encoder, it needs to be understood that the resulting bitstream and the decoder have corresponding elements in them. Likewise, where the example embodiments have been described with reference to a decoder, it needs to be understood that the encoder has structure and/or computer program for generating the bitstream to be decoded by the decoder.

In the above, some embodiments have been described with reference to an enhancement layer and a base layer. It needs to be understood that the base layer may as well be any other layer as long as it is a reference layer for the enhancement layer. It also needs to be understood that the encoder may generate more than two layers into a bitstream and the decoder may decode more than two layers from the bitstream. Embodiments could be realized with any pair of an enhancement layer and its reference layer. Likewise, many embodiments could be realized with consideration of more than two layers.

In the above, some embodiments have been described with reference to an enhancement layer and a reference layer, where the reference layer may be for example a base layer.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 1 and 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:

encoding pictures into a bitstream, the bitstream comprising at least two scalability layers and pictures being associated with access units;

encoding, into the bitstream, an indication, which indicates an intended displaying behavior, when the at least two scalability layers are output layers.

In some embodiments the method comprises:
encoding, into the bitstream, another indication, which indicates a first output layer and a second output layer.

In some embodiments the method comprises:
encoding, into the bitstream, a further indication, which indicates at least one alternative output layer, the further indication specifying to use a picture of the at least one alternative layer, if a picture of the output layer is missing from an access unit.

In some embodiments of the method the indication indicates that intended displaying behavior is at least one of the following:
  to combine pictures of the at least two scalability layers;
  to overlay pictures of the at least two scalability layers;
  to display the pictures of the at least two scalability layers separately;
  to allow the intended displaying behavior to be selected of a subset of the above.

In some embodiments of the method, in the absence of a picture at the output layer within an access unit the indication indicates that intended displaying behavior is at least one of the following: to display the one or more pictures of output layers that are present in the access unit;
  to combine pictures at output layers that are present in an access unit and at least one of the following:
    another picture of the output layer that is not present in the access unit;
    an interpolated picture that is obtained by interpolating other pictures in the output layer;
    a synthesized picture that is obtained by depth-image-based rendering. In some embodiments of the method, the another picture of the output layer that is not present in the access unit is one of the previous picture in output order, the closest picture in picture order count, or an indicated picture.

In some embodiments the method comprises:
providing for the indication regarding the intended displaying behavior information to which layers of the at least two scalability layers the indication is applicable.

In some embodiments the method comprises:
encoding the indication as a supplemental enhancement information message.

In some embodiments of the method the first output layer is a base layer and the second output layer is an enhancement layer.

In some embodiments of the method pictures of the at least two scalability layers represent the same output time or the same output order.

According to a second example, there is provided a method comprising:

decoding pictures from a bitstream, the bitstream comprising at least two scalability layers and pictures being associated with access units;

decoding from the bitstream an indication, which indicates an intended displaying behavior, when the at least two scalability layers are output layers; and displaying the at least two scalability layers according to the indication.

In some embodiments the method comprises:
decoding, from the bitstream, another indication, which indicates a first output layer and a second output layer.

In some embodiments the method comprises:
decoding, from the bitstream, a further indication, which indicates at least one alternative output layer,
  in response to the further indication, using a decoded picture of the at least one alternative output layer, if a picture of the output layer is missing from an access unit.

In some embodiments the method comprises, in response to the indication, at least one of the following:
displaying pictures of the at least two scalability layers separately;
  combining pictures of the at least two scalability layers;
  overlaying pictures of the at least two scalability layers.

In some embodiments of the method, in the absence of a picture at the output layer within an access unit, the method comprises, in response to the indication, at least one of the following:
  displaying the one or more pictures of output layers that are present in the access unit;
  combining pictures at output layers that are present in an access unit and at least one of the following:
    another picture of the output layer that is not present in the access unit;
    an interpolated picture that is obtained by interpolating other pictures in the output layer;
    a synthesized picture that is obtained by depth-image-based rendering.

In some embodiments of the method, the another picture of the output layer that is not present in the access unit is one of the previous picture in output order, the closest picture in picture order count, or an indicated picture.

In some embodiments the method comprises:
determining on the basis of the indication that intended displaying behavior is overlaying pictures of the at least two scalability layers;
decoding a picture of the first output layer; and
displaying the decoded picture of the first output layer.
In some embodiments the method comprises:
determining on the basis of the indication that intended displaying behavior is overlaying pictures of the at least two scalability layers;
decoding a picture of the second output layer; and
displaying the decoded picture of the second output layer.

According to a third example, there is provided an apparatus comprising at least one processor and at least one memory, said at least one memory stored with code thereon, which when executed by said at least one processor, causes an apparatus to perform at least the following:
encode pictures into a bitstream, the bitstream comprising at least two scalability layers and pictures being associated with access units;
encode, into the bitstream, an indication, which indicates an intended displaying behaviour,
when the at least two scalability layers are output layers.

In some embodiments of the apparatus said at least one memory stored with code thereon,
which when executed by said at least one processor, causes the apparatus to perform at least the following:
encode, into the bitstream, another indication, which indicates a first output layer and a second output layer.

In some embodiments of the apparatus said at least one memory stored with code thereon, which when executed by said at least one processor, causes the apparatus to perform at least the following:
encode, into the bitstream, a further indication, which indicates at least one alternative output layer, the further indication specifying to use a picture of the at least one alternative layer, if a picture of the output layer is missing from an access unit.

In some embodiments of the apparatus the indication indicates that intended displaying behavior is at least one of the following:
to combine pictures of the at least two scalability layers;
to overlay pictures of the at least two scalability layers;
to display the pictures of the at least two scalability layers separately;
to allow the intended displaying behavior to be selected of a subset of the above.

In some embodiments of the apparatus the indication indicates in the absence of a picture at the output layer within an access unit that intended displaying behavior is at least one of the following:
to display the one or more pictures of output layers that are present in the access unit;
to combine pictures at output layers that are present in an access unit and at least one of the following:
  another picture of the output layer that is not present in the access unit;
  an interpolated picture that is obtained by interpolating other pictures in the output layer;
  a synthesized picture that is obtained by depth-image-based rendering. depth-image-based rendering.

In some embodiments of the apparatus, the another picture of the output layer that is not present in the access unit is one of the previous picture in output order, the closest picture in picture order count, or an indicated picture.

In some embodiments of the apparatus said at least one memory stored with code thereon, which when executed by said at least one processor, causes the apparatus to perform at least the following:
provide for the indication regarding the intended displaying behavior information to which layers of the at least two scalability layers the indication is applicable.

In some embodiments of the apparatus said at least one memory stored with code thereon, which when executed by said at least one processor, causes the apparatus to perform at least the following:
encode the indication as a supplemental enhancement information message.

According to a fourth example, there is provided an apparatus comprising at least one processor and at least one memory, said at least one memory stored with code thereon, which when executed by said at least one processor, causes an apparatus to perform at least the following:
decode pictures from a bitstream, the bitstream comprising at least two scalability layers and pictures being associated with access units, wherein one of the at least two layers is an output layer and another of the at least two layers is an alternative layer;
decode from the bitstream an indication, which indicates an intended displaying behaviour, when the at least two scalability layers are output layers in an output layer set; and
output a picture of the output layer, a picture of the alternative layer, or a combined picture.

In some embodiments of the apparatus said at least one memory stored with code thereon, which when executed by said at least one processor, causes the apparatus to perform at least the following:
decode, from the bitstream, another indication, which indicates a first output layer and a second output layer.

In some embodiments of the apparatus said at least one memory stored with code thereon, which when executed by said at least one processor, causes the apparatus to perform at least the following:
decode, from the bitstream, a further indication, which indicates at least one alternative output layer,
in response to the further indication, using a decoded picture of the at least one alternative output layer, if a picture of the output layer is missing from an access unit.

In some embodiments of the apparatus said at least one memory stored with code thereon,
which when executed by said at least one processor, causes the apparatus to perform, in response to the indication, at least the following:
display pictures of the at least two scalability layers separately;
combine pictures of the at least two scalability layers;
overlay pictures of the at least two scalability layers;

In some embodiments of the apparatus said at least one memory stored with code thereon, which when executed by said at least one processor, causes the apparatus, in response to the indication, to perform at least one the following:
display the one or more pictures of output layers that are present in the access unit;
combine pictures at output layers that are present in an access unit and t and at least one of the following:
  another picture of the output layer that is not present in the access unit;
  an interpolated picture that is obtained by interpolating other pictures in the output layer;
  a synthesized picture that is obtained by depth-image-based rendering.

In some embodiments of the apparatus said at least one memory stored with code thereon, which when executed by said at least one processor, causes the apparatus, in the absence of a picture at the output layer within an access unit, to perform at least one the following:

determine the previous picture in output order by using a picture order count of the pictures within the access unit.

According to a fifth example, there is provided a computer program product embodied on a non-transitory computer readable medium, comprising computer program code configured to, when executed on at least one processor, cause an apparatus or a system to:

encode pictures into a bitstream, the bitstream comprising at least two scalability layers and pictures being associated with access units;

encode, into the bitstream, an indication, which indicates an intended displaying behaviour, when the at least two scalability layers are output layers in an output layer set.

In some embodiments the computer program product comprises computer program code configured to, when executed by said at least one processor, causes the apparatus or the system to perform at least the following:

encode, into the bitstream, another indication, which indicates a first output layer and a second output layer.

In some embodiments the computer program product comprises computer program code configured to, when executed by said at least one processor, causes the apparatus or the system to perform at least the following:

encode, into the bitstream, a further indication, which indicates at least one alternative output layer, the further indication specifying to use a picture of the at least one alternative layer, if a picture of the output layer is missing from an access unit.

In some embodiments of the computer program product the indication indicates that intended displaying behavior is at least one of the following:
  to combine pictures of the at least two scalability layers;
  to overlay pictures of the at least two scalability layers;
  to display the pictures of the at least two scalability layers separately;
to allow the intended displaying behavior to be selected of a subset of the above.

In some embodiments of the computer program product the indication indicates in the absence of a picture at the output layer within an access unit that intended displaying behavior is at least one of the following:
to display the one or more pictures of output layers that are present in the access unit;
  to combine pictures at output layers that are present in an access unit and at least one of the following:
    another picture of the output layer that is not present in the access unit;
    an interpolated picture that is obtained by interpolating other pictures in the output layer;
    a synthesized picture that is obtained by depth-image-based rendering. depth-image-based rendering.

In some embodiments of the computer program product, the another picture of the output layer that is not present in the access unit is one of the previous picture in output order, the closest picture in picture order count, or an indicated picture.

In some embodiments the computer program product comprises computer program code configured to, when executed by said at least one processor, causes the apparatus or the system to perform at least the following:

provide for the indication regarding the intended displaying behavior information to which layers of the at least two scalability layers the indication is applicable.

In some embodiments the computer program product comprises computer program code configured to, when executed by said at least one processor, causes the apparatus or the system to perform at least the following:

encode the indication as a supplemental enhancement information message.

According to a sixth example, there is provided an computer program product comprising at least one processor and at least one memory, said at least one memory stored with code thereon, which when executed by said at least one processor, causes an apparatus or the system to perform at least the following:

decode pictures from a bitstream, the bitstream comprising at least two scalability layers and pictures being associated with access units, wherein one of the at least two layers is an output layer and another of the at least two layers is an alternative layer;

decode from the bitstream an indication, which indicates an intended displaying behaviour, when the at least two scalability layers are output layers in an output layer set; and output a picture of the output layer, a picture of the alternative layer, or a combined picture.

In some embodiments the computer program product comprises computer program code configured to, when executed by said at least one processor, causes the apparatus or the system to perform at least the following:

encode, into the bitstream, another indication, which indicates a first output layer and a second output layer.

In some embodiments the computer program product comprises computer program code configured to, when executed by said at least one processor, causes the apparatus or the system to perform at least the following:

encode, into the bitstream, a further indication, which indicates at least one alternative output layer, the further indication specifying to use a picture of the at least one alternative layer, if a picture of the output layer is missing from an access unit.

In some embodiments of the apparatus the indication indicates that intended displaying behavior is at least one of the following:
  to combine pictures of the at least two scalability layers;
  to overlay pictures of the at least two scalability layers;
  to display the pictures of the at least two scalability layers separately;
to allow the intended displaying behavior to be selected of a subset of the above.

In some embodiments of the computer program product the indication indicates in the absence of a picture at the output layer within an access unit that intended displaying behavior is at least one of the following:
to display the one or more pictures of output layers that are present in the access unit;
  to combine pictures at output layers that are present in an access unit and at least one of the following:
    another picture of the output layer that is not present in the access unit;
    an interpolated picture that is obtained by interpolating other pictures in the output layer;
    a synthesized picture that is obtained by depth-image-based rendering. depth-image-based rendering.

In some embodiments of the computer program product the another picture of the output layer that is not present in the access unit is one of the previous picture in output order, the closest picture in picture order count, or an indicated picture.

In some embodiments the computer program product comprises computer program code configured to, when executed by said at least one processor, causes the apparatus or the system to perform at least the following:

provide for the indication regarding the intended displaying behavior information to which layers of the at least two scalability layers the indication is applicable.

The invention claimed is:

1. A method comprising:
   determining an intended displaying behavior of at least two scalability layers of a bitstream, the at least two scalability layers comprising pictures;
   encoding, into the bitstream, a description of the bitstream, and an indication, which indicates the intended displaying behavior, when the at least two scalability layers are output layers for decoding the bitstream; and
   performing at least one of the following: (i) encoding pictures into the bitstream, the bitstream comprising the at least two scalability layers, (ii) or encapsulating the bitstream into a container file, wherein the encoded pictures at least partially represent a same scene and the indication of the intended displaying behavior indicates an intent for one or more of overlaying pictures of the at least two scalability layers, or displaying the pictures of the at least two scalability layers separately, wherein pictures are associated with access units, and in the absence of a picture at the output layer within an access unit, the indication indicates that the intended displaying behavior is:
      combining pictures at output layers that are present in an access unit and at least one of the following:
      another picture of the output layer that is not present in the access unit; an interpolated picture that is obtained by interpolating other pictures in the output layer, or
      a synthesized picture that is obtained by depth-image-based rendering, and
   wherein in an instance in which the indication indicates that the intended displaying behavior is overlaying pictures of the at least two scalability layers, the method further comprises at least one of the following: (i) encoding a picture of the first output layer; or (ii) encoding a picture of the second output layer.

2. The method according to claim 1 comprising:
   encoding, into the bitstream, another indication, which indicates that the at least two scalability layers are the output layers of an output layer set.

3. The method according to claim 1, wherein a media presentation description of adaptive streaming comprises the description of the bitstream.

4. The method according to claim 1, wherein the another picture of the output layer that is not present in the access unit is one of the previous picture in output order, the closest picture in picture order count, or an indicated picture.

5. The method according to claim 1 comprising:
   providing, for the indication regarding the intended displaying behavior, information as to which layers of the at least two scalability layers the indication is applicable.

6. A method comprising:
   decoding pictures from a bitstream, the bitstream comprising at least two scalability layers and pictures associated with access units;
   decoding from the bitstream, a container file encapsulating the bitstream, a description of the bitstream, and an indication, which indicates an intended displaying behavior, when the at least two scalability layers are output layers; and
   displaying the at least two scalability layers according to the indication,
   wherein the decoded pictures at least partially represent a same scene and the indication of the intended displaying behavior indicates an intent for one or more of overlaying pictures of the at least two scalability layers, or displaying the pictures of the at least two scalability layers separately, wherein, in the absence of a picture at the output layer within an access unit, and in response to the indication, the method comprises:
      combining pictures at output layers that are present in an access unit and at least one of the following:
      another picture of the output layer that is not present in the access unit; an interpolated picture that is obtained by interpolating other pictures in the output layer; or
      a synthesized picture that is obtained by depth-image-based rendering, and
   wherein the method further comprises determining on the basis of the indication that the intended displaying behavior is overlaying pictures of the at least two scalability layers, and at least one of the following: (i) decoding a picture of the first output layer and displaying the decoded picture of the first output layer; or (ii) decoding a picture of the second output layer and displaying the decoded picture of the second output layer.

7. The method according to claim 6 comprising:
   decoding, from the bitstream, another indication, which indicates that the at least two scalability layers are the output layers of an output layer set.

8. The method according to claim 6, wherein a media presentation description of adaptive streaming comprises the description of the bitstream.

9. An apparatus comprising at least one processor and at least one memory, said at least one memory stored with code thereon, which when executed by said at least one processor, causes an apparatus to perform at least the following:
   determine an intended displaying behavior of at least two scalability layers of a bitstream, the at least two scalability layers comprising pictures;
   encode, into the bitstream, a description of the bitstream, and an indication, which indicates the intended displaying behavior, when the at least two scalability layers are output layers for decoding the bitstream; and
   perform at least one of the following: (i) encode pictures into the bitstream, the bitstream comprising at least two scalability layers or (ii) encapsulate the bitstream into a container file, wherein the encoded pictures at least partially represent a same scene and the indication indicates an intent for one or more of overlaying pictures of the at least two scalability layers, or displaying the pictures of the at least two scalability layers separately, wherein pictures are associated with access units, and in the absence of a picture at the output layer within an access unit, the indication indicates that the intended displaying behavior is:
      combining pictures at output layers that are present in an access unit and at least one of the following:

another picture of the output layer that is not present in the access unit; an interpolated picture that is obtained by interpolating other pictures in the output layer, or a synthesized picture that is obtained by depth-image-based rendering, wherein in an instance in which the indication indicates that the intended displaying behavior is overlaying pictures of the at least two scalability layers, the at least one memory stored with code thereon, when executed by said at least one processor, further causes the apparatus to perform at least one of the following: (i) encode a picture of the first output layer; or (ii) encode a picture of the second output layer.

10. An apparatus comprising at least one processor and at least one memory, said at least one memory stored with code thereon, which when executed by said at least one processor, causes an apparatus to perform at least the following:

decode pictures from a bitstream, the bitstream comprising at least two scalability layers and pictures associated with access units, wherein one of the at least two layers is an output layer and another of the at least two layers is an alternative layer;

decode from the bitstream, a container file encapsulating the bitstream, a description of the bitstream, and an indication, which indicates an intended displaying behavior, when the at least two scalability layers are output layers of an output layer set; and output a picture of the output layer, a picture of the alternative layer, or a combined picture, wherein the decoded pictures at least partially represent a same scene and the indication of the intended displaying behavior indicates an intent for one or more of overlaying pictures of the at least two scalability layers, or displaying the pictures of the at least two scalability layers separately, wherein, in the absence of a picture at the output layer within an access unit, and in response to the indication, the apparatus is further caused to perform the following:

combining pictures at output layers that are present in an access unit and at least one of the following:

another picture of the output layer that is not present in the access unit; an interpolated picture that is obtained by interpolating other pictures in the output layer; or a synthesized picture that is obtained by depth-image-based rendering, wherein said at least one memory stored with code thereon, when executed by said at least one processor, further causes the apparatus to determine on the basis of the indication that the intended displaying behavior is overlaying pictures of the at least two scalability layers, and at least one of the following: (i) decode a picture of the first output layer and display the decoded picture of the first output layer; or (ii) decode a picture of the second output layer and display the decoded picture of the second output layer.

11. The apparatus according to claim 10, said at least one memory stored with code thereon, which when executed by said at least one processor, causes the apparatus to perform at least the following:

decode, from the bitstream, another indication, which indicates that the at least two scalability layers are output layers of the output layer set.

12. The apparatus according to claim 10 wherein a media presentation description of adaptive streaming comprises the description of the bitstream.

13. A computer program product embodied on a non-transitory computer readable medium, comprising computer program code configured to, when executed on at least one processor, cause an apparatus or a system to:

determine an intended displaying behavior of at least two scalability layers of a bitstream, the at least two scalability layers comprising pictures;

encode, into the bitstream, a description of the bitstream, and an indication, which indicates the intended displaying behavior, when the at least two scalability layers are output layers in an output layer set for decoding the bitstream; and perform at least one of the following: (i) encode pictures into the bitstream, the bitstream comprising at least two scalability layers or (ii) encapsulate the bitstream into a container file, wherein the encoded pictures at least partially represent a same scene and the indication of the intended displaying behavior indicates an intent for one or more of overlaying pictures of the at least two scalability layers, or displaying the pictures of the at least two scalability layers separately, wherein pictures are associated with access units, and in the absence of a picture at the output layer within an access unit, the indication indicates that the intended displaying behavior is:

combining pictures at output layers that are present in an access unit and at least one of the following:

another picture of the output layer that is not present in the access unit; an interpolated picture that is obtained by interpolating other pictures in the output layer, or a synthesized picture that is obtained by depth-image-based rendering, wherein in an instance in which the indication indicates that the intended displaying behavior is overlaying pictures of the at least two scalability layers, the computer program code is configured to, when executed on the at least one processor, further cause the apparatus or the system to perform at least one of the following: (i) encode a picture of the first output layer; or (ii) encode a picture of the second output layer.

14. A computer program product stored on a non-transitory computer readable medium comprising at least one processor and at least one memory, said at least one memory stored with code thereon, which when executed by said at least one processor, causes an apparatus or a system to perform at least the following:

decode pictures from a bitstream, the bitstream comprising at least two scalability layers and pictures associated with access units, wherein one of the at least two layers is an output layer and another of the at least two layers is an alternative layer;

decode from the bitstream, a container file encapsulating the bitstream, a description of the bitstream, and an indication, which indicates an intended displaying behavior, when the at least two scalability layers are output layers in an output layer set; and output a picture of the output layer, a picture of the alternative layer, or a combined picture, wherein the decoded pictures at least partially represent a same scene and the indication of the intended displaying behavior indicates an intent for one or more of overlaying pictures of the at least two scalability layers, or displaying the pictures of the at least two scalability layers separately, wherein, in the absence of a picture at the output layer within an access unit, and in response to the indication, the apparatus or the system is further caused to perform the following:
combining pictures at output layers that are present in an access unit and at least one of the following:
another picture of the output layer that is not present in the access unit; an interpolated picture that is obtained by interpolating other pictures in the output layer; or a synthesized picture that is obtained by depth-image-based rendering,
wherein the computer program code is configured to, when executed on the at least one processor, further cause the apparatus or the system to determine on the basis of the indication that the intended displaying behavior is overlaying pictures of the at least two scalability layers, and at least one of the following: (i) decode a picture of the first output layer and display the decoded picture of the first output layer; or (ii) decode a picture of the second output layer and display the decoded picture of the second output layer.

* * * * *